United States Patent [19]
Gilovich

[11] Patent Number: 6,005,747
[45] Date of Patent: Dec. 21, 1999

[54] HIGH CAPACITY DISK DRIVE WITH TWO STATOR WINDINGS

[76] Inventor: Paul A. Gilovich, 4545 Laguna Pl., Suite 108, Boulder, Colo. 80303

[21] Appl. No.: 08/980,949

[22] Filed: Dec. 1, 1997

Related U.S. Application Data

[63] Continuation-in-part of application No. 08/696,592, Aug. 16, 1996, abandoned, application No. 08/687,841, Jul. 26, 1996, abandoned, application No. 08/698,944, Aug. 16, 1996, abandoned, application No. 08/686,804, Jul. 26, 1996, abandoned, application No. 08/690,349, Jul. 26, 1996, abandoned, application No. 08/690,348, Jul. 26, 1996, abandoned, application No. 08/686,912, Jul. 26, 1996, abandoned, application No. 08/698,905, Aug. 16, 1996, abandoned, and application No. 08/699,899, Aug. 16, 1996, abandoned.

[51] Int. Cl.⁶ ............................ G11B 17/08; G11B 17/02
[52] U.S. Cl. ...................................... 360/98.07; 360/99.08
[58] Field of Search ............................ 360/98.07, 98.08, 360/99.08, 99.12, 106

[56] References Cited

U.S. PATENT DOCUMENTS

| | | | |
|---|---|---|---|
| 5,148,338 | 9/1992 | Fruge | 360/98.07 |
| 5,602,701 | 2/1997 | Komura | 360/98.07 |

*Primary Examiner*—A. J. Heinz
*Attorney, Agent, or Firm*—Emery L. Tracy

[57] ABSTRACT

A hard disk drive apparatus is disclosed which utilizes at least a pair of actuator assemblies each of which includes a plurality of separate actuator arms and spacers stacked on a tubular sleeve which is bearing supported on a stationary actuator shaft. The arms and spacers are preferably ceramic with head leads and preamplifiers carried on the arm. Each actuator stack has heads oriented in only one direction to minimize the spacing between the hard disks.

The head disk assembly is built up on the baseplate by installation of layers of actuator arms, spacers and hard disks. The assembled head disk assembly is enclosed between the generally flat baseplate and a top plate by a peripheral housing therearound.

The disks are rotated by a dual stator motor located between the baseplate and the top plate with one stator mounted to the baseplate and the other stator mounted to the top plate.

12 Claims, 30 Drawing Sheets

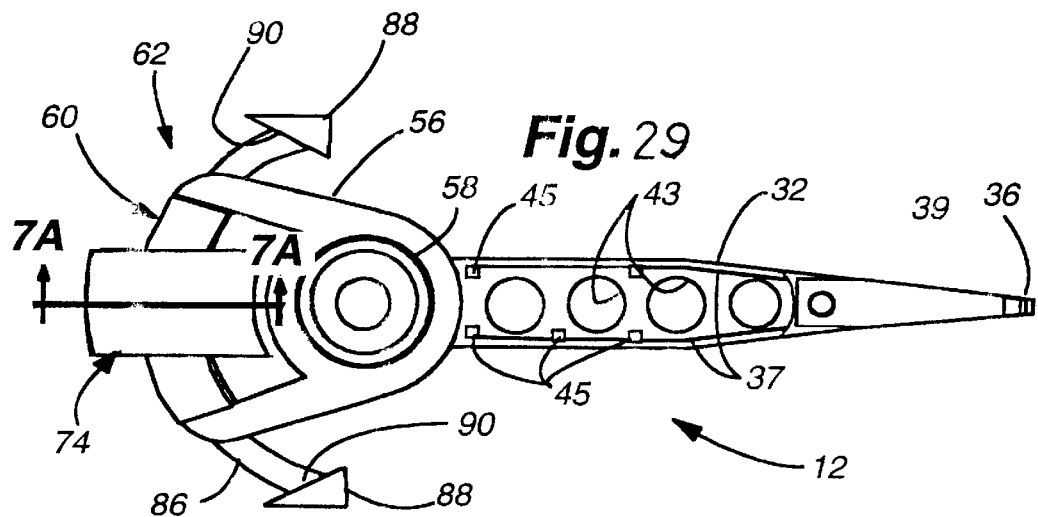
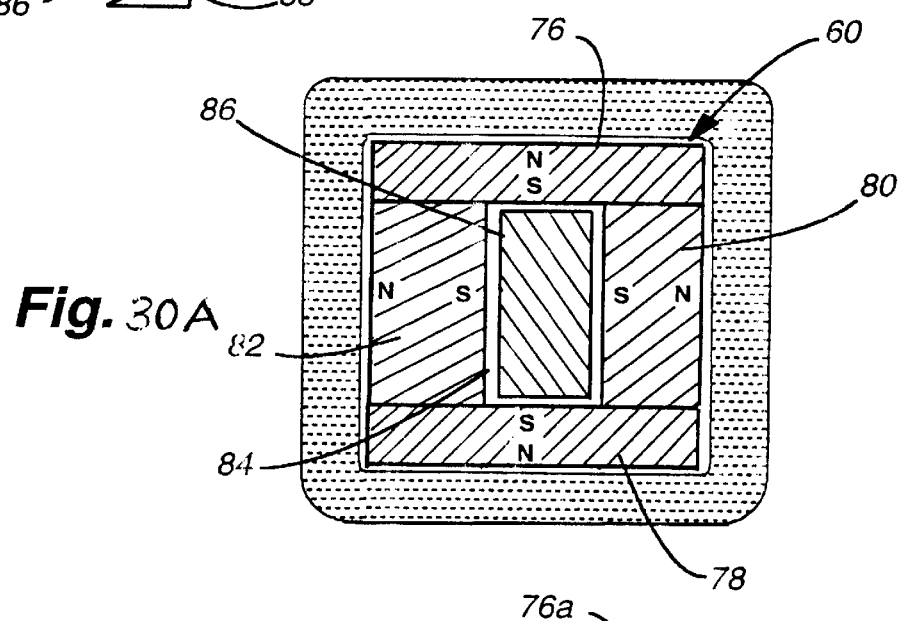
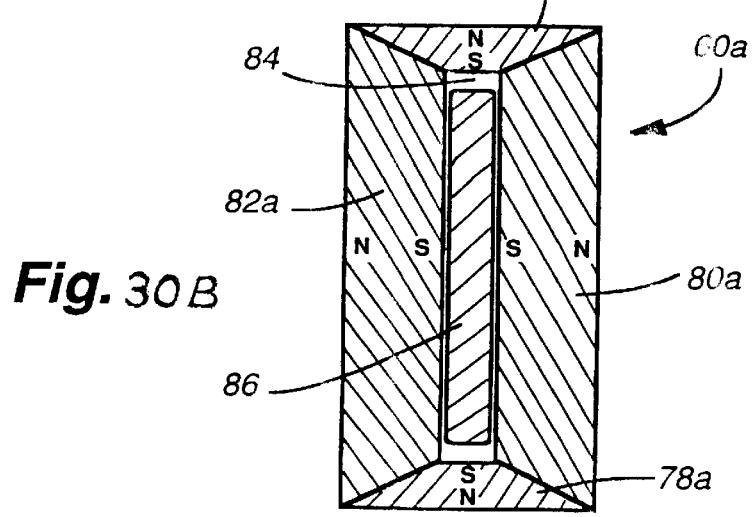

HIGH CAPACITY DISK DRIVE WITH TWO STATOR WINDINGS

CROSS REFERENCE TO RELATED APPLICATIONS

This application is a continuation-in-part of my patent application Ser. No. 08/696,592, filed Aug. 16, 1996 ABN; Ser. No. 08/687,841, filed Jul. 26, 1996 ABN; Ser. No. 08/698,944, filed Aug. 16, 1996 ABN; Ser. No. 08/686,804, filed Jul. 26, 1996 ABN; Ser. No. 08/690,349, filed Jul. 26, 1996 ABN; Ser. No. 08/690,348, filed Jul. 26, 1996 ABN; Ser. No. 08/686,912, filed Jul. 26, 1996 ABN; Ser. No. 08/698,905, filed Aug. 16, 1996 ABN; and Ser. No. 08/699,899, filed Aug. 16, 1996 ABN.

BACKGROUND OF THE INVENTION

1. Field of the Invention

This invention generally relates to data storage devices and more particularly to a fixed disk drive system employing a plurality of hard disks carrying magnetically stored data in magnetic media on the disk surfaces and a plurality of rotatable head positioning actuator assemblies.

2. Description of the Related Art

Fixed disk data storage devices typically are magnetic disk devices which utilize a head disk assembly enclosed within a sealed volume with its associated electronics circuitry located adjacent, above or below the sealed head disk assembly or "IDA". The head disk assembly typically includes one or more planar disks stacked on a rotating hub of an included spindle drive motor. Each disk has a magnetic media on its upper and lower surfaces. One or more actuator assemblies for positioning magnetic transducers (heads) over the upper and lower surfaces of the disks is positioned adjacent the stack of disks and includes a rotary motor means such as a voice coil motor for rotating arms, which carry the heads, back and forth over the disk surfaces in order to read and write information from and to the disks.

Main frame computers, high-end file servers, and high performance work stations all require high capacity and extremely high data transfer rates between the computers and data storage devices such as tape drives, hard disk drives or storage modules.

Rotating media storage systems require a certain finite time interval for the read/write head positioning actuator to seek and position the heads accurately over each particular data track. Therefore, there are two general data retrieval schemes in use. The first is serial transfer. In the serial transfer scheme, the actuator first positions the read/write heads over a particular track, data is then read or written with one head at a time in serial by bit mode, then the data stream is interrupted while the actuator moves the heads to a new track location. The second scheme is parallel computing transfer. The parallel computing scheme typically requires two or more separate storage modules, each having a separate head/actuator assembly so that one actuator may seek a new data location while the other actuator is retrieving or writing data. Data is read or written with eight heads simultaneously in parallel by byte mode. The overall data transfer rate is much faster in parallel computing since data transfer does not have to be halted while the actuator seeks out the desired track as is the case with serial transfer.

With the current trend of main frame computer technology and high end file servers to smaller and smaller size, and the concurrent demand for more and more storage space in the lower end machines, there remains an ever increasing need for more data storage capacity in a standard given volume. This is also true in high performance storage systems. However, there are physical limits on the availability of such space. For example, most desktop and tower file servers and personal computer cases are sized to receive peripheral components having a 5¼ inch form factor or smaller.

Most of the conventional disk drives available today contain a single stack of disks and a single voice coil motor operated actuator assembly which utilizes a moving coil attached to the actuator itself. The actuator has the same number of heads as surfaces on the disks. However, the inner actuator arms typically carry two opposing heads, one for the lower surface of the disk immediately above and one for the upper surface of the immediately adjacent lower disk.

There have been a number of attempts to increase the capacity of hard disk drives. One approach has been to reduce the distance between disks so that more disks may be installed in a given height drive. This can be done, for example, by making the disks thinner, making the actuator arms and heads thinner, and/or by providing side-by-side heads on the intermediate actuator arms. Examples of the latter approach are disclosed in U.S. Pat. No. 5,218,496 to Kaczeus and in my U.S. Pat. No. 5,343,345.

One can also provide multiple actuator assemblies in the HDA with each being operable on one set of surfaces, i.e., "volume", of the stack of disks. An example of this approach is provided in my U.S. Pat. No. 5,343,347. Another approach is to provide multiple actuators and multiple sets of heads to simultaneously access different areas of the disks. Some examples of this approach are provided in my U.S. Pat. No. 5,343,347 and U.S. Pat. No. 5,223,993.

The assembly methods conventionally used are complex, cumbersome and prone to error and therefore require meticulous attention to detail. For example, the actuators are typically machine formed from a single block of metal, such as aluminum or magnesium, into an "E-block" shape. In other words, the actuator has a cylindrical body portion with a plurality of radially and parallel projecting arms extending at a given angle from the body portion. The cylindrical body portion typically has a central axial bore for receiving a top and bottom bearing assembly therein. The cylindrical body portion rotatably mounted on a stationary spindle mounted to a baseplate via these bearing assemblies. The E-block also typically carries a voice coil motor coil typically extending in a direction opposite that of the arms. This coil fits between a pair of stationary permanent magnet sets mounted in the drive housing so that the actuator coil is free to rotate back and forth in the space between the magnet sets through a limited arc. The coil mass offsets the head arm mass thus the actuator is balanced. Current fed through the voice coil produces a reactive torque on the actuator commensurate with the magnitude and direction of current to rotate the actuator to and from a desired position.

Each actuator arm carries either one or two gimbal mounted read/write heads. The heads are carried at one end of a flexure. The other end of the flexure is ball staked to the actuator arm. The flexure with a head mounted thereto is often called a "head gimbal assembly" or "HGA". Conventional actuator arms of the E-block are joined with their head gimbal assemblies by staking all of the HGAs to their respective arms in a single operation. For example, an actuator E-block having 8 actuator arms has to have 14 HGAs held in position on the ends of the arms while a metal ball is shot through the matched aligning holes in the ends of the HGAs and through the ends of the E-block actuator arms. Passage of the ball spreads the metal of the flexure against the walls of the holes in the actuator arms to stake the HGAs in place. This staking operation is extremely prone to error. Error rates increase as the number of actuator areas of the E-block increases. It is extremely difficult to ensure that each of the HGAs is securely fastened to its actuator arm with this method. In addition, if one of the HGAs is not securely fastened to its actuator arm of the E-block, the entire E-block with 14 heads (HGAs) could be discarded. This can get very expensive. Therefore, there is a need for a more uniform assembly technique of HGAs to actuator arms that reduces the likelihood and consequence of defects in manufacturing and assembly.

Another problem with current hard disk drive construction techniques is that although the stack of hard disks is sequentially assembled on the drive motor hub, the actuator is separately assembled as a unit apart from the disk stack with all of the HGAs attached to the actuator arms. A spreader comb must then be inserted between the HGAs to allow the arms and HGAs to be inserted as a unit with the arms between the stacked disks. The comb is then removed and the actuator assembly installed or fastened to the frame of the drive apparatus. With present head and disk media assembly technology the release of the heads from the comb has to occur in the inner diameter of the disk. This operation is extremely delicate and often results in failed heads due to misalignment problems during installation.

Fixed disk data storage devices typically are magnetic disk devices which utilize a head disk assembly enclosed within a sealed volume with its associated electronics circuitry located adjacent, above or below the sealed head disk assembly or "HDA". The head disk assembly typically includes one or more planar disks stacked on a rotating hub of an included spindle drive motor. Each disk has a magnetic media on its upper and lower surfaces. One or more actuator assemblies for positioning magnetic transducers (heads) over the upper and lower surfaces of the disks is positioned adjacent the stack of disks and includes a rotary motor means such as a voice coil motor for rotating arms, which carry the heads, back and forth over the disk surfaces in order to read and write information from and to the disks.

Main frame computers, high-end file servers, and high performance work stations all require high capacity and extremely high data transfer rates between the computers and data storage devices such as tape drives, hard disk drives or storage modules.

Rotating media storage systems require a certain finite time interval for the read/write head positioning actuator to seek and position the heads accurately over each particular data track. Therefore, there are two general data retrieval schemes in use. The first is serial transfer. In the serial transfer scheme, the actuator first positions the read/write heads over a particular track, data is then read or written with one head at a time in serial by bit mode, then the data stream is interrupted while the actuator moves the heads to a new track location. The second scheme is parallel computing transfer. The parallel computing scheme typically requires two or more separate storage modules, each having a separate head/actuator assembly so that one actuator may seek a new data location while the other actuator is retrieving or writing data. Data is read or written with eight heads simultaneously in parallel by byte mode. The overall data transfer rate is much faster in parallel computing since data transfer does not have to be halted while the actuator seeks out the desired track as is the case with serial transfer.

With the current trend of main frame computer technology and high end file servers to smaller and smaller size, and the concurrent demand for more and more storage space in the lower end machines, there remains an ever increasing need for more data storage capacity in a standard given volume. This is also true in high performance storage systems. However, there are physical limits on the availability of such space. For example, most desktop and tower file servers and personal computer cases are sized to receive peripheral components having a 5¼ inch form factor or smaller.

Most of the conventional disk drives available today contain a single stack of disks and a single voice coil motor operated actuator assembly which utilizes a moving coil attached to the actuator itself. The actuator has the same number of heads as surfaces on the disks. However, the inner actuator arms typically carry two opposing heads, one for the lower surface of the disk immediately above and one for the upper surface of the immediately adjacent lower disk.

There have been a number of attempts to increase the capacity of hard disk drives. One approach has been to reduce the distance between disks so that more disks may be installed in a given height drive. This can be done, for example, by making the disks thinner, making the actuator arms and heads thinner, and/or by providing side-by-side heads on the intermediate actuator arms. Examples of the latter approach are disclosed in U.S. Pat. No. 5,218,496 to Kaczeus and in my U.S. Pat. No. 5,343,345.

One can also provide multiple actuator assemblies in the HDA with each being operable on one set of surfaces, i.e., "volume", of the stack of disks. An example of this approach is provided in my U.S. Pat. No. 5,343,347. Another approach is to provide multiple actuators and multiple sets of heads to simultaneously access different areas of the disks. Some examples of this approach are provided in my U.S. Pat. No. 5,343,347 and U.S. Pat. No. 5,223,993.

The assembly methods conventionally used are complex, cumbersome and prone to error and therefore require meticulous attention to detail. For example, the actuators are typically machine formed from a single block of metal, such as aluminum or magnesium, into an "E-block" shape. In other words, the actuator has a cylindrical body portion with a plurality of radially and parallel projecting arms extending at a given angle from the body portion. The cylindrical body portion typically has a central axial bore for receiving a top and bottom bearing assembly therein. The cylindrical body portion rotatably mounted on a stationary spindle mounted to a baseplate via these bearing assemblies. The E-block also typically carries a voice coil motor coil typically extending in a direction opposite that of the arms. This coil fits between a pair of stationary permanent magnet sets mounted in the drive housing so that the actuator coil is free to rotate back and forth in the space between the magnet sets through a limited arc. The coil mass offsets the head arm mass thus the actuator is balanced. Current fed through the voice coil produces a reactive torque on the actuator commensurate with the magnitude and direction of current to rotate the actuator to and from a desired position.

Each actuator arm carries either one or two gimbal mounted read/write heads. The heads are carried at one end of a flexure. The other end of the flexure is ball staked to the actuator arm. The flexure with a head mounted thereto is often called a "head gimbal assembly" or "HGA". Conventional actuator arms of the E-block are joined with their head gimbal assemblies by staking all of the HGAs to their respective arms in a single operation. For example, an actuator E-block having 8 actuator arms has to have 14 HGAs held in position on the ends of the arms while a metal ball is shot through the matched aligning holes in the ends of the HGAs and through the ends of the E-block actuator arms. Passage of the ball spreads the metal of the flexure against the walls of the holes in the actuator arms to stake the HGAs in place. This staking operation is extremely prone to error. Error rates increase as the number of actuator areas of the E-block increases. It is extremely difficult to ensure that each of the HGAs is securely fastened to its actuator arm with this method. In addition, if one of the HGAs is not securely fastened to its actuator arm of the E-block, the entire E-block with 14 heads (HGAs) could be discarded. This can get very expensive. Therefore, there is a need for a more uniform assembly technique of HGAs to actuator arms that reduces the likelihood and consequence of defects in manufacturing and assembly.

Another problem with current hard disk drive construction techniques is that although the stack of hard disks is sequentially assembled on the drive motor hub, the actuator is separately assembled as a unit apart from the disk stack with all of the HGAs attached to the actuator arms. A spreader comb must then be inserted between the HGAs to allow the arms and HGAs to be inserted as a unit with the arms between the stacked disks. The comb is then removed and the actuator assembly installed or fastened to the frame of the drive apparatus. With present head and disk media assembly technology the release of the heads from the comb has to occur in the inner diameter of the disk. This operation is extremely delicate and often results in failed heads due to misalignment problems during installation.

Therefore there is a need for a more efficient and compact moving magnet actuator design for high performance hard disk drive systems that can be easily and accurately assembled and disassembled. In addition, there is a need for a high capacity high performance disk drive module having higher disk capacity in a more compact and efficient package.

SUMMARY OF THE INVENTION

A hard disk drive storage system in accordance with the present invention provides an unique new mechanical platform for assembly of a head disk assembly. The system includes a baseplate, a top plate, a peripheral housing sandwiched between the baseplate and the top plate, and a head disk assembly enclosed within the peripheral housing and between the baseplate and top plate, wherein the head disk assembly includes a plurality of spaced apart data storage disks rotatably mounted on a drive motor hub within the peripheral housing, and a plurality of actuator assemblies rotatably mounted to the baseplate and the top plate. Each of the actuator assemblies includes a bearing supported tubular sleeve coaxially mounted over a stationary shaft fastened to the baseplate and the top plate, and a plurality of elongated actuator arm members stacked on the sleeve, each arm having a distal end carrying a read/write head engagable with a surface of one of the disks, and a retaining means on the tubular sleeve for fastening the elongated actuator arm members together in fixed relation to one another on the sleeve.

One embodiment of the present invention includes a plurality of actuator assemblies dimensioned for use in a 3½ inch form factor drive apparatus. Specifically, these actuator assemblies each has arms having a length from head to pivot axis of approximately 2¾ inches.

This first embodiment of the present invention is a 5¼ inch form factor drive apparatus which includes 28 disks and two actuator assemblies, each including 28 actuator arms and head flexures often known as head gimbal assemblies (HGAs). Each of the actuator assemblies preferably has more than one separate voice coil motor, although a single voice coil motor may be used.

The hard disk drive system in accordance with the present invention may also include a third and fourth actuator assembly within the peripheral housing. For example, a second embodiment of the present invention has three actuator assemblies and a total of 27 disks. Each of the three actuator assemblies carries a total of 18 actuator arms and therefore the storage capacity may be divided into three separate volumes of data.

A third embodiment of the present invention is similar to the second, except that it incorporates the use of four separate actuator assemblies, each located in one quadrant of the rectangular peripheral housing. Each of these actuator assemblies is comprised of virtually identical and interchangeable actuator arms, head flexures and spacers. In the second and third embodiments of the apparatus in accordance with the present invention, which include three and four actuator assemblies respectively, the arrangement of actuator arms and spacers in each actuator assembly may be varied to provide a desired volume distribution. For example, in the embodiment with three actuator assemblies, one actuator assembly may include heads oriented to the upper surfaces of the lower two-thirds of the disk stack. A second actuator assembly may have actuator arms oriented so that the heads face the upper two-thirds of the lower surfaces of the disk stack. The third actuator assembly may have actuator arms oriented for the lower one-third of the lower surfaces of the disk stack and the upper surfaces of the upper one-third of the disk stack. Alternatively, one actuator assembly may have heads oriented to the upper surfaces of the entire disk stack and the other two actuator assemblies would split the lower surfaces between them.

Another feature of the present invention is the mechanical assembly method for the hard disk drive system. The procedure basically involves providing a generally planer baseplate and a generally planer top plate and then building up the head disk assembly on the baseplate in sequential layers of actuator arms, spacers, hard disk, and spacer rings. The procedure includes the steps of (a) rotatively mounting a tubular actuator support sleeve coaxially on an stationary actuator shaft fastened to the baseplate, (b) installing an elongated actuator arm on the support sleeve, (c) installing a hard disk on the drive motor hub, (d) installing a spacer ring on the drive motor hub, (e) installing a spacer member on the sleeve, (f) installing another elongated actuator arm on the sleeve, and (g) repeating steps (a) through (f) until a desired number of actuator arms are assembled on the sleeve and the desired number of disks are installed on the disk drive motor hub. The elongated actuator arms are then fastened together onto the sleeve so that the actuator assembly may be rotated as a single unit. The stack of disks and spacer rings on the motor hub are then secured on the drive motor hub. Finally, the peripheral housing is telescopically installed over the assembled head disk assembly on the baseplate and the top plate installed onto the peripheral housing and fastened to the actuator spindles and drive motor spindle.

Another aspect of the present invention is the method by which the head disk assembly components are selected for installation. This method includes separating the elongated actuator arm members, spacers, disks, and spacer rings into at least two and preferably three thickness tolerance categories and then selecting and installing components of the head disk assembly in layers wherein each of the layers contains components taken from only one thickness category. In this way, the total stack height of the actuator assembly and the disk assembly can be maintained in a close tolerance configuration.

For example, the components such as spacer rings, disks, actuator arms, and actuator spacers may be separated into three thickness categories designated "−", "0", and "+". The components would then be placed in appropriate bins according to the tolerance category into which the part falls. Each layer of actuator arm, spacer, disk, and spacer ring would then be assembled from one tolerance category. Preferably, computer controlled assembly apparatus would then select a different tolerance category for the next layer. The process of layer construction is then repeated as the layers are built up on the actuator spindle sleeves and motor hub until an equal number of "−" and "+" layers have been assembled. If there is a total odd number of layers, then the last layer would preferably be selected from the zero tolerance category in order to minimize the accumulative impact of the tolerances on the stack. These and other objects, features and advantages of the present invention will become more apparent from the following detailed description taken in conjunction with the accompanying drawing figures.

The present invention is a high performance high capacity hard disk drive apparatus which includes, in a novel enclosure, a plurality of hard disks, a dual stator disk drive motor for increased motor start and run efficiency and uniform heat dissipation, and a plurality of compact moving magnet type actuator assemblies for positioning read/write transducers over specified tracks of the hard disks. Each of these actuator assemblies includes a moving magnet type of voice coil motor.

The moving magnet actuator assembly in accordance with the invention includes an assembly of at least two magnets fastened together and incorporated into a stacked arrangement of actuator arms alternating with spacers on a rotatable sleeve about a fixed spindle aligned parallel to the central rotational axis of the disks and fastened to a baseplate of the hard disk drive.

One preferred embodiment of the actuator assembly in accordance with a first aspect of the invention includes an arcuate tubular magnet assembly fastened to the stack of actuator arms. This magnet assembly has a central arcuate axis concentric with the actuator spindle axis. The magnet assembly rotates about the actuator spindle axis through a stationary pair of motor coils. Preferably, the magnet assembly encircles and moves along an arcuate, gap closing, magnetically permeable rail which extends along the concentric axis and has each end fastened to the baseplate of the hard disk drive. This arrangement of the moving magnet assembly in accordance with the invention maximizes the area of the stationary coils cut at right angles by the magnetic field of the permanent magnet assembly therefore minimizing the required current to operate the actuator assembly.

A second preferred embodiment of the actuator assembly in accordance with the present invention has a pair of arcuately spaced apart and vertically oriented magnets arranged to rotate concentrically about the actuator spindle axis. Each of the magnets passes between a concentrically spaced pair of fixed return plates connected together by a radially extending coil core. One coil of a pair of stationary coils is wound around each of these cores. Thus each magnet is associated with one coil and one pair of return plates.

In accordance with another aspect of the present invention, the hard disk drive apparatus includes a flexible printed circuit board assembly having a first portion sandwiched between the baseplate and the peripheral housing, a central portion which wraps around one side of the peripheral housing, and a second end portion sandwiched between the peripheral housing and the top plate of the apparatus. The central portion includes a power and interface connector or connectors for connecting the hard disk drive apparatus to external systems. This flexible printed circuit carries all circuit components which make up the drive motor controller and the actuator controller circuitry and provides the necessary connection pads to the dual stator drive motor and each of the plurality of actuator assemblies. The flexible printed circuit board assembly also provides a seal between the head disk assembly and the plates and preferably also separates the discrete electrical components from the head disk assembly. Finally, this flexible circuit board assembly can provide a shock mounting between the base plate, the top plate, and the peripheral housing in order to minimize transmission of mechanical vibration effects.

In accordance with another unique aspect of the invention, the hard disk drive apparatus includes a disk hub and actuator sleeves which each have a center flange against which the disks and actuator arms are assembled axially outwardly along their respective axes in alternating layers of spacers and actuator arms or spacer rings and disks. This assembly method minimizes the cumulative effects of manufacturing tolerances.

These and other objects, features, and advantages of the invention will become more readily apparent from a reading of the following detailed description of the various embodiments when taken in conjunction with the accompanying drawing figures.

BRIEF DESCRIPTION OF THE DRAWING

FIG. 29 is a plan view of a moving magnet actuator assembly in accordance with the first embodiment of the present invention.

FIG. 30A is a sectional view through the moving magnet of the actuator assembly shown in FIG. 29 taken along the line 7—7.

FIG. 30B is a sectional view through an alternative moving magnet structure in accordance with the present invention.

DETAILED DESCRIPTION OF THE INVENTION

The following paragraphs describe several exemplary embodiments of the present invention. Like numerals are utilized wherever possible to identify like components to simplify the description of the various subcomponents and views described herein as well as the several embodiments. It is to be understood that various changes, modifications, and alterations may be made without departing from the scope of the invention as defined by the appended claims.

First Embodiment

General Hard Disk Drive Apparatus Description

The high capacity hard disk drive (HDD) apparatus 10 in accordance with the invention in the first embodiment illustrated in FIGS. 1 through 17 is designed to maximize the amount of available data storage space within a given set of dimensions. This HDD apparatus 10 has dimensions of a full height 5¼ inch form factor drive. It has an industry standard overall length of 8 inches, including an electronics and connector enclosure or box 12. The mechanical components of the drive are contained within a peripheral housing 14 having a length of 7 inches, a width of 5¾ inches, and a height of 3¼ inches. This full height drive preferably has at least 28 5¼ inch hard disks in a head disk assembly (HDA), each capable of storing about 2 gigabytes of data.

Figure 1:
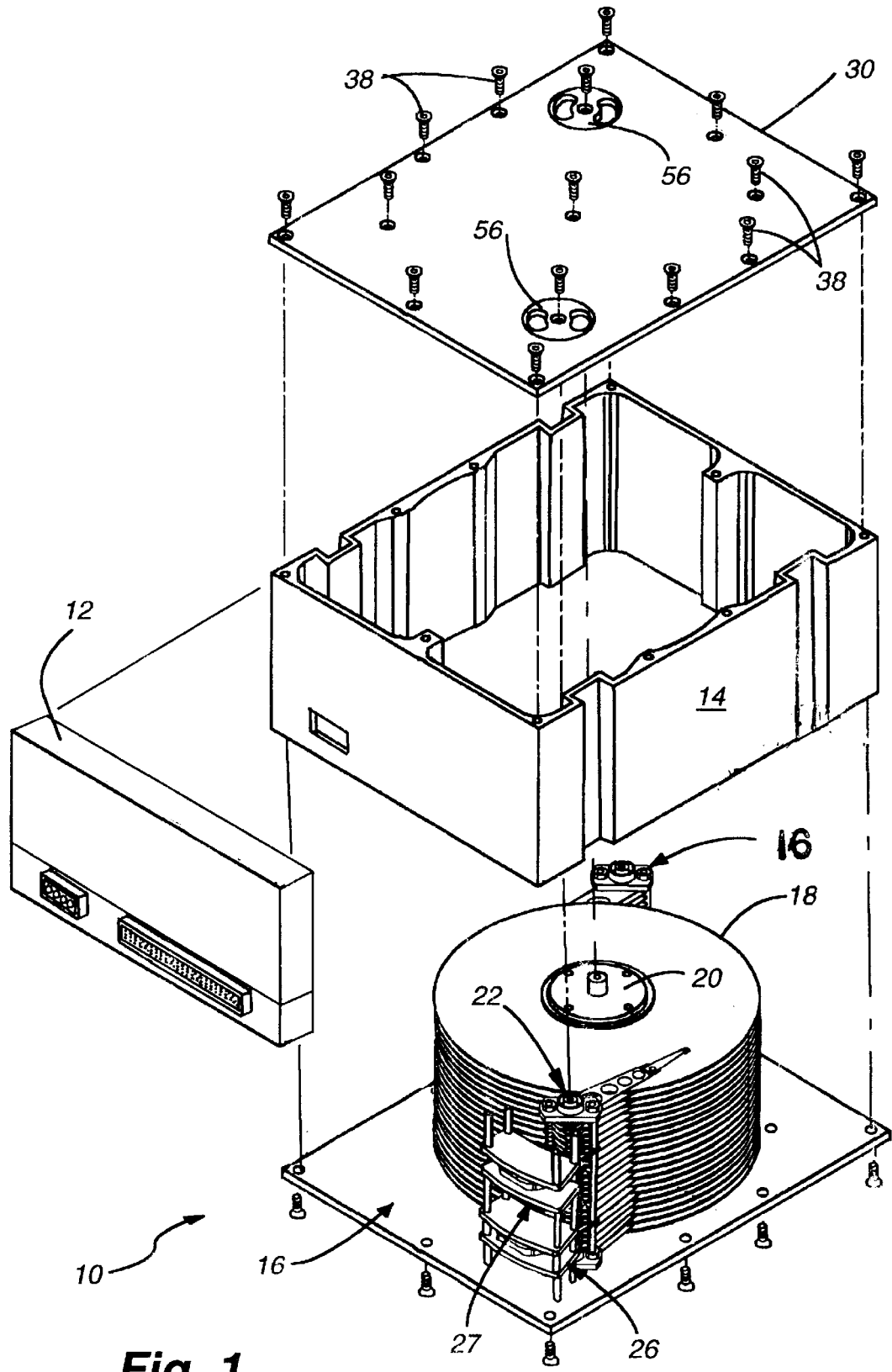
FIG. 1 is an exploded perspective view of the hard disk drive apparatus in accordance with a first embodiment of the present invention.
Figure 2:
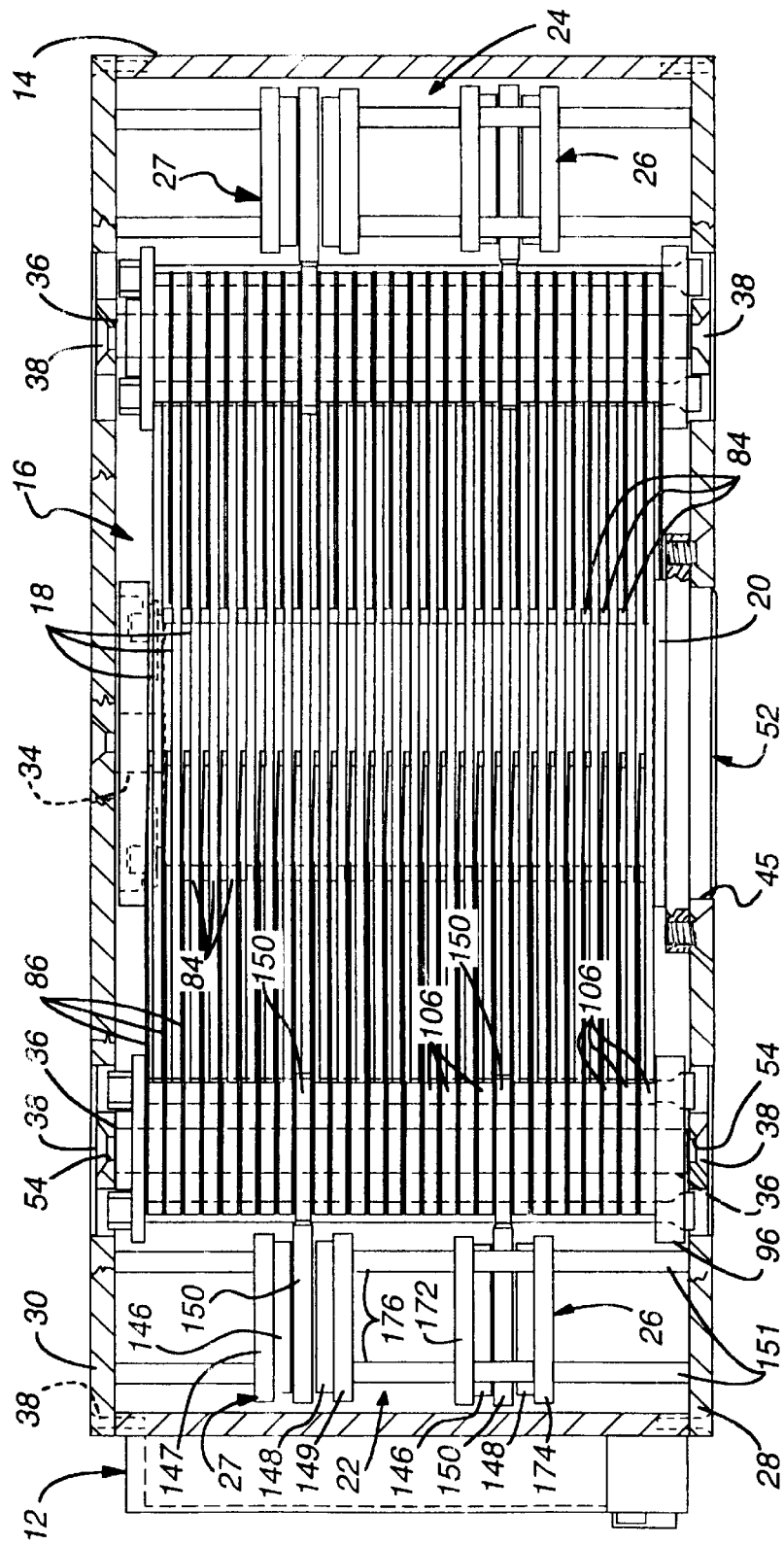
FIG. 2 is a vertical sectional view of the first embodiment of the hard disk drive apparatus in accordance with the present invention shown in FIG. 1 taken along the line 2—2 in FIG. 5.

Only 20 disks are shown in FIG. 1 for illustrative purposes because of the difficulty of drawing such a complex assembly. However, all 28 disks are shown in FIG. 2. All of the electronic components, circuitry and external connectors, except for the head preamplifiers and flex circuit lead wires to the actuators and disk drive motor are contained in the protective box 12 mounted at one end of the drive housing 14.

This box 12 preferably has a height of about 2¾ inches, a width of about 5¾ inches and length of about 1 inch. Along the bottom of the box are mounted standard power, signal and interface control connectors for connection to standard personal computer (PC) power cables and ribbon interface connectors. The connectors may face horizontally away from the housing 14 as is conventional, or may face downward from the electronics box 12. The apparatus 10, including the electronics enclosure 12, has an overall length of 8 inches, the standard for a 5¼ inch form factor drive.

The mechanical platform and components described herein is scaleable between the various industry standard form factors. Accordingly, it is to be understood that the dimensions given herein are illustrative only and are not limitations to the scope of the present invention. These dimensions permit this disk drive apparatus 10 to fit within a conventional tower PC case in a space normally reserved for 5¼ inch form factor drives and/or CD-ROM devices.

Figure 21:
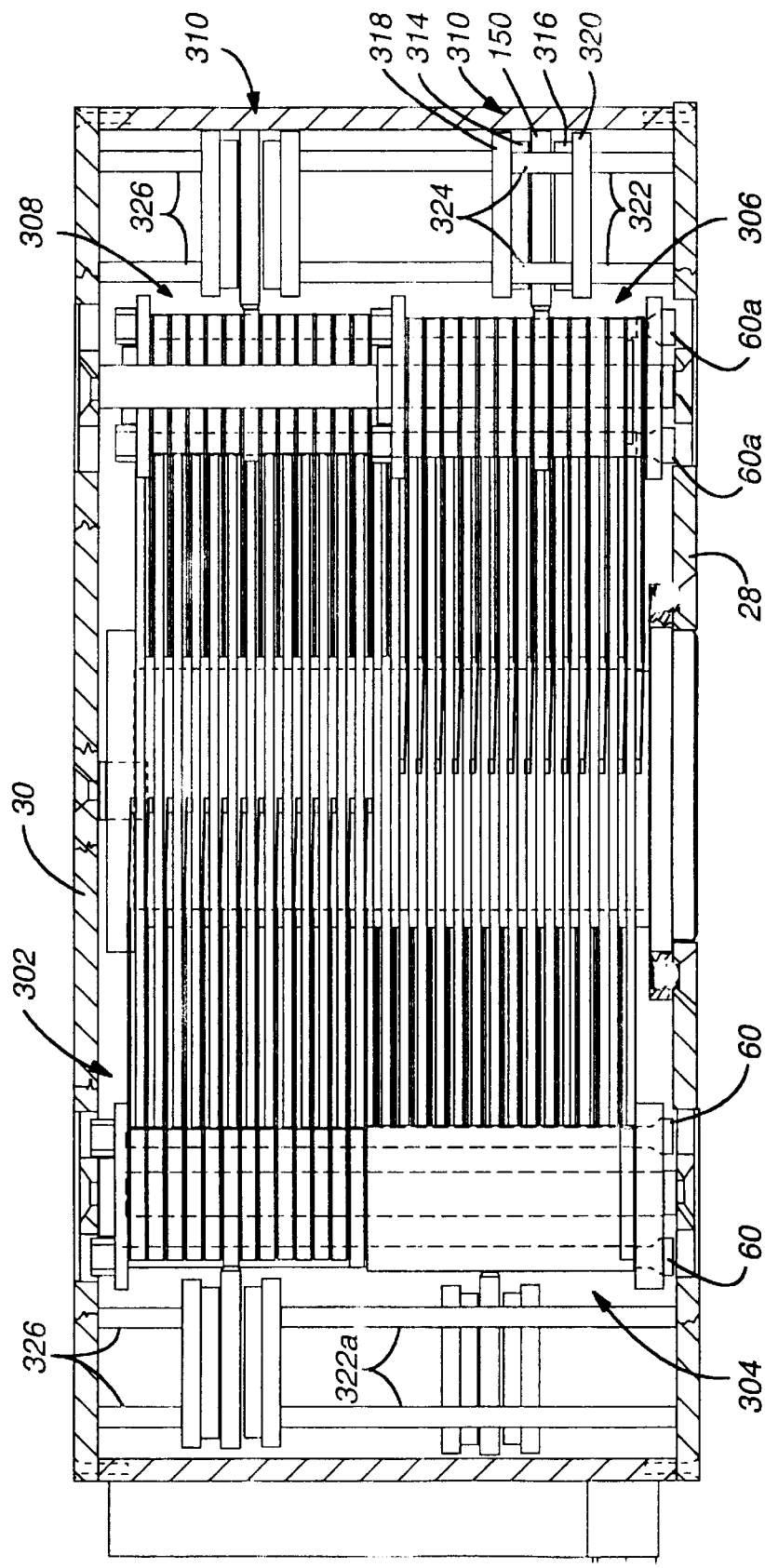
FIG. 21 is a vertical sectional view of the third embodiment of the hard disk drive apparatus in accordance with the present invention shown in FIG. 20 taken along the line 21—21.

The high performance, high capacity HDD apparatus 10 of the invention includes a head disk assembly (HDA) 16 which comprises a plurality of full size 5¼ inch form factor magnetic disks 18 mounted on a hub 20 of a disk drive motor 76. Preferably at least two read/write head positioning actuator assemblies 22 and 24, each utilizing at least one voice coil motor (VCM) 26, and preferably two VCMs 26 and 27 as shown in FIG. 2, are positioned adjacent the disks 18 and generally within two opposite interior corner areas of the HDD apparatus housing 14. One important feature of the present invention is that the size of the actuator assemblies 22 and 24 is the same as in a conventional 3½ inch form factor disk drive apparatus. This permits the overall length and width of the apparatus of the present invention to remain within the 5¼ inch form factor dimensions. In fact, the overall length of the mechanical enclosure, 7 inches, can accommodate four 3½ inch form factor actuator assemblies as is shown in FIG. 21, with the overall length dimension being less than that of a conventional single actuator 5¼ inch form factor drive, including the external electronics box and electrical connectors.

The number of hard disks 18 contained in the head disk assembly 16 in the apparatus 10 of the present invention can be varied. The maximum, however, is dictated by the overall height of the apparatus. This height is dictated primarily by the length of the peripheral housing 14. Tooling changes for different capacity drives assembly are therefore minimized in the present invention because the primary difference between drives is the length of this peripheral housing. Thus a half height 5¼ form factor drive apparatus in accordance with the present invention would have a peripheral housing 14 having a height of about half of that shown in FIGS. 1 and 2. Accordingly, there would be a reduced number of disks, on the order of 14 as opposed to the 28 shown in FIG. 2. The number of disks would also depend on the thickness of each of the disks and the space between the disks required for the actuator arms as will be described in more detail below.

This apparatus 10, with two actuator assemblies 22 and 24, eliminates the need during drive production for the use of a separate clock head to write the servo clock track information to the disks as is conventionally done. Instead, each actuator first writes a clock track on its respective upper or lower surfaces. An externally mounted laser is then focused through apertures 58 on the actuator assembly having heads adjacent to lower surfaces to accurately control the angular position of the actuator. This actuator is used to write the servo tracks on the lower surfaces while the other actuator assembly reads the previously recorded clock track on the upper surfaces, providing the necessary reference during the servo track writing operation. The process is then reversed for writing the servo tracks on the upper surfaces. Thus a separate clock head is not required as is typically necessary in conventional disk drive construction.

Another advantage of the use of two or more actuators is that the spacing between disks is reduced to a minimum because the heads carried by each actuator are all oriented either up or down and thus clearance for only one actuator arm and its head is required between disks. It is to be understood that the structure of the head disk assembly 16 in accordance with the present invention may include only one actuator assembly, necessarily with double heads on each inner actuator arm. However, at least two actuator assemblies are preferred, and three or four actuator assemblies may be also utilized with one being located in each corner of the housing as in FIGS. 18–23. These alternative embodiments are described more fully below.

Baseplate and Top Plate Description

The head disk assembly 16 of the drive apparatus 10 in accordance with the present invention is shown in place on a baseplate 28 in FIG. 1 and in an enlarged side view in FIG. 2. The head disk assembly 16 is enclosed by the baseplate 28 and a top plate 30, with a peripheral, generally rectangular, tubular extrusion housing 14 telescoped over and positioned around the outside of the head disk assembly 16. The HDA 16 includes a disk drive motor stator assembly 52 having a stationary spindle 34 and a rotating hub 20, and two identical actuator spindles 36 which are all fastened to the baseplate 28 via screws 38. The spindle shaft 34 and the two actuator spindle shafts 36 are also fastened to the top plate 30 via additional screws 38. The extrusion housing 14 is similarly fastened to the baseplate 28 and top plate 30 via a series of screws 38 around the perimeter of plates 28 and 30 which are threaded into the ends of the housing 14. During construction of the HDD apparatus 10 of the invention, the head disk assembly 16 is sequentially assembled or built up on the baseplate 28 in sequential layers in accordance with a unique procedure which is described in more detail below.

Figure 5:
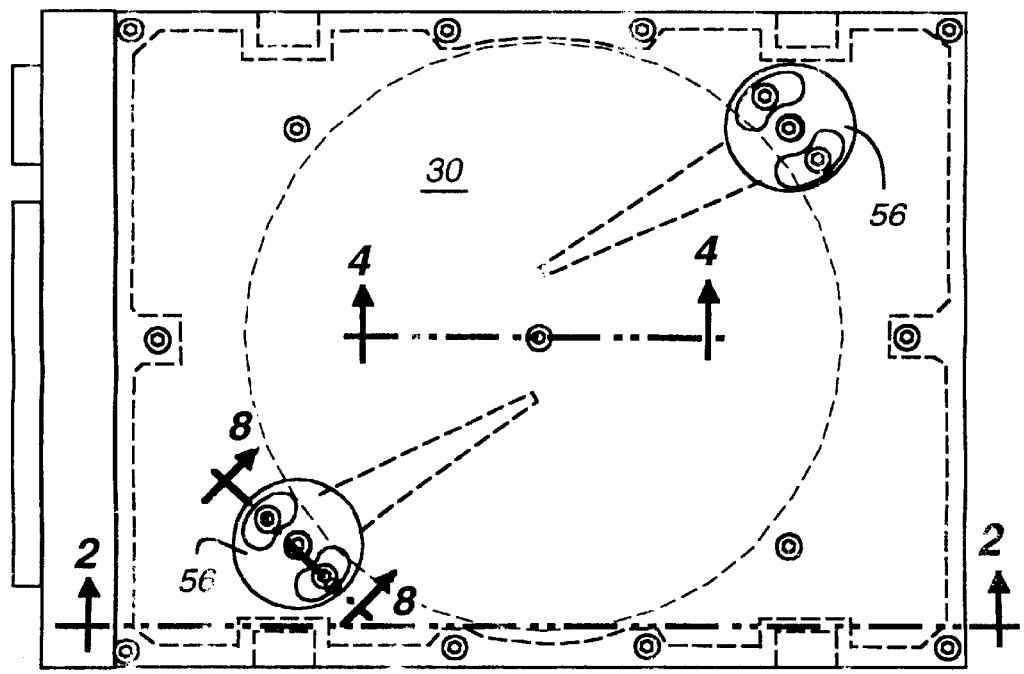
FIG. 5 is a top view of the embodiment shown in FIG. 1.
Figure 6:
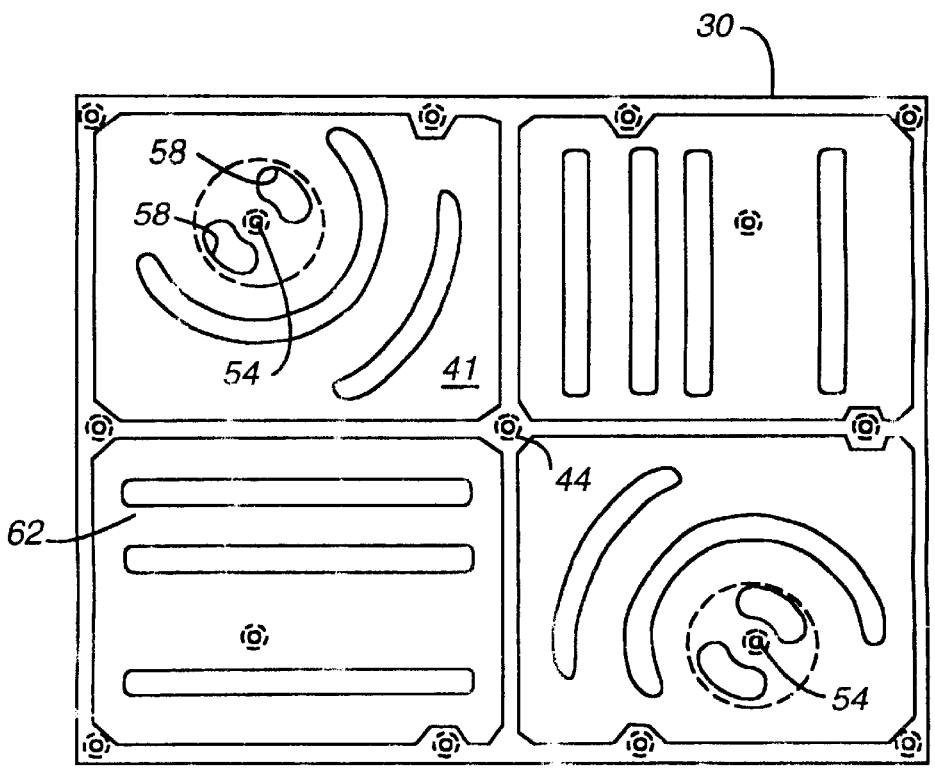
FIG. 6 is a bottom plan view of the top plate shown in FIG. 5.
Figure 7:
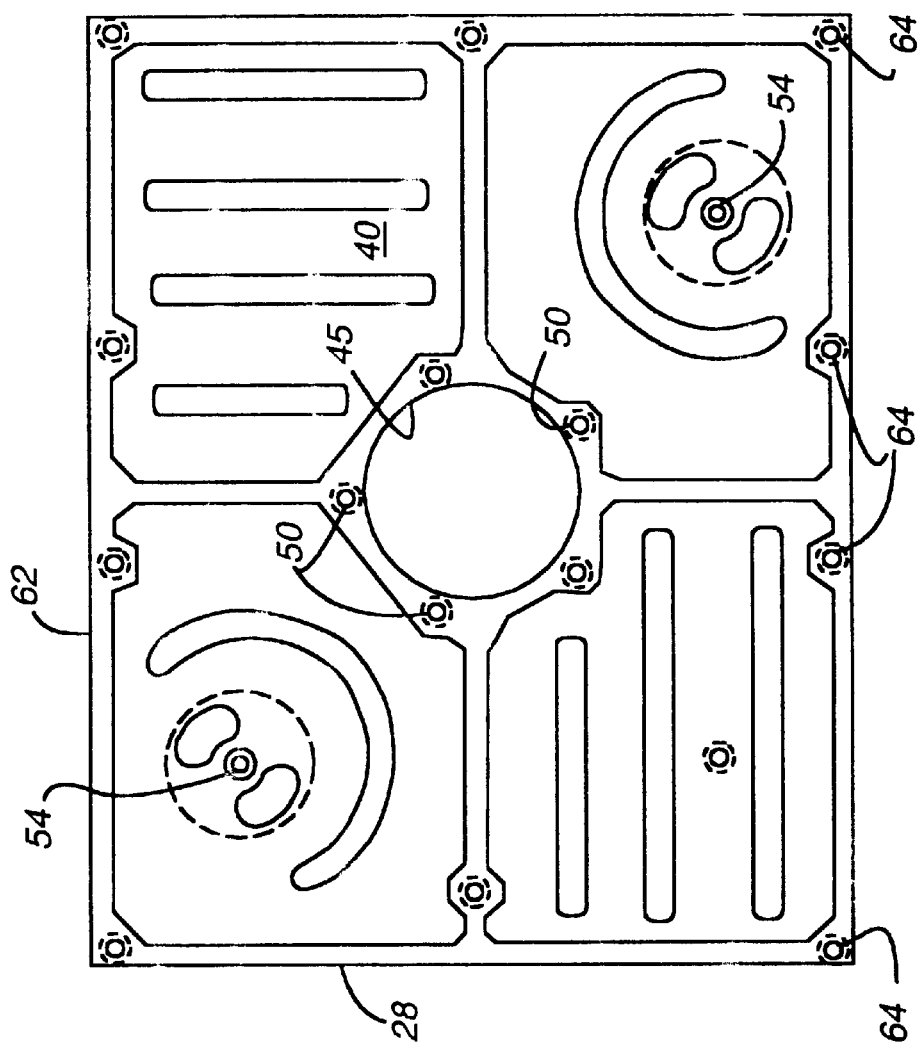
FIG. 7 is a plan view of the upper surface of the baseplate of the embodiment shown in FIG. 1.

The baseplate 28 and the top plate 30 each has a generally rectangular, flat plate shape as is shown in FIGS. 5 through 7. Each plate 28 and 30 is preferably formed of sheet metal and has portions of its inner surface lapped or ground or otherwise finished so as to have uniformly close tolerance planar facing surfaces 40 and 41. The upper surface 40 of the baseplate 28 is particularly ground to establish an accurate base plane or reference plane for installation of the head disk assembly 16 thereon. The lower face 41 of the top plate 30 may be similarly ground to mirror that of the baseplate 28.

The top plate 30 preferably has a hole 44 through the plate at the plate center. The upper end 48 of the disk drive motor spindle 34 is fastened to the top plate 30 via a screw 38 passing through the corresponding center hole 44 in the top plate 30. This minimizes any wobble of the drive motor hub 20 by fixing the spindle at both ends. The baseplate 28 similarly has a center hole 45, but this hole 45 is substantially larger than the center hole 44 and is designed to receive therein the base of the drive motor stator assembly 52.

The center hole 44 in the top plate 30 divides the top plate 30 into four quadrants formed by the intersection of orthogonal planes intersecting at center hole 44. Similarly, the large hole 45 in the baseplate 28 divides the baseplate into four quadrants.

The baseplate 28 has a series of mounting holes 50 symmetrically arranged around the baseplate center hole 45. The mounting holes 50 correspond to mounting holes in the drive motor stator assembly 52 for mounting the spindle drive motor stator assembly 52 to the baseplate 28. The drive motor stator assembly 52 supports the lower end of the motor spindle 34. The size of hole 45 and the particular number of holes 50 and their spacing may differ, depending on the drive motor manufacturer and motor design being installed.

Referring now specifically to FIGS. 6 and 7, two diagonally opposing quadrants of the baseplate 28 and two corresponding diagonal quadrants of the top plate 30 have actuator spindle shaft mounting holes 54 therethrough for receiving screws 38 to fasten the top plate 30 and the baseplate 28 to opposite ends of a pair of actuator spindle shafts 36. The baseplate 28 and the top plate also each have, in their outer surfaces, a counter sunk blind bore 56 around each of the actuator spindle shaft holes 54. Within the blind bores 56 are a pair of spaced arcuate openings 58 through the baseplate 28 and through the top plate 30 symmetrically spaced about the actuator spindle shaft holes 54. The pair of arcuate openings 58 are sized to provide clearance and maintenance access to ends of actuator aligning rods 60. These openings also provide access for the external laser beam to monitor angular actuator position during the servo writing operation described above. The counter bores 56 are each sized to receive a dust cap (not shown) or other closure disk to environmentally seal the apparatus 10 after the servo writing operation.

The perimeter portion 62 of the baseplate 28 and the perimeter portion 62 of the top plate 30 each have spaced holes 64 therethrough for receiving screws 38 to fasten the baseplate 28 and top plate 30 to the peripheral housing 14 when the HDA 16 is completely assembled to form a complete hard disk drive enclosure structure with baseplate 28 and top plate 30. This enclosure structure environmentally seals the HDD apparatus 10 to prevent intrusion of foreign substances which could adversely affect operation of the apparatus 10.

The baseplate 28 and the top plate 30 are physically divided into quadrants by the intersection of two orthogonal planes perpendicular to the plates with the center of the plate marking the inner corners of each quadrant. Each quadrant of the baseplate 28 and each quadrant of the top plate 30 includes a plurality of ridges 68 and grooves 70 formed therein to provide improved the rigidity of each plate. In addition, the shape and position of these ridges 68 and grooves 70 is unique for each quadrant of the plate. These unique patterns are selected and optimized to provide mechanical noise damping and vibration isolation between the actuator assemblies 22 and 24 located in opposite quadrants on the baseplate 28 within the housing 14. The location and shape of these ridges and grooves may vary as the overall shape of the apparatus and number of actuator assemblies in the hard disk drive apparatus changes.

For example, there may be alternating, longitudinal, generally parallel ridges 68 and grooves 70 in one quadrant and transverse ridges and grooves in an adjacent quadrant as is shown in FIGS. 6 and 7. Alternatively, the ridges and grooves may have a different contour from any other quadrant. The ridges and grooves in one quadrant may be oriented so as to form a keyway outline toward and around the location of the actuator shaft mounting hole in that quadrant and a different outline toward or around the location of the actuator shaft mounting hole in the opposite quadrant as is shown in FIGS. 6 and 7. The particular design and location of the grooves and ridges may be experimentally determined or may be determined and optimized by computer modeling of the effects of actuator movement on the HDA structure, the baseplate 28 and the top plate 30. In either case, the presence of these ridges and grooves serves a dual function of providing strength and mechanical damping to the overall structure.

Peripheral Housing Description

Figure 11:
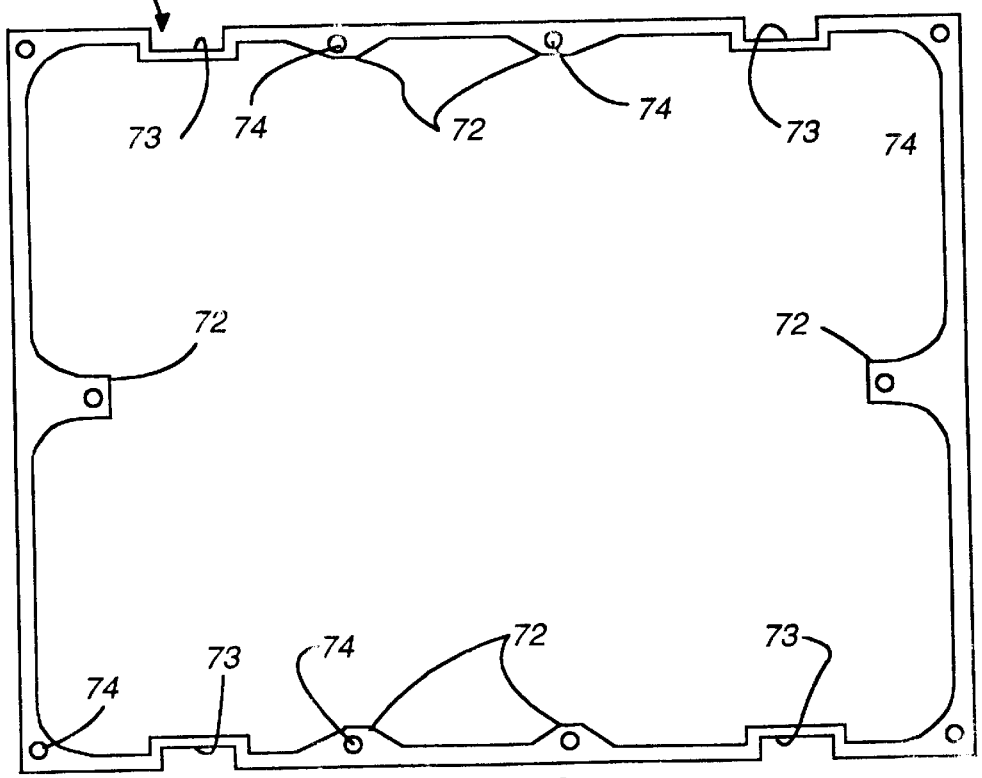
FIG. 11 is a plan view of the peripheral housing.

The peripheral housing 14 is a unitary, generally rectangular, tubular extrusion body as shown in FIG. 1 and on plan view in FIG. 11. It is preferably made of a light metal such as aluminum or it may also be a made of a plastic such as a thermoplastic material. The ends of the extrusion housing 14 are preferably ground flat so as to have parallel end surfaces which orient the baseplate 28 and top plate 30 each on parallel planes in vertical alignment with each other when assembled. Assembly of the peripheral housing 14 to the baseplate 28 and top plate 30 completes the environmental enclosure of the head disk assembly 16. The housing 14 has a plurality of thickened longitudinal bosses 72 extending end to end and which are spaced around the inner periphery of the housing 14 to accommodate threaded bores 74 for structural support and fastening the screws 38 through the perimeter holes 64 in the baseplate 28 and top plate 30 to the housing 14.

Each of the long sides of the housing 14 preferably includes a channel 73 extending the length of the peripheral housing 14. These channels 73 receive a shock absorbing mount strip (not shown) for externally shock mounting the drive apparatus 10 in the computer case (also not shown). This arrangement of shock mounting the apparatus 10 eliminates the need for a separate enclosure over the apparatus 10.

These channels 73 may have straight sides as shown in FIG. 11 or they may have a keyway or "T" shaped cross section to positively retain the shock absorbing strip material in the channels. These channels may alternatively be located on the short sides of the housing 14; however, locating them as shown is preferred.

The peripheral housing 14 is sized to receive and enclose the stack of hard disks 18 and at least two actuator assemblies 22, 24 therein and is sized for minimal weight to structurally support and environmentally contain the head disk assembly 16. The housing also may provide support for the stationary magnets and return plate structures associated with the voice coil motors of the actuator assemblies 22, 24, described in more detail elsewhere in this specification.

A unique feature of the present invention is that the number of hard disks, and hence the storage capacity of the hard disk drive apparatus, may be increased or decreased simply, primarily by changing the lengths of the peripheral housing 14, the actuator spindle shaft and sleeve length, and the disk spindle and hub length. The embodiment 10 shown in FIGS. 1 and 2 illustrates an example of this feature to contain a maximum number of disks in a conventional full size configuration. This embodiment of the hard disk drive apparatus 10 in accordance with the invention incorporates a head disk assembly 16 having 28 hard disks 18 and 56 actuator arms in a full height 5¼ inch form factor housing 14 which has overall dimensions of 8 inches by 5¾ inches by 3¼ inches in height. Assuming a magnetic storage capacity of 2 Gigabytes per disk, this high capacity hard drive apparatus 10 then has a total storage capacity of 56 Gigabytes.

Disk Spindle Motor Design

The hard disk drive motor 76 in the present invention is preferably an in-hub stator design. The hard disks 18 are mounted on a rotating hub 20 of the motor 76 which in turn rotates about a stationary spindle 34 fastened to the top plate 30. The stator coils and pole pieces of the stator assembly 52 of the motor 76 are stationary and preferably arranged around the central stationary spindle 34 and within the rotating hub 20. The stator coils and pole pieces are arranged preferably in two or three parallel, preferably identical, sets spaced axially around the drive motor spindle. This arrangement distributes the coil current over the length of the spindle. Therefore, current heating which is generated during motor operation will be transmitted to the motor hub uniformly along its length. With uniform heat distribution along the length of the drive motor spindle and motor hub, the adverse thermal effects on the disk stack will be minimized. Each set of stator coils is connected in parallel with the same winding resistances so that the heat generated is relatively uniformly distributed. The rotating hub 20 has a plurality of permanent magnets attached to the inside surface of the rotary hub 20.

During assembly of the apparatus 10, the disk drive motor stator assembly 52 and the motor spindle 34 carrying the rotatable hub 20 are first fastened to the baseplate 28 via screws 38 through holes 50. The hard disks 18 are assembled onto the hub 20 in sequence with the actuator arms as will be subsequently described. The upper end of the spindle 34 is finally attached to the top plate 30 after installation of all internal components of the head disk assembly and the top cover 30 is placed on the housing 14.

Hard Disk Stack Design

Figure 4:
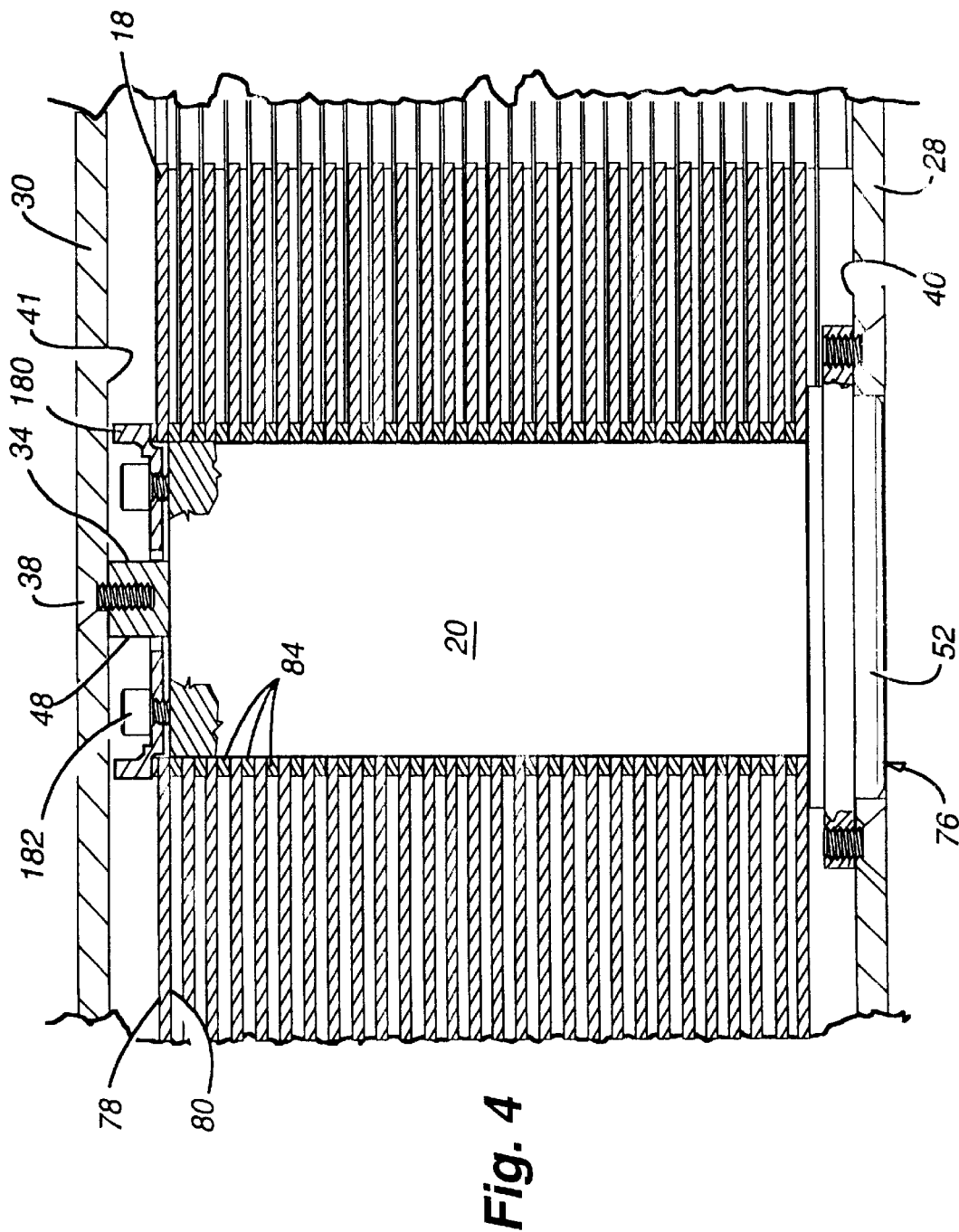
FIG. 4 is a partial sectional view of the hard disk drive apparatus in accordance with the invention taken along the line 4—4 in FIG. 5.

The stack of hard disks on the hub 20 is best shown in the sectional view of FIG. 4 and the side view of FIG. 2. The 28 hard disks 18 are preferably standard sized 5¼ inch diameter disks made of a metal or a ceramic material such as aluminum oxide. Each disk 18 is a flat annular plate having a central aperture 82 therethrough, a flat annular upper surface 78 and a flat annular lower surface 80. Each surface carries a layer of magnetic media deposited thereon for storage of digital information. The central aperture 82 is sized to closely slip over the hub 20 of the spindle drive motor 76 described above. The disks 18 are stacked on the hub 20 and alternately spaced apart by annular spacer rings 84. Each of the spacer rings 84 is a flat annular ring preferably made of the same material as the disk or at least of a material having a similar coefficient of thermal expansion so that adverse thermal expansion effects on the stack of disks 18 and interspersed rings 84 are minimized. Interleaved between adjacent disks 18 is an actuator arm 86 from each of the actuator assemblies 22 and 24, each carrying a read/write head 88. Each spacer ring 84 has a thickness that corresponds to the thickness of the actuator arm 86 plus the minimum required clearance to accommodate the read/write head 88 between adjacent disks 18.

The stack of alternating disks and rings is fastened securely to the hub 20 with an annular retaining ring 180 which is bolted to the hub 20 via a plurality of spaced bolts 182 symmetrically spaced around the top of the hub 20.

Actuator Assembly Design

Figure 8:
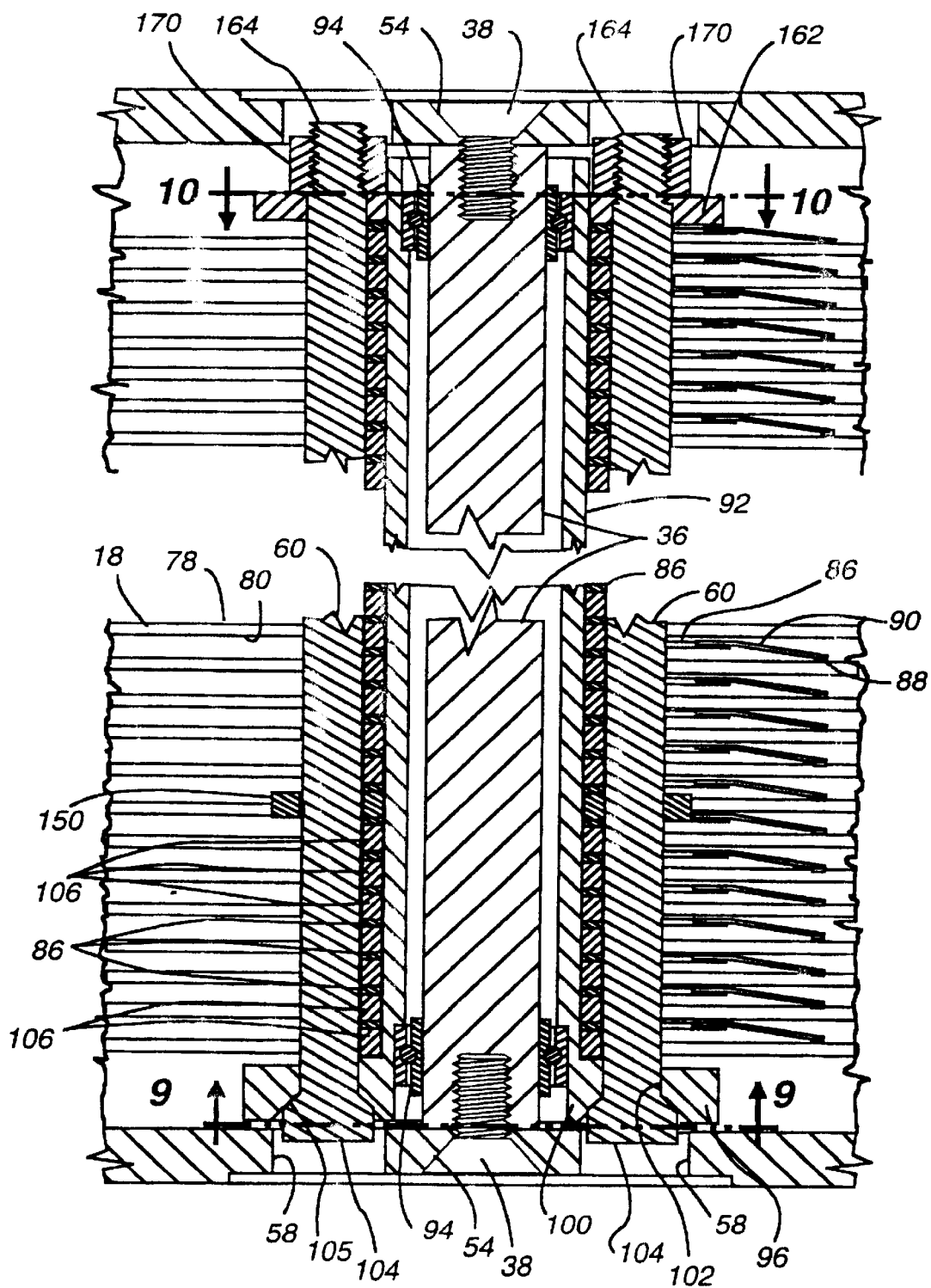
FIG. 8 is a partial vertical sectional view of one of the actuator shaft and sleeve assemblies of the embodiment shown in FIG. 1 taken along the line 8—8 in FIG. 5.

A sectional view of one of the actuator assemblies is shown in FIG. 8. Each of the actuator assemblies 22 and 24 in accordance with the present invention includes a rotatable stack of actuator arms 86 each supporting a read/write head 88 on the free distal end of a flexure 90. Each actuator arm 86 or actuator assembly 22, including a flexure 90 and a head 88, is preferably identical and interchangeable. The actuator arm 86 is shown in a plan view in FIG. 12. Each of the actuator arms 86 is rotatably mounted to an actuator spindle shaft 36 fastened to the baseplate 28 via a concentric, bearing supported tubular sleeve 92.

Figure 9:
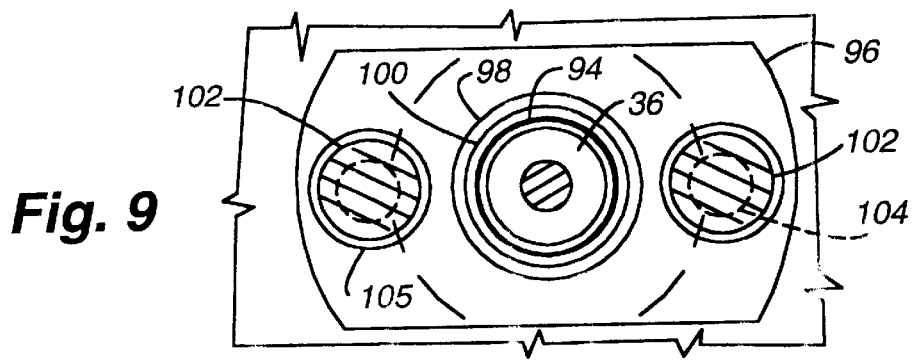
FIG. 9 is a view of the actuator sleeve flange on the actuator assembly taken on the line 9—9 in FIG. 8.

Referring now to FIGS. 8 and 9, the actuator spindle shaft 36 is an elongated generally cylindrical body that is fastened to the baseplate 28 and to the top plate 30 via screws 38 through the actuator mounting holes 54. The tubular sleeve 92 is concentrically supported about the actuator spindle shaft 36 by a spaced pair of bearing assemblies 94. These bearing assemblies 94 are preferably press fit onto each end of the actuator spindle shaft 36 and preferably press fit into the ends of the tubular sleeve 92 after it is telescoped onto the actuator spindle 36 so that the sleeve 92 is free to rotate about the actuator shaft 36.

The lower end 100 of the tubular sleeve 92 has a flat, elongated flange 96 fixed to and extending radially outwardly thereof. This flange 96 is a generally flat, elongated, plate member which is preferably oval or generally rectangular in shape and preferably has rounded opposite ends. This flange 96 has a central aperture 98 therethrough receiving the bottom end 100 of the tubular sleeve 92 therein. This end 100 of the tubular sleeve 92 is securely fastened to the flange 96. The flange 96 and the tubular sleeve 92 may be made of a single piece of material or the flange and sleeve may be separate parts suitably joined to form a unitary structure. This may be accomplished by various methods such as by swaging or chemically bonding the end 100 of the sleeve 92 to the flange 96, or by a threaded connection between the flange 96 and the lower end 100 of the sleeve 92.

As is best shown in FIG. 9, the flange 96 has a pair of spaced holes 102 diametrically centered and symmetrically spaced from the center aperture 98. Referring now to FIG. 11, each of these holes 102 receives an enlarged head 104 at one end of each of the aligning rods 60. The other end of each rod 60 is threaded. Each of the rods 60 is preferably inserted through the hole 102 until its head 104 engages the tapered centering shoulder 105 of the flange 96. The rods 60 are preferably installed on the flange 96 of the assembled sleeve 92 prior to fastening the spindle 36 to the baseplate 28. However, they may alternatively install after fastening the actuator spindle 36 to the baseplate 28 by passing the rods 60 through the arcuate openings 58. The heads 104 may optionally be temporarily or permanently bonded or otherwise fastened to the flange 96 at this point. These holes 102 could alternatively each receive a screw forming the head 104 to each engage a threaded bore in the lower ends of the aligning rods 60 to fasten the lower ends of the aligning rods 60 to the flange 96 so that the rods 60 extends parallel to the axis of the actuator spindle shaft 36 upon which the sleeve 92 is mounted. In either case, the tubular sleeve 92 is centered between the two parallel aligning rods 60. The sleeve 92, aligning rods 60 and the flange 96 may be made of metal such as aluminum or steel, a plastic material, or a ceramic material such as silicon carbide.

The stack of actuator arms 86 in each of the actuator assemblies 22 and 24 preferably consists of alternating layers of separate, generally flat actuator arms 86 and generally flat spacers 106 which are both preferably made of a high strength ceramic material such as silicon carbide. The actuator arm 86 is shown in a plan view on sleeve 92 in FIG. 12. Each of the actuator arms 86 is a generally flat, elongated member having an upper surface 108 and a lower surface 110. The actuator arm 86 has a generally broad proximal end portion 112 and a generally narrow distal end 114 carrying a flexure 90. The actuator arm 86 is preferably symmetrical about its central longitudinal axis. The proximal end portion 112 includes a central aperture 116 therethrough sized to closely slip over the tubular actuator sleeve 92. The proximal end portion 112 preferably includes a set of two pairs of cutouts 118 and 120, each having an included angle of about 90°, on either side of the central aperture 116 to receive the aligning rods 60 therein to radially align and retain the actuator arms 86 in the stack and prevent rotational movement of the arms 86 relative to one another on the sleeve 92. Advantageously, because of the symmetry of the actuator arms, the actuator arm 86 may be flipped over on the sleeve 92 for use of the heads 88 against upper or lower surfaces of the disks.

Figure 17:
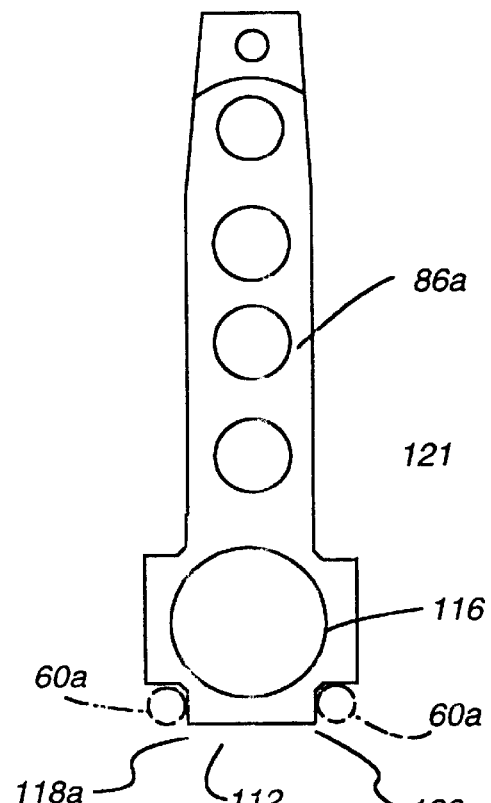
FIG. 17 is an alternative actuator arm in accordance with the invention.

Alternatively, one or both of the cutouts 118 and 120 may be replaced with one or more holes 121 on either side of the central aperture 116 instead of the cutouts or with cutouts 118a and 120a at the proximal end portion 112 of the arm 86a to receive the aligning rods 60 as is shown in the alternative arm 86a in FIG. 17. Also, in this alternative embodiment, the holes for aligning rods 60a in the coil form spacer 150 would be located at the rear of the aperture 152. In this alternative, the flange 96 would have holes 102 spread apart to one side of the tubular sleeve 92.

Referring back to FIG. 12, the central portion 126 of the actuator arm 86 between the distal end 114 and the proximal end portion 112 has a plurality of spaced apertures 127 therethrough. These apertures 127 are optional and serve to reduce the overall weight of the arm 86 and thus reduce the inertial forces which inhibit fast response times in positioning the actuator arm 86 and its head 88 over a particular track on the disk 18.

Figures 12, 13:
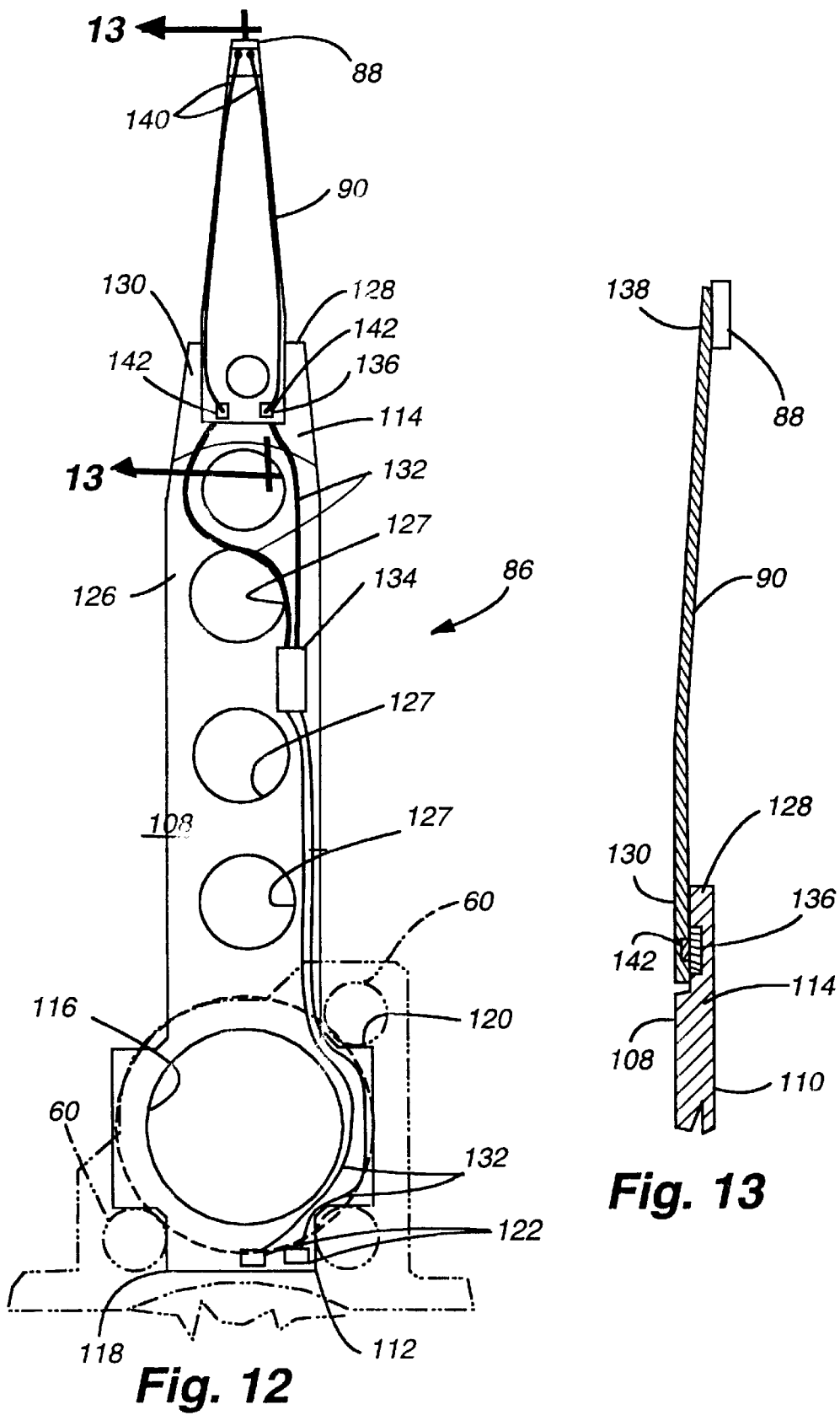
FIG. 12 is a top view of actuator arm and flexure in accordance with the invention.
FIG. 13 is a sectional view of the distal end of the actuator arm and flexure taken along the line 13—13 in FIG. 12.

The distal end 114 of each of the actuator arms 86 preferably has a recessed portion 128 of reduced thickness as shown in FIG. 13 for receiving and mounting one end of the flexure 90. The size and shape of the recessed portion 128 is preferably complementary to that of the rear end portion 130 of the flexure 90. As shown in FIG. 13, the distal end 114 of the actuator arm 86 is recessed in surface 108 so that the thickness of the flexure 90, when taken together with the overlapping distal end 114 of the actuator arm 86, is the same as the thickness of the actuator arm 86. In this way, the necessary axial distance or clearance between the hard disks 18 may be minimized and, correspondingly, a maximum number of disks 18 may be placed within the drive housing.

The recessed portion 128 is preferably formed in the upper surface 108 of the distal end 114 as shown in FIGS. 12 and 13 for the actuator arms 86 to be installed on the actuator assembly 22 having either "up heads" or "down heads". The recessed portion 128 may alternatively be formed in the lower surface 110 at the distal end 114 for actuator arms 86. In other words, the assembled actuator arms 86 are completely interchangeable for use against upper disk surfaces or lower disk surfaces.

The actuator arm 86 preferably has a pair of lead traces 132 embedded in, bonded to, printed on or deposited on either the upper surface 108 as shown in FIG. 12 or on the lower surface 110 of the arm 86. A preamplifier circuit 134 is preferably also mounted on and/or located in series with these traces. The circuit 134 is positioned on the actuator arm surface intermediate of the arm ends 112 and 114 to boost the read signal amplitude from the read/write heads 88. This preamplifier circuit 134 may be embedded in or deposited on the surface of the arm 86 or it may be a separate body bonded to one of the actuator arm surfaces. The circuit could also be located in one of the actual apertures 127 so as not to increase the overall thickness of the arm 86.

The lead traces 132 preferably extend from connection pads 122 on the proximal end 112 to the distal end 114 of the actuator arm surface 108. The traces 132 terminate in the recessed portion 128 of the distal end 114 at a pair of interface pads 136 which electrically connect to conductive portions of the flexure 90. Alternatively, the actuator arm 86 may have a longitudinal groove in one surface, or along one edge, to receive and retain physical lead wires coming directly from the read/write head 88. In this case, the preamplifier circuit could alternatively be mounted on the proximal end portion 112 of the actuator arm 86 adjacent to the connection pads 122.

The flexure 90 is an elongated, generally flat, tapered body having a read/write head 88 gimbal mounted to the narrow end 138 of the flexure 90. The wider rear end 130 of the flexure 90 is mechanically fastened or adhesively bonded to the distal end 114 of the actuator arm 86. The flexure 90 resiliently biases the head 88 against the facing surface of the hard disk 18 when the disks are stationary. During drive operation, the moving air layer immediately adjacent the disk surface lifts the head slightly, establishing a "flying height" of the head 88 close to the disk so that the head does not actually contact the disk surface.

A pair of lead wires or traces 140 from the read/write head 88 are preferably connected to solderless contact pads 142 on the wide rear end 130 of the flexure 90 which in turn mate with the interface pads 136 on the distal end 114 of the actuator arm 86. Alternately, the head 88 may have integral printed lead traces which mate with printed traces deposited on the flexure 90, thus eliminating the need for external lead wires.

Each actuator arm 86 and flexure 90 are separately assembled together with the head 88 before assembly of the actuator arm 86 to the sleeve 92. Each actuator arm 86 can therefore be separately tested prior to actuator assembly to confirm the circuit integrity and evaluate head operational characteristics in advance if desired. Each of the actuator arms 86 is preferably identical to each other. Production cost is therefore minimized as only one head and arm type is required for up head and down head use. Each actuator arm 86 is positioned at the same location radially on the rotatable tubular sleeve 92 by interaction between the edges of the cutouts 118 and 120 and the aligning rods 60 during installation of the actuator arm 86 over the tubular sleeve 92 via central aperture 116.

Figure 14:
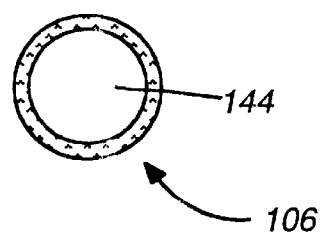
FIG. 14 is a plan view of an actuator spacer in accordance with the invention.

An actuator spacer 106 is shown in plan view on the sleeve 92 in FIG. 14. Each arm 86 is axially spaced from an adjacent arm by one of the spacers 106. Each spacer 106 is an annular flat plate, preferably made of the same material as the actuator arm 86 such as a ceramic, for example, silicon carbide, having a central aperture 144 sized to closely receive the tubular sleeve 92 therethrough. Each spacer 106 also preferably has its upper and lower surfaces textured for frictionally gripping the adjacent actuator arms 86.

Figure 15:
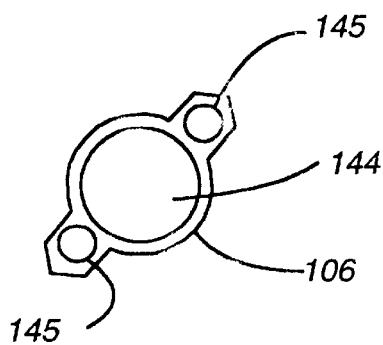
FIG. 15 is a plan view of an alternative actuator spacer in accordance with the invention.

Alternatively, the spacer 106a outside dimensions may be slightly enlarged to form tabs on opposite sides of the central aperture 144 as shown in FIG. 15 which have holes 145 therethrough which receive the aligning rods 60. This alternative arrangement can provide additional rigidity to the overall actuator assembly, although increasing the mass of the overall structure slightly. The thickness of each actuator spacer 106 or 106a preferably corresponds to the thickness of the hard disk 18 utilized in the head disk assembly 16.

The actuator assemblies 22, 24 each preferably includes at least one voice coil motor (VCM) 26 to position the actuator arms 86 and heads 88 at the desired radial location over the disks 18. This VCM, shown in side view in FIG. 2, has upper and lower fixed permanent magnets 146 and 148 attached to the baseplate 28 and/or to the housing 14 and a voice coil form 156 attached to the rotatable tubular sleeve 92 via a coil form support spacer 150.

Figure 16:
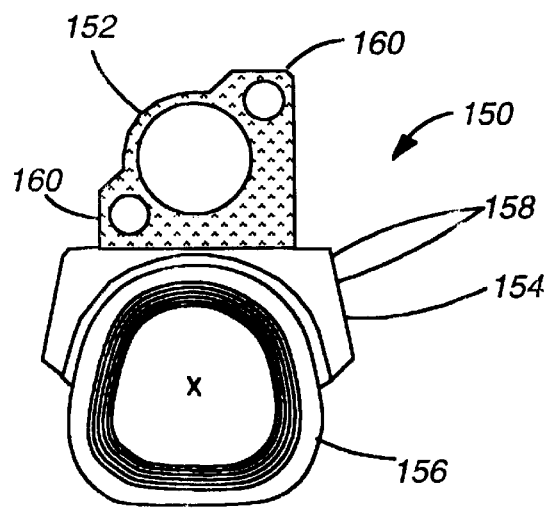
FIG. 16 is a plan view of the coil form support spacer in accordance with the invention.

The spacer 150 is shown in a plan view in FIG. 16. The coil form support spacer 150 is an elongated body of the same thickness as the actuator spacer 106 described above. It has a central aperture 152 therethrough sized to fit over the tubular sleeve 92 and also has a pair of spaced arms which extend laterally from the portion of the elongated body around the central aperture 152 to form a generally "U" shaped yoke 154 sized to receive and carry a conventional flat voice coil form 156. The coil form 156 is preferably adhesively bonded to the yoke 154. This coil form support spacer 150 is positioned vertically in the stack of alternating actuator arms 86 and spacers 106 at a stack position immediately adjacent the gap between the fixed permanent magnets 146 and 148 of the VCM 26 so that the coil form 156 can alternately pass back and forth between the VCM magnets in response to current fed to the coil form 156, and therefore the actuator arm assembly 22 or 24, can freely rotate about the actuator axis. This coil form support spacer 150 also has a pair of contact pads 158 thereon for connecting the lead wires of the coil form 156 to a flexible cable leading to an actuator drive circuit (not shown) contained in the electronic circuit box 12.

The coil form support spacer 150 preferably has a pair of spaced holes 160 diametrically on opposite sides of the central aperture 152. These holes 160 receive the aligning rods 60 therethrough so that the spacer 150 completely engages the rods 60. This arrangement precludes any rotational slippage of the actuator stack and confines the rods 60 to prevent radial outward movement or bowing of the rods 60 when the coil form is rapidly thrust back and forth between the magnets during seek operations. This arrangement also facilitates the transfer of torque from the VCM uniformly to all actuator arms 86 via the aligning rods 60 engaged with the cutouts 145 on the actuator arms 86.

The coil form support spacer 150 may alternatively have notched cutouts instead of the holes 158. In this case, it would be preferable if at least some of the spacers 106 in the stack have holes as in FIG. 15 for the aligning rods 60 rather than notches or cutouts 118 and 120 in order to minimize any outward distortion or bowing of the aligning rods 60 during actuator operation as mentioned above.

Figure 10:
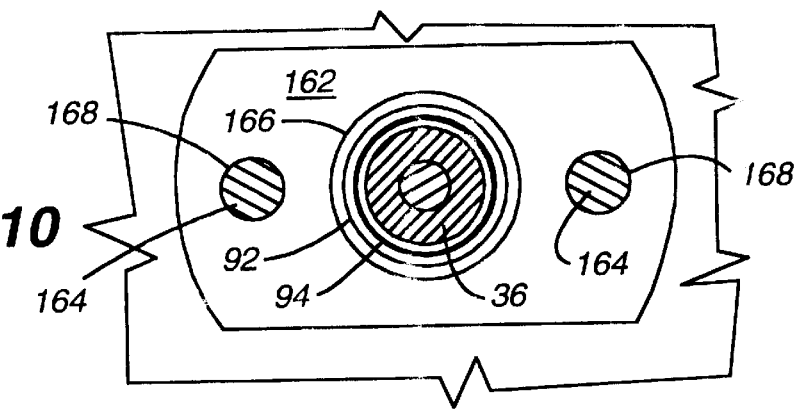
FIG. 10 is a view of the top plate of the actuator assembly taken along the line 10—10 in FIG. 8.

Referring now to FIGS. 8 and 10, at the top of the stack of alternating actuator arms 86 and spacers 106 and 150, is a retainer plate 162 which is secured to upper ends of the aligning rods 60 to retain the entire stack together in fixed position on the tubular sleeve 92. This retainer plate 162 is preferably an elongated flat plate member which again has a central aperture 166 sized to receive the upper end of the tubular sleeve 92 therethrough. The plate 162 has a pair of holes 168 spaced symmetrically and diametrically in opposite sides of the central aperture 166. The retainer plate 162 is preferably positioned on the sleeve 92 in vertical alignment with the lower flange 96 so that the holes through the flange 96 at the lower end of the tubular sleeve 92 are aligned with the upper plate holes 168. The upper ends 164 of the aligning rods 60 pass through these holes. The upper ends 164 of the aligning rods 60 are preferably threaded and are then secured to the retainer plate 162 with clamping nuts 170. The actuator arms 86, actuator spacers 106 and coil form support spacers 150 are thus drawn and held together and fastened securely to the sleeve 92 as these nuts 170 are tightened.

Returning now to FIG. 2, the VCM stationary magnets 146 and 148 are mounted to a pair of upper and lower return plates 172 and 174 respectively. Both the magnets and their return plates are conventional in design for a 3½ inch form factor drive actuator. The lower return plate 174 and magnet set 148 are fastened to the baseplate 28 via appropriate standoff spacers 151. Alternatively, the lower return plate 174 may be fastened to the inner wall of the peripheral housing 14. In either case, the upper magnet set 146 and return plate 172 may be either bolted or otherwise fastened to the lower return plate 174 via appropriately sized standoff spacers (not shown) or alternatively bolted or otherwise fastened to the peripheral housing wall 14 directly above the lower magnet set 148.

The upper and lower magnet sets 146 and 148 each contain a pair of generally truncated, wedge shaped, plate magnets arranged side by side on each return plate. The magnets having opposite polarity faces are arranged in a common plane and face the opposite polarity faces of the pair of magnets lying in an opposite parallel plane. The VCM coil form 156 carried on the coil form support spacer 150 is located axially in the stack so that it is free to rotate between the upper and lower magnet sets.

A second VCM 27, comprising a coil form support spacer 150 and a second set of VCM magnets 146 and 148, as shown in FIG. 2, is mounted on a second set of upper and lower return plates 147 and 149 and is positioned above the first VCM just described. This second set of magnets and return plates is mounted in stacked relation to the first VCM magnet assembly via standoffs 176. The positions of the first and second VCM coilforms 156 and coil form support spacers 150 are preferably equidistant from the upper and lower ends of the stack of actuator arms 86 on the sleeve 92.

The use of two VCMs in each actuator assembly 22 and 24 provides several advantages. First, the torque applied to the actuator arm stack on the sleeve 92 is more evenly distributed. Second, the currents sent to each coil form may be independently determined and selected to optimize the seek times between tracks. Third, current may be fed to each coil form in opposite directions when the correct actuator position is sensed to lock the actuator and heads on track. Fourth, the physical size of the coilforms used and, correspondingly, the physical size of the magnets and return plates may be reduced, thereby permitting the actuator assembly to occupy a smaller area of the baseplate 28.

As with the first VCM, the second VCM magnets and return plates may alternatively be mounted to the housing 14 rather than to the baseplate 28. In this alternative case, the first and second magnet sets and return plates would preferably be separately assembled into a stacked set or subassembly unit and then slipped over the two coilforms 156 after the HDA assembly is built up but prior to installation of the peripheral housing 14. The housing 14 would then be telescoped over the HDA 16 and secured to the baseplate 28 with screws 38 through the peripheral holes 64 into the bores 74 in the peripheral housing 14. The return plates 147, 149, 172 and 174 could then be bolted to the housing 14 via appropriately positioned holes (not shown).

The actuator assemblies 22 and 24 thus formed each creates an integral, unitary structure functionally similar to a conventional actuator "E-block" actuator assembly without the expense and complexity of machining or otherwise forming the complex "E" block arm structure from a single piece of material. Further, each of the flexures 90 is assembled to its actuator arm 86 separate from the entire assembly of the stack, thereby simplifying the construction and vastly improving the reproducibility and reliability of the assembled arm/flexure structure.

It is to be understood that the actuator assembly of the present invention disclosed herein is merely representative of one embodiment. Other schemes of fastening the stack of actuator arms and spacers to the sleeve are envisioned. For example, the sleeve 92 could include a longitudinal keyway and each of the actuator arms and spacers would, in this case, have a corresponding key portion extending radially into the central aperture. The stacked arms and spacers would then be slipped into the sleeve and thus keyed in vertical alignment, thereby eliminating the need for the aligning rods 60. Alternatively, the keyed components could be reversed, with a key slot formed in the central aperture of each actuator arm and spacer. A corresponding longitudinal rib on the sleeve would engage the slots in the actuator arms and spacers. In either of these two alternatives, the actuator spacers could be configured without keys or keyways as only the actuator arms and coil form support spacers need to be accurately retained in radial alignment in the stack. In a third alternative, the sleeve 92 could include longitudinal grooves or splines with corresponding ribs or splines on the actuator arms and coil form support spacers and, optionally, on the actuator spacers. Each of these alternatives would eliminate the need for the aligning rods above-described. The upper end of the sleeve 92 would preferably be threaded and a complimentary retainer plate and nut installed on the sleeve to retain the stack of actuator arms and spacers together and in place on the sleeve.

Mechanical Assembly of Hard Disk Drive

The assembly of the hard disk drive apparatus 10 in accordance with the present invention is simple and straightforward, basically comprising building up the head disk assembly in sequential layers of actuator arms, spacers, hard disks, and spacer rings instead of trying to join a preassembled head stack with a preassembled disk stack as is conventionally done. The procedure basically involves mounting at least one actuator shaft 36 and a drive motor having a rotating hub on a baseplate 28 and then performing the following steps:

a) rotatably mounting the tubular actuator support sleeve 92 coaxially on an actuator shaft 36 for rotation of the sleeve 92 about the shaft 36;

b) installing an elongated actuator arm 86 on the sleeve 92;

c) installing a hard disk 18 on the hub 20;

d) installing an actuator spacer ring 84 on the hub 20;

e) installing an actuator arm spacer member 106 on the actuator sleeve 92;

f) installing another elongated actuator arm 86 on the sleeve 92; and g) repeating steps b through f until a desired number of actuator arms are assembled on the sleeve and the desired number of disks are installed on the hub.

In a head disk assembly having two actuators, the method first involves mounting a second actuator shaft 36 and rotating support sleeve 92 on the baseplate.

The method then includes the steps of installing an actuator arm with an upwardly facing head on the first actuator sleeve along with a spacer, a hard disk and then a spacer ring on the motor hub, a spacer and then a second actuator arm with a downwardly facing head on the second actuator sleeve, and repeating these steps until the desired number of disks and actuators have been installed. In a drive apparatus leaving four actuator assemblies, the above method would also include the addition of third and fourth actuator shafts 36 and sleeves 92 along with the necessary steps of actuator arm and spacer addition to build up the third and fourth actuator assemblies as the stack of alternating hard disks and spacer rings is built upon the hub 20.

Bin Picking Method

The resulting stack of actuator arms 86 and hard disks 18 in the head disk assembly 16 must be positioned relative to each other within very close tolerances. The disadvantage with this assembly method is that the errors in thickness are cumulative to the stack height and become especially critical when one is assembling a hard disk drive apparatus having over a dozen hard disks 18. Accordingly, the thicknesses of the actuator arms 92, the actuator spacers 106 and 150, disks 18, and disk spacer rings 84 must be closely controlled. One method of assembly in accordance with another aspect of the present invention uniquely is designed to compensate for these cumulative errors which result from the existence of these parts manufacturing tolerances.

First, all of the actuator arms 86, the spacers 106 and the coil form spacers 150 are sorted into three distinct groups: those that are exactly on spec or nominal in thickness, those that are "−" or of reduced thickness but within tolerance; and those that are "+" or over nominal thickness but within tolerance. The actuator spacers 106 and 150 are then placed within separate bins or containers from which parts are drawn during assembly.

Second, all of the spacer rings 84 for the magnetic hard disks 18 are also separated into three distinct groups: those that are exactly on spec in thickness, those that are "−" or of reduced thickness but within tolerance, and those that are "+" or over nominal thickness but remain within tolerance. The rings 84 are then placed within separate bins or containers from which the parts are withdrawn during the build up of the head disk assembly 16.

Third, each of the actuator arms 86 and each of the disks 18 is similarly evaluated and catalogued for thickness, either "−", nominal, or "+" and deposited in corresponding bins for later use.

After categorizing each of the four basic parts, actuator arm 86, actuator spacers 106 and 150, disk 18, and spacer ring 84 as to its thickness range, the actual drive assembly can begin. First, the drive spindle 34, the hub 20, and the motor stator assembly 52 of the disk drive motor 76 are assembled and fastened to the baseplate 28. Second, the two actuator spindle shafts 36 are fastened via screws 38 to the baseplate 28 and the tubular sleeves 92 and aligning rods 60 assembled onto the shafts 36. Alternatively, the tubular sleeve 92 and bearing sets 94 first may be press fit together onto the actuator spindle shafts 36 and the aligning rods 60 installed on the lower flange 96 separately to form a subassembly which is then mounted to the baseplate 28. Third, the bottom return plate 174 and magnet set 148 of the VCM may be attached to the baseplate 28, if appropriate.

Fourth, assembly of the head disk assembly 16 comprising the actuator arms 86 and hard disks 18 begins. This procedure basically involves the sequential addition of an actuator arm 86 and then an actuator spacer 106 to one sleeve 92, a disk 18 and then a spacer ring 84 to the hub 20, an actuator spacer 106 and then a second actuator arm 86 to a second sleeve 92, and then repeating these steps in series until the stack of disks 18 and arms 86 is complete, with a coil form support spacer 150, having a coil form 156 mounted thereon, inserted on each actuator sleeve 92 at the appropriate heights.

The actuator arm stacks are then secured together by installing the upper retainer plates 162 to the actuator sleeves 92 with nuts 170 on the rods 60. The disks 18 are secured to the hub 20 by installing a hold down ring 180 to the disk motor hub 20. The upper magnet return plate 147 and magnet set may then be installed on the bottom return plate 147 via appropriate spacers (not shown), the peripheral housing 14 telescopically over the HDA and fastened to install the baseplate 28, and the top cover 30 installed on and fastened to actuator shafts 36, the disk spindle 34, and the peripheral housing 14 via screws 38.

Figure 3:
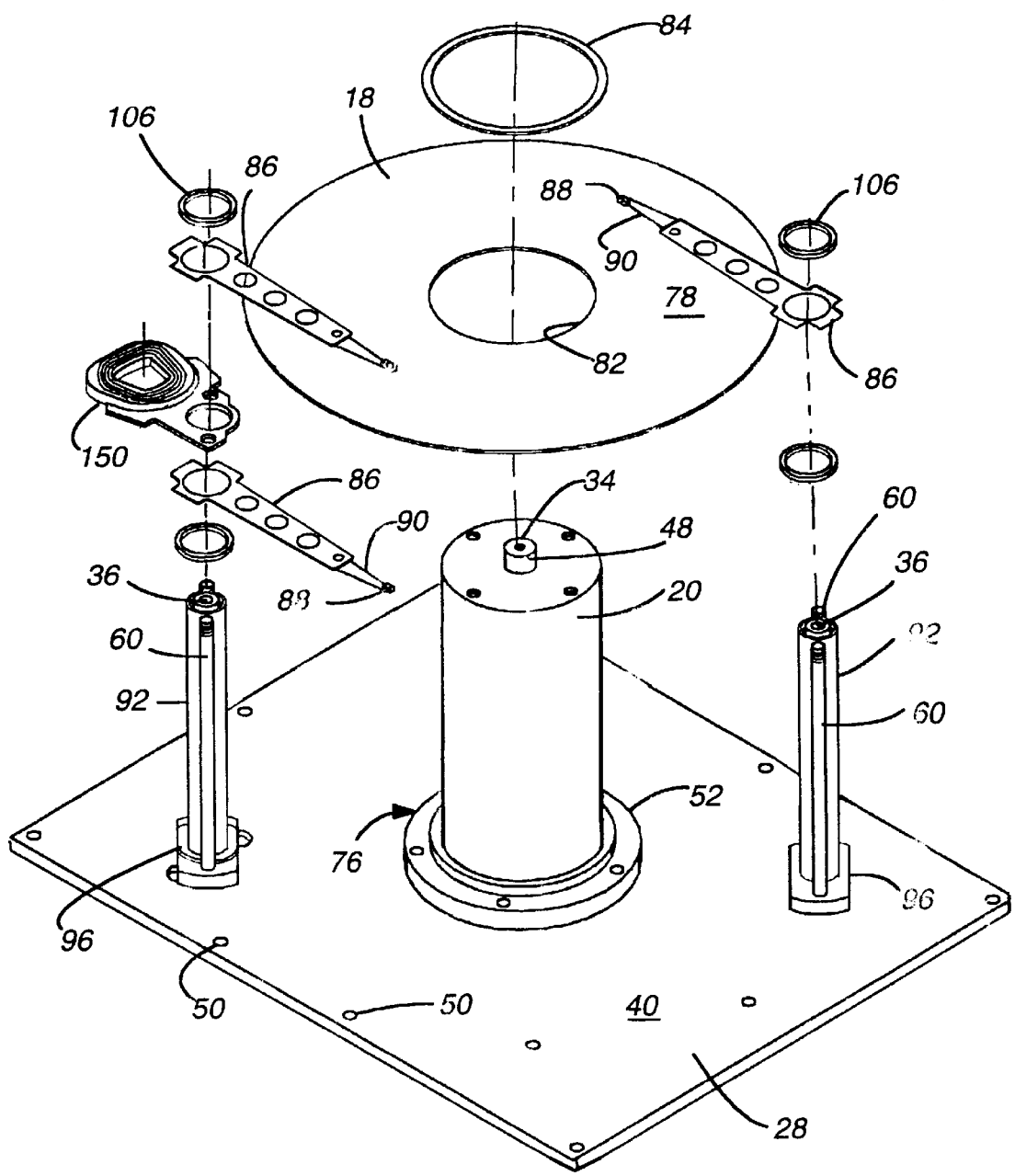
FIG. 3 is an exploded perspective view of the baseplate of the apparatus shown in FIG. 1 with the actuator spindle assemblies and disk driver motor installed.

More particularly, the installation of each layer of actuator arms 86 and disk 18 involves the selective choice of parts from appropriate tolerance bins so that the overall completed height of the stack remains within acceptable limits. This is accomplished in accordance with this aspect of the invention by selecting components in the same layer, i.e. at the same level, from the same tolerance bin during the assembly process. For example, the mechanical assembly procedure may be preferably performed as follows, following assembly of the sleeve 92 subassemblies and installation of these subassemblies on the baseplate 28 and installation of the spindle motor 76 to the baseplate 28 as is shown in FIG. 3:

1. an actuator arm 86 from one tolerance bin (−,0,+) is placed, head up, on a first actuator sleeve 92;
2. a hard disk 18 from a corresponding tolerance bin (−,0,+) is placed on the hub 20;
3. a spacer 106 from a corresponding tolerance bin (−,0,+) is placed on a second actuator sleeve 92;
4. an actuator arm 86 from a different tolerance bin (−,0,+) is placed on the second actuator sleeve 92 with head down;
5. a spacer ring 84 from another bin corresponding to this different tolerance is placed on the hub 20;
6. an actuator spacer 106 from another bin corresponding to this different tolerance is placed on the first actuator sleeve 92;
7. repeat steps 1–6 as many times as necessary to assemble the desired number of disks 18 and actuator arms 86, with one coil form support spacer 150 installed on each actuator sleeve 92 immediately above the position of the lower VCM magnets 148;
8. install and clamp a top retainer plate 162 on the first actuator sleeve 92;
9. install and clamp a top retainer plate 162 on the second actuator sleeve 92;
10. install and clamp a top hold down ring 180 on the hub 20 to secure the hard disks 18 and spacer rings 48 to the motor hub 20;
11. install a first upper return plate 172 and upper magnets 146 to the bottom return plate 174 and magnets 148 so as to sandwich the VCM coil form 156 on the first actuator assembly 22.
12. install a second upper return plate 172 and upper magnets 146 to the bottom return plate 174 and magnets 148 so as to enclose the VCM coil form 156 on the second actuator assembly 24;
13. install the peripheral housing 14 over the assembled head disk assembly 16 and fasten the housing 14 to the baseplate 28;
14. install the top plate 30 to the upper ends of the first actuator shaft 36, the second actuator shaft 36, the spindle motor shaft 34; AND
15. fasten the top plate 30 to the peripheral housing 14 with screws 38 to complete the mechanical assembly of the apparatus in accordance with the present invention.

An apparatus 10 which includes two VCMs 26 and 27 as is shown in FIG. 2 is similarly assembled except that two coil form support spacers 150 are installed on each actuator sleeve 92 during step 7 above and in steps 11 and 12 above, each further include installation of a second VCM comprising a set of lower magnets 148, lower return plate 149 and standoffs 176, to the return plate 172 and then installation of the upper return plate 147 and upper magnet set 146 with appropriate standoff spacers over the upper coil form 150.

Both of the above procedures include selection of an equal number of "−" and "+" layers so that the total stack height tolerance is met.

This "bin picking" method not only ensures that the effect of cumulative errors caused by manufacturing tolerance variations are minimized. This bin picking method also more evenly distributes ports utilization.

This method is particularly suited for automated assembly of the HDA in which robotic assemblers are utilized. The control processor of such an assembler is particularly suitable for storing and keeping track of the number of "−" layers, nominal layers, and "+" layers and execute appropriate bin selection accordingly.

Second Embodiment

Figure 18:
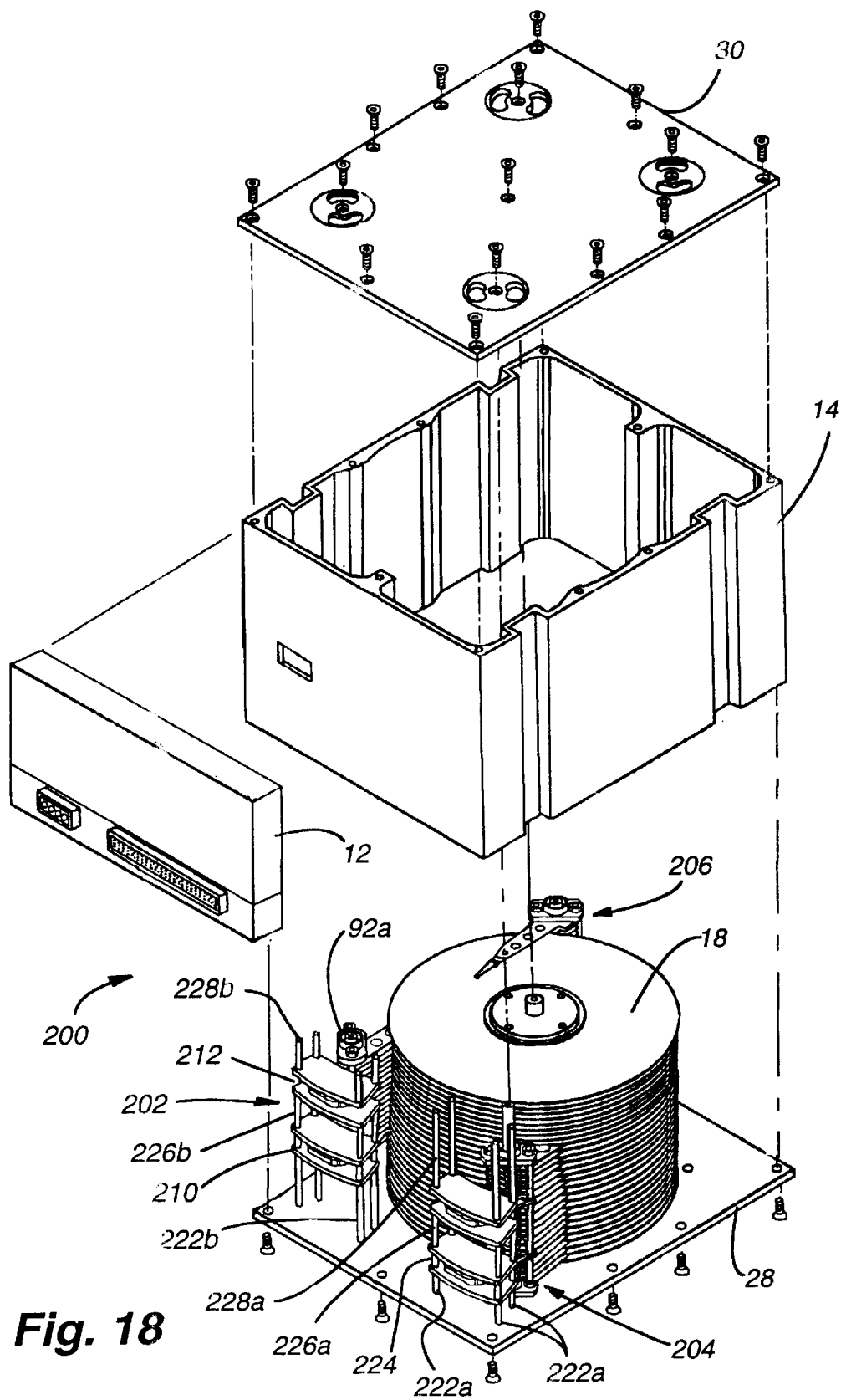
FIG. 18 is an exploded perspective view of the hard disk drive apparatus in accordance with a second embodiment of the present invention.
Figure 19:
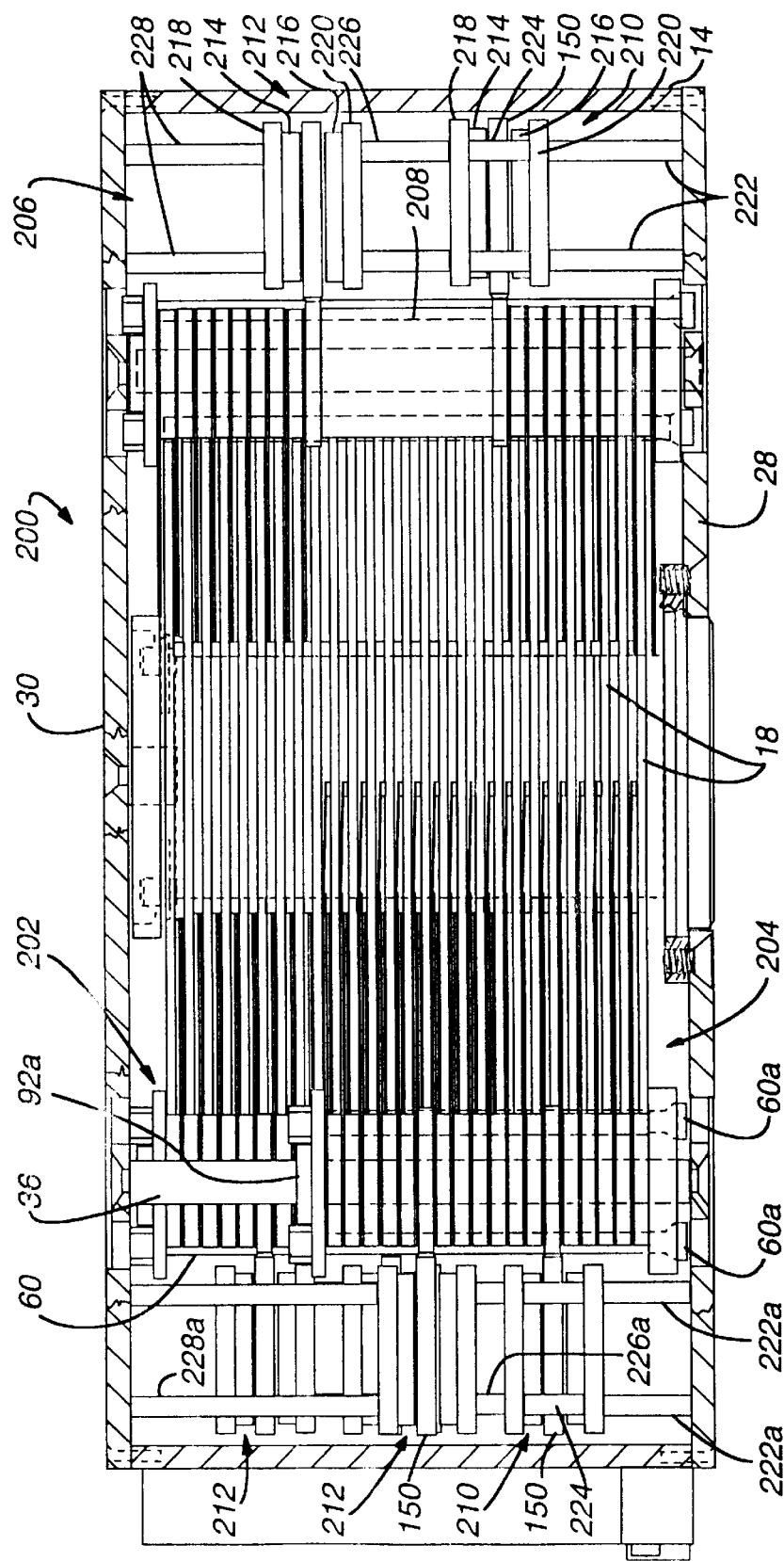
FIG. 19 is a vertical sectional view of the second embodiment of the hard disk drive apparatus in accordance with the present invention shown in FIG. 18 taken along the line 19—19.
Figure 20:
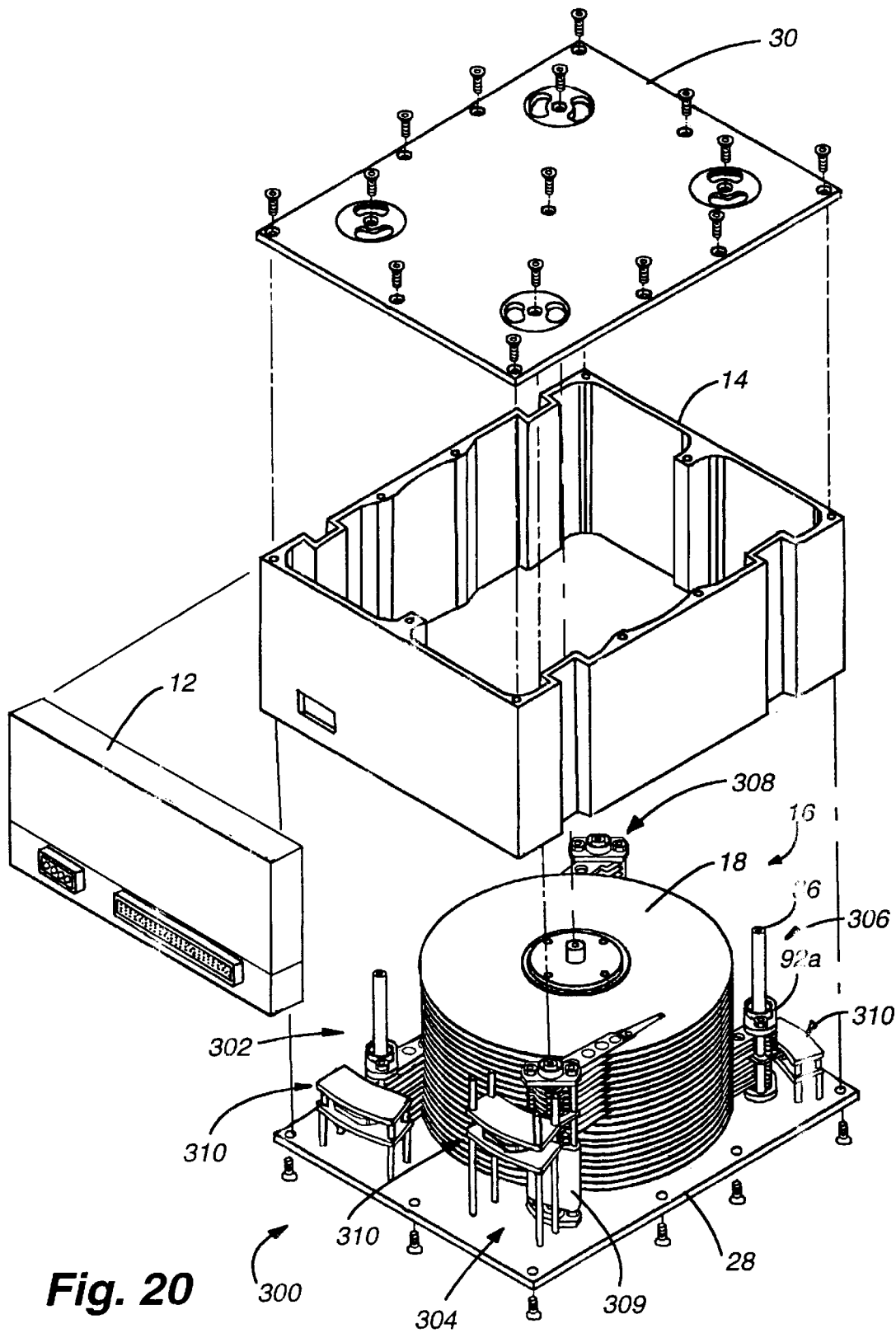
FIG. 20 is an exploded perspective view of the hard disk drive apparatus in accordance with a third embodiment of the present invention.

A second embodiment 200 of the high capacity hard disk drive apparatus in accordance with the invention is shown in FIGS. 18–20. This embodiment is the same as the first embodiment except that there are 27 disks rather than 28, and there are three actuator assemblies. This arrangement permits the drive apparatus to be conveniently set up with three separate volumes of data. Each actuator assembly 202, 204, and 206 carries 18 actuator arms 86 arranged slightly differently in each assembly than in the first embodiment.

Actuator Assembly Design

Each of the actuators 202, 204 and 206 includes a plurality of actuator arms 86 with flexures 90 and heads 88 as previously described with reference to the first embodiment and illustrated in FIG. 12 and 13 except that the heads 88 gimbal mounted to the flexures 90 on the actuator arms 86 in actuator assembly 202 are rotated 180° from the heads mounted on the arms 86 in assemblies 204 and 206. This is because the disk stack rotates in a counterclockwise direction as viewed from above in FIG. 18. The actuator arms 86 are directed against the direction of rotation in assembly 202. Therefore the heads 88 must be reversed from those in actuator assemblies 204 and 206. The spacers and coil form spacers 150 are preferably the same as are shown in FIGS. 14 through 16. However, each of these actuator assemblies carries a smaller number of actuator arms 86 and therefore either may include a spacer having a different spacer length or the guide rods and sleeve may be shorter.

Actuator assembly 202 carries 18 actuator arms for the lower surfaces 80 of the upper 18 disks, with heads up, and a special, thicker spacer 208 placed on the bottom of the stack, against the flange 96. This spacer 208 preferably has the same shape as either the spacer 106 or 106a, except that its thickness is greater. Spacer 208 takes the place of 9 arms 86 and regular spacers 106, since the first nine disks are read and written by the other actuator assemblies 204 and 206.

Similarly, actuator assembly 204 carries 18 actuator arms 86 and spacers 84 for the upper surfaces 78 of the lower 18 disks. The spacer 208 may be positioned at the top of the stack of actuator arms 86 on the sleeve 92. Alternatively, and as shown in FIGS. 18 and 19, this spacer 208 may be omitted if it is replaced by shorter aligning rods 60a and a shorter sleeve 92a. The spindle 36, however, must remain the same length as in the first embodiment since it is fastened to both the baseplate 28 and the top plate 30.

A side view of the second embodiment is shown in FIG. 19. Each of the actuator assemblies again includes a rotatable stack of actuator arms 86 each supporting a read/write head 88 on the free distal end of a flexure 90. Each flexure 90 and a head 88 in each stack is preferably identical and interchangeable. However, the heads 88 on the flexures 90 in the actuator assembly 202 must be reverse mounted on the flexures from those on actuator assemblies 204 and 206. This is because the actuator arms 86 in actuator assembly 202 extend generally opposite, i.e. into the counterclockwise direction of rotation of the disks 18 (as viewed from above) rather than with the direction of rotation as do actuator assemblies 204 and 206.

Each assembled arm 86 is identical to that shown in FIGS. 12 and 13, except as above described and that the arms 86 carrying up heads each has its recessed portion 128 in the lower surface 110. The arms 86 carrying down heads 88 each has its recessed portion 128 formed in the upper surface 108 as is shown in FIG. 12. Each of the actuator arms 86 is rotatably mounted to an actuator spindle shaft 36 fastened to the baseplate 28 via a concentric, bearing supported tubular sleeve 92.

The stack of actuator arms 86 in the actuator assembly 206 preferably consists of alternating layers of separate, generally flat actuator arms 86 and generally flat spacers 106 which are both preferably made of a high strength ceramic material such as silicon carbide. The actuator arm 86 is shown in a plan view on sleeve 92 in FIG. 12. The flat spacers 106 are shown in FIG. 14. These spacers are the same as in the first embodiment 10.

However, in Actuator assembly 206, there are nine actuator arms 86 with up heads 88 and spacers 106 stacked on the sleeve 92 against the lower flange 96 and then a thick spacer 106b. Again, this spacer 106b takes up the height of 9 actuators 86 and normal spacers 106. On top of the spacer 106b is another stack of nine actuator arms 86 with down heads 88 and spacers 106, and a coil form spacer 150. The remainder of the actuator assembly 206 on the sleeve 92 is the same as in the first embodiment and therefore will not be repeated here.

Each of the actuator assemblies 202, 204 and 206 incorporates a set of two VCMs 210 and 212. The VCM stationary magnets 214 and 216 of each VCM are mounted to a pair of upper and lower return plates 218 and 220 respectively. Both the magnets and their return plates are conventional in design and sized for a 3½ inch form factor drive actuator. Referring now specifically to Actuator assembly 206, the lower return plate 220 is fastened to the baseplate 28 via an appropriate length standoff spacers 222. The upper return plate 218 is bolted or otherwise fastened to the lower return plate 220 via appropriately sized standoff spacers 224 or may be alternatively bolted or otherwise fastened to the peripheral housing wall 14 directly above the lower magnet set 216.

As in the first embodiment, the upper and lower magnet sets 214 and 216 each contain a pair of generally truncated, wedge shaped, plate magnets arranged side by side on each return plate. The magnets having opposite polarity faces are arranged in a common plane and face the opposite polarity faces of the pair of magnets lying in an opposite parallel plane. The VCM coil form 156 carried on the coil form support spacer 150 is located axially in the stack so that it is free to rotate between the upper and lower magnet sets.

The second VCM 212, comprising a coil form support spacer 150 and a second set of VCM magnets 214 and 216, as shown in FIG. 19, is mounted on a second set of upper and lower return plates 218 and 220 and is positioned above the first VCM just described. This second set of magnets and return plates is mounted in stacked relation to the first VCM magnet assembly via standoffs 226 preferably bolted or otherwise fastened to the upper return plate 218 of the lower VCM 210. The upper return plate 218 of the upper VCM 212 is preferably not fastened to the lower return plate 220. Instead, the upper return plate 218 of the upper VCM 212 is preferably fastened to the top plate 30 via standoffs 228. It is to be understood that this upper return plate 218 could alternatively be fastened to the lower return plate 220 as in the lower VCM 210.

The actuator assemblies 202 and 204 similarly comprise two VCMs. The only difference between these assemblies and the actuator assembly 206 is the length of the standoff spacers. As can be readily seen in FIG. 19, the actuator assembly 204 VCMs are closer to the baseplate 28. Therefore the standoff spacers 222a and 226a are shorter on actuator assembly 204 than for actuator assembly 206. The top return plate standoff spacer 228a in assembly 204 is much longer. However, the standoff spacers 224 are the same because the space between upper and lower return plates 218 and 220 remains the same. Only the axial position of the VCM changes.

The two VCMs 210 and 212 in actuator assembly 202 similarly differ from actuator assembly 204 only in the length of the standoff spacers 222b and 228b. If the axial stack positions of the coilforms 150 are symmetrical between actuator assembly 202 and 204, these standoff spacers may be interchangeable. In other words, the length of standoff spacer 228a for assembly 204 may be the same as the standoff spacer 222b, etc.

As in the first embodiment, the axial positions of the first and second VCM coilforms 156 and coil form support spacers 150 in actuator assembly 202 actuator assembly 204 are preferably equidistant from the upper and lower ends of the stack of actuator arms 86 on the sleeve 92. In actuator assembly 206, one of the coilforms 150 is positioned about midway in the stack of actuator arms with up heads. The other coil form 150 is positioned about midway in the stack of actuator arms with down heads 88.

There may be other arrangements and volume divisions made for the disk surfaces between the actuator assemblies than as above described in this second embodiment. For example, one actuator assembly may carry actuator arms for all upper disk surfaces with the lower surfaces being divided between the other two actuator assemblies.

Mechanical Assembly of the Second Embodiment

The assembly of the hard disk drive apparatus 200 in accordance with the second embodiment of the present invention having a number of disks equally divisible by three also is simple and straightforward, basically comprising building up the head disk assembly in sequential layers of actuator arms, spacers, hard disks, and spacer rings and then telescoping the peripheral housing over the head disk assembly and securing the top cover 30 in place. The procedure basically involves mounting a first, second, and third actuator shaft 36 and a drive motor having a rotating hub 20 on a baseplate 28 and then performing the following steps:

a) rotatably mounting a tubular actuator support sleeve 92 coaxially on each actuator shaft 36 for rotation of each sleeve 92 about its shaft 36;

b) installing an actuator arm 86 with an upwardly facing head 88 on the first actuator sleeve 92 along with a spacer 106;

c) installing a hard disk 18 and then a spacer ring 84 on the motor hub 20;

d) installing a spacer 106 and then a second actuator arm 86 with a downwardly facing head 88 on the second actuator sleeve 92;

e) repeating steps b) through d) until the desired number of disks 18 and actuators 86 have been installed on the first sleeve 92;

f) installing a multi-layer spacer 208 on said first sleeve 92;

g) installing a multi-layer spacer 208 on said third sleeve;

h) installing an actuator arm 86 with an upwardly facing head 88 on the third actuator sleeve 92 along with a spacer 106;

i) installing a hard disk 18 and then a spacer ring 84 on the motor hub 20;

j) installing a spacer 106 and then a second actuator arm 86 with a downwardly facing head 88 on the second actuator sleeve 92;

k) repeating steps h) through j) until the desired number of disks 18 and actuators 86 have been installed on the second sleeve 92;

l) installing an actuator arm 86 having upwardly facing head 88 and then a spacer 106 on said third actuator sleeve;

m) installing a hard disk 18 and a spacer ring 84 on said hub 20;

n) installing a spacer 106 and an actuator arm 86 having a downwardly facing head 88 on said first actuator sleeve; and o) repeating steps l through n until the desired number of disks and actuators 86 have been installed on said third and first actuator sleeves.

The method in accordance with the invention further includes substituting two of the spacers 106 on each sleeve with coil form spacers 150 at the desired axial locations for the VCMs as the head disk assembly shown in FIGS. 18 and 19 is being built up. After the stacks of actuator arms and disks are built up, the top plates 162 are installed and fastened to the stacks of actuators with nuts 170. The annular disk retainer 180 is fastened to the hub 20 with bolts 182.

Further, the VCM magnet return plates 218 and 220 are installed sequentially as the HDA is built or, alternatively, the return plates, magnets, and standoff spacers may be separately assembled together as subassemblies and then each subassembly installed onto the coilforms 156 of its particular actuator assembly and fastened to the baseplate 28 before installation of the peripheral housing 14.

Bin Picking Method

The resulting stack of actuator arms 86 and hard disks 18 in the head disk assembly 16 must be positioned relative to each other within very close tolerances. The disadvantage with this assembly method is that the errors in thickness are cumulative to the stack height and become especially critical when one is assembling a hard disk drive apparatus having over a dozen hard disks 18. Accordingly, the thicknesses of the actuator arms 92, the actuator spacers 106 and 150, disks 18, and disk spacer rings 84 must be closely controlled. One method of assembly in accordance with another aspect of the present invention uniquely is designed to compensate for these cumulative errors which result from the existence of these parts manufacturing tolerances.

First, all of the actuator arms 86, the spacers 106 and the coil form spacers 150 are sorted into three distinct groups: those that are exactly on spec or nominal in thickness, those that are "−" or of reduced thickness but within tolerance; and those that are "+" or over nominal thickness but within tolerance. The actuator spacers 106 and 150 are then placed within separate bins or containers from which parts are drawn during assembly.

Second, all of the spacer rings 84 for the magnetic hard disks 18 are also separated into three distinct groups: those that are exactly on spec in thickness, those that are "−" or of reduced thickness but within tolerance, and those that are "+" or over nominal thickness but remain within tolerance. The rings 84 are then placed within separate bins or containers from which the parts are withdrawn during the build up of the head disk assembly 16.

Third, each of the actuator arms 86 and each of the disks 18 is similarly evaluated and catalogued for thickness, either "−", nominal, or "+" and deposited in corresponding bins for later use.

After categorizing each of the four basic parts, actuator arm 86, actuator spacers 106 and 150, disk 18, multi-layer spacer 208 and the spacer ring 84 as to its thickness range, the actual drive assembly can begin. First, the drive spindle 34, the hub 20, and the motor stator assembly 52 of the disk drive motor 76 are assembled and fastened to the baseplate 28. Second, the three actuator spindle shafts 36 are fastened via screws 38 to the baseplate 28 and the tubular sleeves 92 and aligning rods 60 assembled onto the shafts 36. Alternatively, the tubular sleeve 92 and bearing sets 94 first may be press fit together onto the actuator spindle shafts 36 and the aligning rods 60 installed on the lower flange 96 separately to form a subassembly which is then mounted to the baseplate 28. Third, the bottom return plate 220 and magnet set 216 of the lower VCMs 210 may be attached to the baseplate 28, if appropriate.

Fourth, assembly of the head disk assembly 201 of the second embodiment 200, comprising the actuator arms 86 and hard disks 18 begins. This procedure basically involves the sequential addition of an actuator arm 86 and then an actuator spacer 106 to a first sleeve 92, a disk 18 and then a spacer ring 84 to the hub 20, an actuator spacer 106 and then a second actuator arm 86 to a second sleeve 92, and then repeating these steps as described immediately above, in series until the stack of disks 18 and arms 86 is complete, with a coil form support spacer 150, having a coil form 156 mounted thereon, inserted on each actuator sleeve 92 at the appropriate heights.

More particularly, the installation of each layer of actuator arms 86 and disk 18 involves the selective choice of parts from appropriate tolerance bins so that the overall completed height of the stack remains within acceptable limits. This is accomplished in accordance with this aspect of the invention by selecting components in the same layer, i.e. at the same level, from the same tolerance bin during the assembly process. For example, the mechanical assembly procedure may be preferably performed as follows, following assembly of the sleeve 92 subassemblies and installation of these subassemblies on the baseplate 28 and installation of the spindle motor 76 to the baseplate 28 as is shown in FIG. 19:

1. an actuator arm 86 from one tolerance bin (−,0,+) is placed, head up, on a first actuator sleeve 92;

2. a hard disk 18 from a corresponding tolerance bin (−,0,+) is placed on the hub 20;

3. a spacer 106 from a corresponding tolerance bin (−,0,+) is placed on a second actuator sleeve 92;

4. an actuator arm 86 from a different tolerance bin (−,0,+) is placed on the second actuator sleeve 92 with head down;

5. a spacer ring 84 from another bin corresponding to this different tolerance is placed on the hub 20;

6. an actuator spacer 106 from another bin corresponding to this different tolerance is placed on the first actuator sleeve 92;

7. steps 1–6 are repeated as many times as necessary to assemble the desired number of disks 18 and actuator arms 86 on both the first and second sleeves 92, optionally with one coil form support spacer 150 installed on the first and second actuator sleeves 92 immediately above the position of the lower VCM magnets 216 (the VCM magnets and return plates may be installed as separate subassemblies to the baseplate 28);

8. a multi-layer spacer 208 is picked from one of said tolerance bins closest to the sum of tolerances so far accumulated, and placed on said first sleeve;

9. a multi-layer spacer 208 is picked from the closest tolerance bin and placed on said third sleeve;

10. an actuator arm 86 from one tolerance bin (−,0,+) is placed, head up, on the third actuator sleeve 92;

11. a hard disk 18 from a corresponding tolerance bin (−,0,+) is placed on the hub 20;

12. a spacer 106 from a corresponding tolerance bin (−,0,+) is placed on the second actuator sleeve 92;

13. an actuator arm 86 from a different tolerance bin (−,0,+) is placed on the second actuator sleeve 92 with head down;

14. a spacer ring 84 from another bin corresponding to this different tolerance is placed on the hub 20;

15. an actuator spacer 106 from a bin corresponding to this different tolerance is placed on the third actuator sleeve 92;

16. steps 10–15 are repeated as many times as necessary to assemble the desired number of disks 18 and total number of actuator arms 86 on the second sleeve 92, with two coil form support spacers 150 installed on the second actuator sleeve 92 at the appropriate axial heights above the position of the lower VCM magnets 216;

17. an actuator arm 86 from one tolerance bin (−,0,+) is placed, head up, on the third actuator sleeve 92;

18. a hard disk 18 from a corresponding tolerance bin (−,0,+) is placed on the hub 20;

19. a spacer 106 from a corresponding tolerance bin (−,0,+) is placed on the first actuator sleeve 92;

20. an actuator arm 86 from a different tolerance bin (−,0,+) is placed on the first actuator sleeve 92 with head down;

21. a spacer ring 84 from another bin corresponding to this different tolerance is placed on the hub 20;

22. an actuator spacer 106 from a bin corresponding to this different tolerance is placed on the third actuator sleeve 92;

23. steps 17–22 are repeated as many times as necessary to assemble the desired number of disks 18 and total number of actuator arms 86 on the first and third sleeves 92, with two coil form support spacers 150 installed on the first and third actuator sleeves 92 at the appropriate axial heights.

The actuator assemblies 202, 204 and 206 are then fastened together as previously described and the disk stack secured with retaining ring 180 and bolts 182. The VCM magnet and return plate assemblies may then be installed on the baseplate 28 if they are separately assembled, and the peripheral housing 14 telescoped over the assembled head disk assembly. Finally, the top plate 30 is fastened to the peripheral housing and the spindles 34 and 36 to complete the assembly also as previously described.

As in the first embodiment above described, the bin picking method of the invention, i.e. picking components for each layer of actuator, disk and spacer from a single tolerance category, minimizes the cumulative effect of manufacturing tolerances on this second embodiment of the invention. Alternatively, the method may include picking from different bin categories only as each complete disk and head combination is repeated during assembly. Thus the actuator arm with up heads, spacer, disk and disk spacer ring, spacer and actuator arm with down heads would all be from one category. The next sequence would be from a different category.

Both of the above procedures include selection of an equal number of "−" and "+" layers so that the total stack height tolerance is met.

Again, this "bin picking" method not only ensures that the effect of cumulative errors caused by manufacturing tolerance variations are minimized. This bin picking method also more evenly distributes ports utilization.

This method is particularly suited for automated assembly of the HDA in which robotic assemblers are utilized. The control processor of such an assembler is particularly suitable for storing and keeping track of the number of "−" layers, nominal layers, and "+" layers and execute appropriate bin selection accordingly.

Third Embodiment

A third embodiment 300 of the high capacity hard disk drive apparatus in accordance with the invention is shown in FIGS. 20–23. This embodiment is the same as the first embodiment, i.e. except that there are four actuator assemblies and the actuator arm distributions are different. This arrangement permits the drive apparatus to be conveniently set up with four separate volumes of data. The apparatus 300 has four actuator assemblies 302, 304, 306, and 308 in the head disk assembly 16. There are 28 disks arranged on the drive motor hub 20 as in the first embodiment.

Each actuator assembly 302, 304, 306 and 308 carries 14 actuator arms 86 arranged slightly differently in each assembly than in the first embodiment.

Actuator Assembly Design

Each of the actuators assemblies 302, 304, 306 and 308 includes a plurality of actuator arms 86 with flexures 90 and heads 88 as previously described with reference to the first embodiment and illustrated in FIG. 12 and 13. The spacers and coil form spacers 150 are preferably the same as are shown in FIGS. 14 through 16. However, each of these actuator assemblies carries a smaller number of actuator arms 86 and therefore either may include a multi-layer spacer 309 having a thicker spacer length or the guide rods 60a and sleeve 92a may be shorter as shown in FIGS. 20 and 21 for actuator assemblies 302 and 306. Actuator assemblies 304 and 308 also carry these multi-layer spacers 309.

Actuator assembly 308 carries 14 actuator arms for the lower surfaces 80 of the upper 14 disks, with up heads, and a multi-layer spacer 309 placed on the bottom of the stack, against the flange 96. This spacer 309 preferably has the same shape as either the spacer 106 or 106a, except that its thickness is greater. Spacer 309 takes the place of 14 arms 86 and regular spacers 106, since the first fourteen disks are read and written by the other actuator assemblies 302 and 306.

Similarly, actuator assembly 304 carries 14 actuator arms 86 with downwardly facing heads 88 and spacers 84 for the upper surfaces 78 of the upper 14 disks and a multi-layer spacer 309 placed on the bottom of the stack, against the flange 96. This spacer 309 again preferably has the same shape as either the spacer 106 or 106a, except that its thickness is greater. Spacer 309 takes the place of 14 arms 86 and regular spacers 106, since the first fourteen disks are read and written by the other actuator assemblies 302 and 306.

Figure 22:
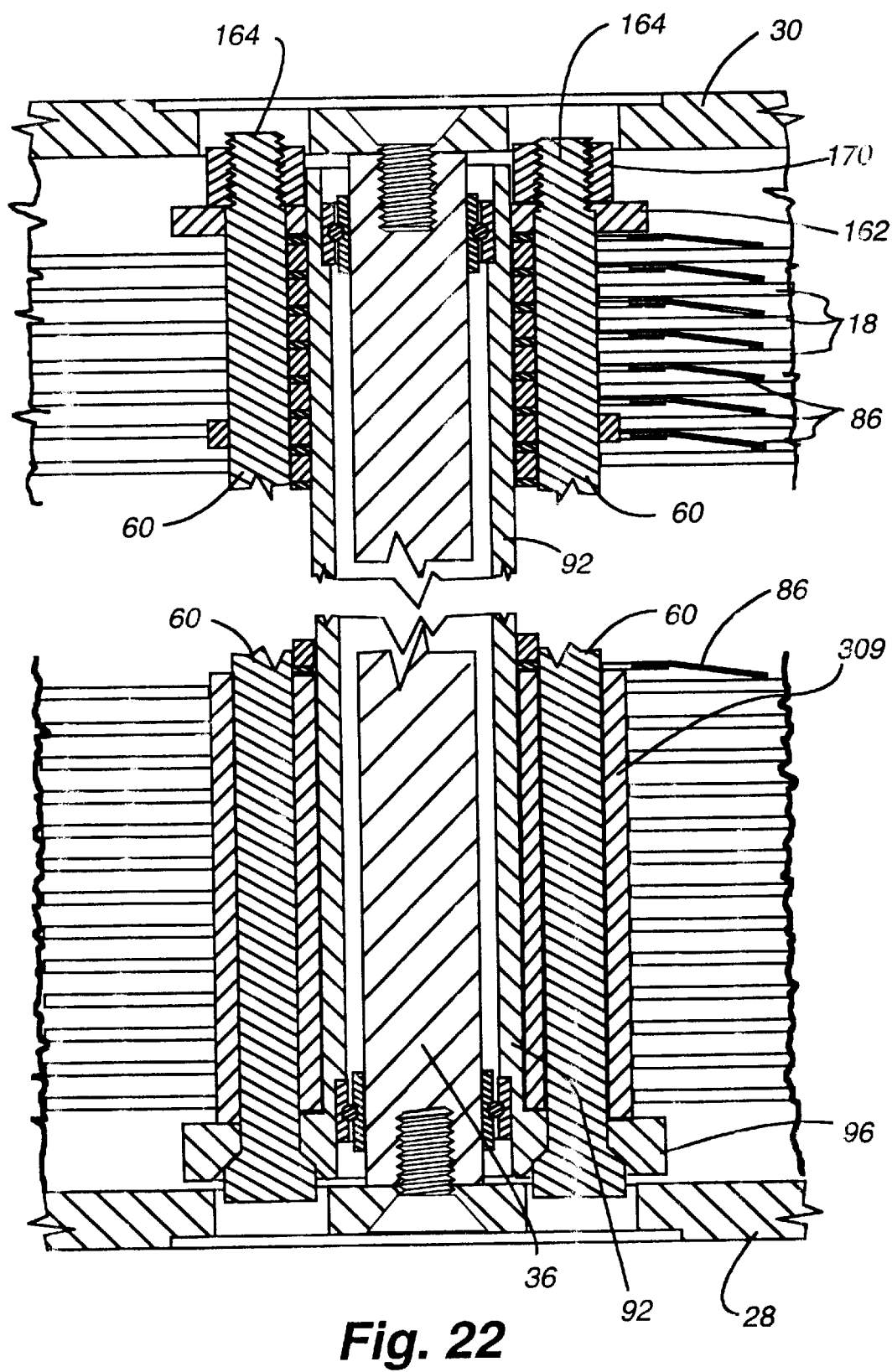
FIG. 22 is a sectional view of one of the actuators in FIG. 20 taken along the line 22—22 in FIG. 22.

Actuator assembly 302 carries fourteen actuator arms 86 with downwardly facing heads 88 and spacers 106 stacked on the flange 96 and the sleeve 92. The spindle 36 extends up to the top plate 30. A spacer 309 may be positioned at the top of the stack of actuator arms 86 on the sleeve 92 or, as shown in FIGS. 21 and 22, this spacer 309 may be omitted if it is replaced by shorter aligning rods 60a and a shorter sleeve 92a. The spindle 36, however, must remain the same length as in the first embodiment since it is fastened to both the baseplate 28 and the top plate 30.

A side view of the third embodiment is shown in FIG. 21. Each of the actuator assemblies again includes a rotatable stack of actuator arms 86 each supporting a read/write head 88 on the free distal end of a flexure 90. Each flexure 90 and a head 88 in each stack is preferably identical and interchangeable. However, the heads 88 on the flexures 90 in the actuator assembly 302 and the actuator assembly 306 must be reverse mounted on the flexures 90 from those on actuator assemblies 304 and 308. This is because the actuator arms 86 in actuator assemblies 302 and 306 extend generally opposite, i.e. into the counterclockwise direction of rotation of the disks 18 (as viewed from above) rather than with the direction of rotation as do the actuator arms 86 of actuator assemblies 304 and 308. Each assembled arm 86 is identical to that shown in FIGS. 12 and 13, except as above described with reference to the head orientation. Since each actuator arm 86 is symmetrical about its longitudinal axis, simply inverting the arm 86 on the sleeve 92 changes the head from an upward to a downward orientation. Each of the actuator arms 86 is rotatably mounted to an actuator spindle shaft 36 fastened to the baseplate 28 via a concentric, bearing supported tubular sleeve 92 or 92a.

The stack of actuator arms 86 in the actuator assemblies 302, 304, 306, and 308 preferably consists of alternating layers of separate, generally flat actuator arms 86 and generally flat spacers 106 which are both preferably made of a high strength ceramic material such as silicon carbide. The actuator arm 86 is shown in a plan view on sleeve 92 in FIG. 12. The flat spacers 106 are shown in FIGS. 14 and 15. These spacers are the same as in the first embodiment 10. The remainder of each of the actuator assemblies on the sleeve 92 is the same as in the first embodiment and therefore will not be repeated here.

Each of the actuator assemblies 302, 304, 306 and 308 is shown incorporating a single VCM 310. However, it is to be understood that each could also utilize a set of two VCMs as in the first and second embodiment. The stationary magnets 314 and 316 of each VCM 310 are mounted to a pair of upper and lower return plates 318 and 320 respectively. Both the magnets and their return plates are conventional in design and sized for a 3½ inch form factor drive actuator.

Referring now specifically to actuator assembly 306, the lower return plate 320 is fastened to the baseplate 28 via appropriate length standoff spacers 322. The upper return plate 318 is bolted or otherwise fastened to the lower return plate 320 via appropriately sized standoff spacers 324.

As in the first embodiment, the upper and lower magnet sets 314 and 316 each contain a pair of generally truncated, wedge shaped, plate magnets arranged side by side on each return plate. The magnets having opposite polarity faces are arranged in a common plane and face the opposite polarity faces of the pair of magnets lying in an opposite parallel plane. The VCM coil form 156 carried on the coil form support spacer 150 is located axially in the stack so that it is free to rotate between the upper and lower magnet sets. The upper return plate 318 may alternatively be fastened to the top plate 30 as is the case with the VCMs 310 of the actuator assemblies 304 and 308.

The actuator assemblies 304 and 308 similarly comprise one VCM 310 each. The only difference between these assemblies and the actuator assembly 302 and 306 the length of the standoff spacers. As can be readily seen in FIG. 21, the actuator assembly 302 and 306 VCMs are further from the baseplate 28. Therefore the standoff spacers 322a are longer on actuator assembly 304 and 308 than spacers 322 for actuator assemblies 302 and 306. The top return plate standoff spacers 226 in both assemblies 304 and 308 are relatively short and are supported preferably from the top cover plate 30.

As in the first embodiment, the axial positions of the VCM coilforms 156 and coil form support spacers 150 in each of the actuator assemblies 302, 304, 306, and 308 are preferably equidistant from the upper and lower ends of the stack of actuator arms 86 on the sleeve 92.

There may be other arrangements and volume divisions made for the disk surfaces between the actuator assemblies than as above described and shown in FIGS. 20 to 22 in this third embodiment. For example, referring now to FIG. 23, an alternate arrangement of actuator arms 86 is shown. In this alternative third embodiment, the difference between the first embodiment and the actuator embodiment shown in FIG. 22 is that the multi-layer spacer is replaced with separate, smaller spacers. The 14 actuator arms 86 are distributed equally along the axial length of the sleeve 92. More specifically, each actuator arm 86 is spaced from an adjacent actuator arm 86 by a double spacer 311. Again, this alternative utilizes one VCM and therefore has one coil form spacer 150 midway up the stack. This alternative embodiment may be particularly adaptable to the utilization of two VCMs in each actuator assembly as in the second and first embodiments, and is simpler to build up, because a separate set of spacers is not required.

Mechanical Assembly of the Second Embodiment

The assembly of the hard disk drive apparatus 300 in accordance with the third embodiment of the present invention having a number of disks equally divisible by four also is simple and straightforward, again basically comprising building up the head disk assembly in sequential layers of actuator arms, spacers, hard disks, and spacer rings and then telescoping the peripheral housing over the head disk assembly and securing the top cover or top plate member 30 in place. The procedure basically involves mounting a first, second, third and fourth actuator shaft 36 and a drive motor having a rotating hub 20 on a baseplate 28 and then performing the following steps:

a) rotatably mounting a tubular actuator support sleeve 92 coaxially on each actuator shaft 36 for rotation of each sleeve 92 about its shaft 36;

b) installing an actuator arm 86 with an upwardly facing head 88 on the first actuator sleeve 92 along with a spacer 106;

c) installing a hard disk 18 and then a spacer ring 84 on the motor hub 20;

d) installing a spacer 106 and then a second actuator arm 86 with a downwardly facing head 88 on the second actuator sleeve 92;

e) repeating steps b) through d) until the desired number of disks 18 and actuators 86 have been installed on the first and second sleeves 92;

f) installing a multi-layer spacer 208 on said third sleeve 92;

g) installing a multi-layer spacer 208 on said fourth sleeve;

h) installing an actuator arm 86 with an upwardly facing head 88 on the third actuator sleeve 92 along with a spacer 106;

i) installing a hard disk 18 and then a spacer ring 84 on the motor hub 20;

j) installing a spacer 106 and then a second actuator arm 86 with a downwardly facing head 88 on the fourth actuator sleeve 92;

k) repeating steps h) through j) until the desired number of disks 18 and actuators 86 have been installed on the third and fourth sleeves 92.

The method in accordance with the invention further includes substituting two of the spacers 106 on each sleeve with coil form spacers 150 at the desired axial locations for the VCMs as the head disk assembly shown in FIGS. 20, 21 and 22 is being built up. After the stacks of actuator arms and disks are built up, the top plates 162 are installed and fastened to the stacks of actuators with nuts 170. The annular disk retainer 180 is fastened to the hub 20 with bolts 182.

Bin Picking Method

The bin picking method of the invention applied to the third embodiment 300 is similar to that applied to the first and second embodiments. First, all of the actuator arms 86, spacers 106 and coil form spacers 150 are sorted into three distinct groups: those that are exactly on spec or nominal in thickness, those that are "−" or of reduced thickness but within tolerance; and those that are "+" or over nominal thickness but within tolerance. The actuator spacers 106 and 150 are then placed within separate bins or containers from which parts are drawn during assembly.

Second, all of the spacer rings 84 for the magnetic hard disks 18 are also separated into three distinct groups: those that are exactly on spec in thickness, those that are "−" or of reduced thickness but within tolerance, and those that are "+" or over nominal thickness but remain within tolerance. The rings 84 are then placed within separate bins or containers from which the parts are withdrawn during the build up of the head disk assembly 16.

Third, each of the actuator arms 86 and each of the disks 18 is similarly evaluated and catalogued for thickness, either "−", nominal, or "+" and deposited in corresponding bins for later use.

After categorizing each of the basic parts, actuator arm 86, actuator spacers 106 and 150, disk 18, multi-layer spacer 309 and the spacer ring 84 as to its thickness range, the actual drive assembly can begin. First, the drive spindle 34, the hub 20, and the motor stator assembly 52 of the disk drive motor 76 are assembled and fastened to the baseplate 28. Second, the four actuator spindle shafts 36 are fastened via screws 38 to the baseplate 28 and the tubular sleeves 92 and aligning rods 60 assembled onto the shafts 36. Alternatively, the tubular sleeve 92 and bearing sets 94 first may be press fit together onto the actuator spindle shafts 36 and the aligning rods 60 installed on the lower flange 96 separately to form a subassembly which is then mounted to the baseplate 28. Third, the bottom return plate 320 and magnet set 316 of the VCM 310 may be attached to the baseplate 28, with the appropriate standoff spacers 322 or 322a.

Fourth, assembly of the head disk assembly 301 of the second embodiment 300, comprising the actuator assemblies 302, 304, 306, 308 and stack of hard disks 18 begins. This procedure basically involves the sequential addition of an actuator arm 86 and then an actuator spacer 106 to a first sleeve 92, a disk 18 and then a spacer ring 84 to the hub 20, an actuator spacer 106 and then a second actuator arm 86 to a second sleeve 92, and then repeating these steps as described immediately above, in series until the lower half of the stack of disks 18 and arms 86 is complete, with a coil form support spacer 150, having a coil form 156 mounted thereon, inserted on each sleeve 92 sleeve 92 at the appropriate heights. The multi-layer spacers 309 are then installed on the remaining two actuator sleeves 304 and 308 and the process repeated until all disks and actuators have been installed.

More particularly, the installation of each layer of actuator arms 86 and disk 18 involves the selective choice of parts from appropriate tolerance bins so that the overall completed height of the stack remains within acceptable limits. This is accomplished in accordance with this aspect of the invention by selecting components in the same layer, i.e. at the same level, from the same tolerance bin during the assembly process. For example, the mechanical assembly procedure may be preferably performed as follows, following assembly of the sleeve 92 subassemblies and installation of these subassemblies on the baseplate 28 and installation of the spindle motor 76 to the baseplate 28 as is shown in FIG. 21:

1. an actuator arm 86 from one tolerance bin (−,0,+) is placed, head up, on a first actuator sleeve 92;
2. a hard disk 18 from a corresponding tolerance bin (−,0,+) is placed on the hub 20;
3. a spacer 106 from a corresponding tolerance bin (−,0,+) is placed on a second actuator sleeve 92;
4. an actuator arm 86 from a different tolerance bin (−,0,+) is placed on the second actuator sleeve 92 with head down;
5. a spacer ring 84 from another bin corresponding to this different tolerance is placed on the hub 20;
6. an actuator spacer 106 from another bin corresponding to this different tolerance is placed on the first actuator sleeve 92;
7. steps 1–6 are repeated as many times as necessary to assemble the desired number, typically half, of disks 18 and actuator arms 86 on both the first and second sleeves 92, preferably with one coil form support spacer 150 installed on the first and second actuator sleeves 92 immediately above the position of the lower VCM magnets 316 (the VCM magnets and return plates may be installed as separate subassemblies to the baseplate 28);
8. a multi-layer spacer 309 is picked from one of said tolerance bins closest to the sum of tolerances so far accumulated, and placed on the third sleeve;
9. a multi-layer spacer 309 is picked from the closest tolerance bin and placed on the fourth sleeve;
10. an actuator arm 86 from one tolerance bin (−,0,+) is placed, head up, on the third actuator sleeve 92;
11. a hard disk 18 from a corresponding tolerance bin (−,0,+) is placed on the hub 20;
12. a spacer 106 from a corresponding tolerance bin (−,0,+) is placed on the fourth actuator sleeve 92;
13. an actuator arm 86 from a different tolerance bin (−,0,+) is placed on the third actuator sleeve 92 with head down;
14. a spacer ring 84 from another bin corresponding to this different tolerance is placed on the hub 20;
15. an actuator spacer 106 from a bin corresponding to this different tolerance is placed on the third actuator sleeve 92;
16. steps 10–15 are repeated as many times as necessary to assemble the desired total number of disks 18 and total number of actuator arms 86 on the third and fourth sleeves 92, with at least one coil form support spacer 150 installed on the third and fourth actuator sleeves 92 at the appropriate axial heights above the position of the lower VCM magnets 316.

The actuator assemblies 302, 304, 306 and 308 are then each fastened together as previously described with reference to the first and second embodiments and the disk stack secured with retaining ring 180 and bolts 182. The VCM magnet and return plate assemblies may then be installed on the baseplate 28 if they are separately assembled, and the peripheral housing 14 telescoped over the assembled head disk assembly. Finally, the top plate 30 is fastened to the peripheral housing 14 and to the spindles 34 and 36 to complete the assembly also as previously described.

Figure 23:
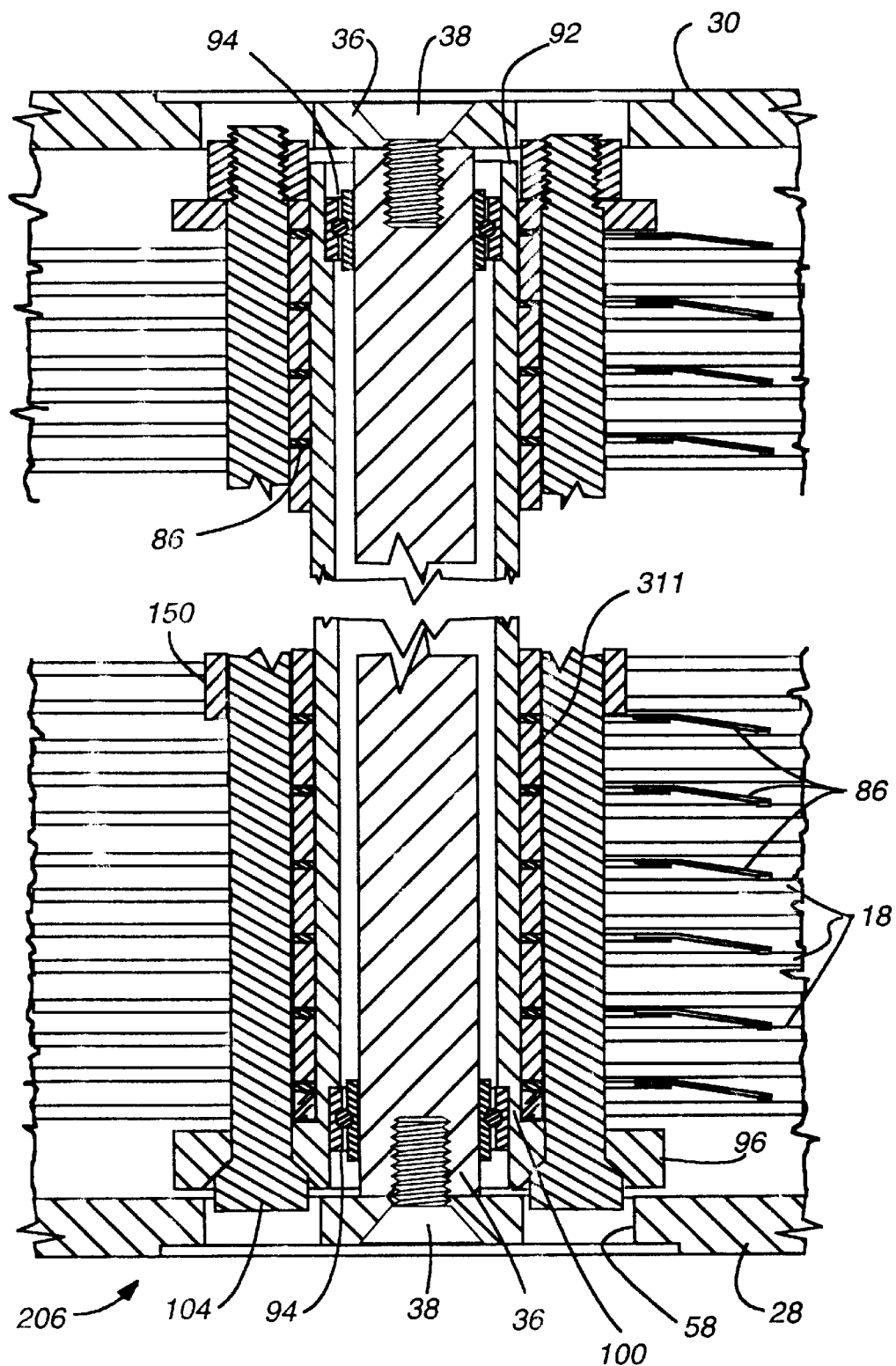
FIG. 23 is a sectional view of an alternative actuator arm arrangement to that shown in FIG. 20.

If the actuator assemblies 302, 304, 306 and 308 are alternatively arranged as in FIG. 23, the above procedure would simply be modified by eliminating the multilayer spacer 309, and the assembly sequence would rotate installation through the first to fourth sleeves in order to build up the layers.

As in the first embodiment above described, the bin picking method of the invention, i.e. picking components for each layer of actuator, disk and spacer from a single tolerance category, minimizes the cumulative effect of manufacturing tolerances on this second embodiment of the invention. Alternatively, the method may include picking from different bin categories only as each complete disk and head combination is repeated during assembly. Thus the actuator arm with up heads, spacer, disk and disk spacer ring, spacer and actuator arm with down heads would all be from one category. The next layer sequence would be from a different category.

The above procedures preferably include selection of an equal number of "−" and "+" layers so that the total stack height tolerance is met.

Again, this "bin picking" method not only ensures that the effect of cumulative errors caused by manufacturing tolerance variations are minimized. This method is particularly suited for automated assembly of the HDA in which robotic assemblers are utilized. The control processor of such an assembler is particularly suitable for storing and keeping track of the number of "−" layers, nominal layers, and "+" layers and execute appropriate bin selection accordingly.

Figure 24:
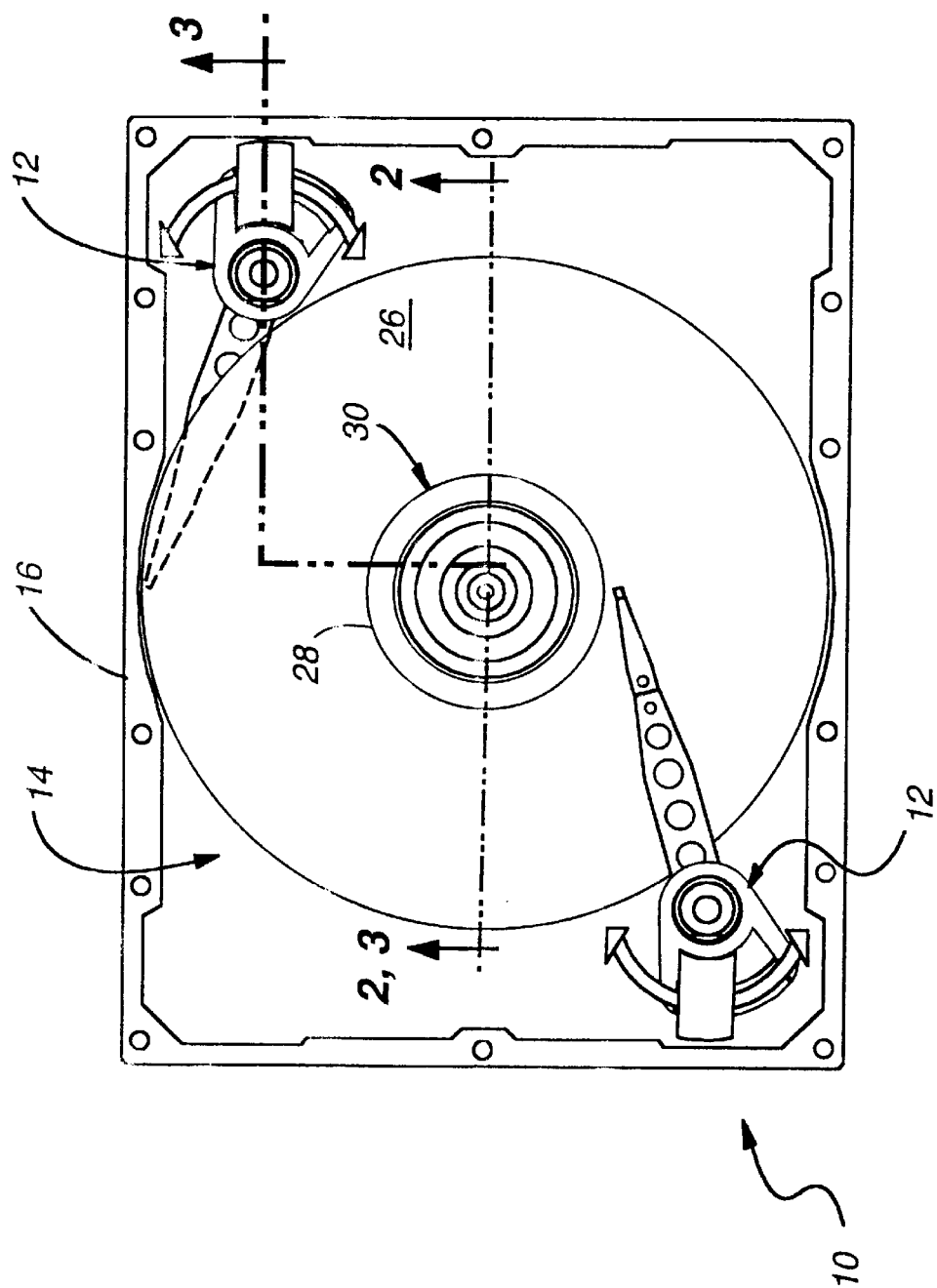
FIG. 24 is a plan view of a hard disk drive in accordance with a first embodiment of the present invention which includes two actuator assemblies, shown with the top plate removed.

Referring now to the drawing, a plan view of a first embodiment of the present invention 10 utilizing two transducer head positioning actuator assemblies 12 is shown in FIG. 24 with the top plate removed. This hard disk drive apparatus 10 in accordance with a first embodiment of the present invention is also shown in a partial exploded sectional view taken on the line 2—2 in FIG. 24. The hard disk drive apparatus 10 includes a head disk assembly 14 enclosed by a peripheral housing 16 sandwiched between a top plate 18 and a bottom plate 20. The apparatus 10 also preferably includes a flexible circuit board 22 (see FIG. 26) between the peripheral housing 16 and the top and bottom plates which carries the associated electronic control components 24 and provides a seal between the housing 16, and the plates 18 and 20.

The head disk assembly (HDA) 14 includes a plurality of planar magnetic storage disks 26 stacked on the hub 28 of an in-hub spindle motor 30 which has two separate sets of stator windings 32. One set of stator windings 32 is fixed to the top plate 18 of the hard disk drive apparatus 10. The other fixed stator winding set 32 is fastened to the base plate 20 of the hard disk drive apparatus 10 in accordance with the present invention. The spindle mounted hub 28 containing the stack of hard disks 26 is sandwiched between these two plates, as is shown in the exploded view of FIG. 25.

Each of the head positioning actuator assemblies 12 in accordance with the present invention includes a stack of separate actuator arms 34, each carrying a read/write head 36 preferably gimbal mounted to the distal end of the arm 34 and positioned adjacent, i.e. facing, either an upper or lower surface of one of the hard disks. All of the actuator arms 34 in one assembly 12 are preferably positioned with their heads 36 adjacent, or facing, upper surfaces of the hard disks 26. The other actuator assembly 12 contains actuator arms 34 carrying heads 36 positioned adjacent the lower surfaces of the hard disks 26. In this way, the space between adjacent hard disks 26 may be and is minimized.

The stack of hard disks 26 and stack of actuator arms 34 is built up with alternating layers of spacer rings 38 and hard disks 26, and actuator arms 34 and spacers 40. Each of the spacers 40 on the actuator arms 34 is sized to provide proper clearance and parallel positioning of the arms 34 between the disks 26. Each of the spacer rings 38 on the hard drive spindle hub 28 is sized to ensure clearance between the disks 26 for the actuator arms 34 and heads 36.

Figure 26:
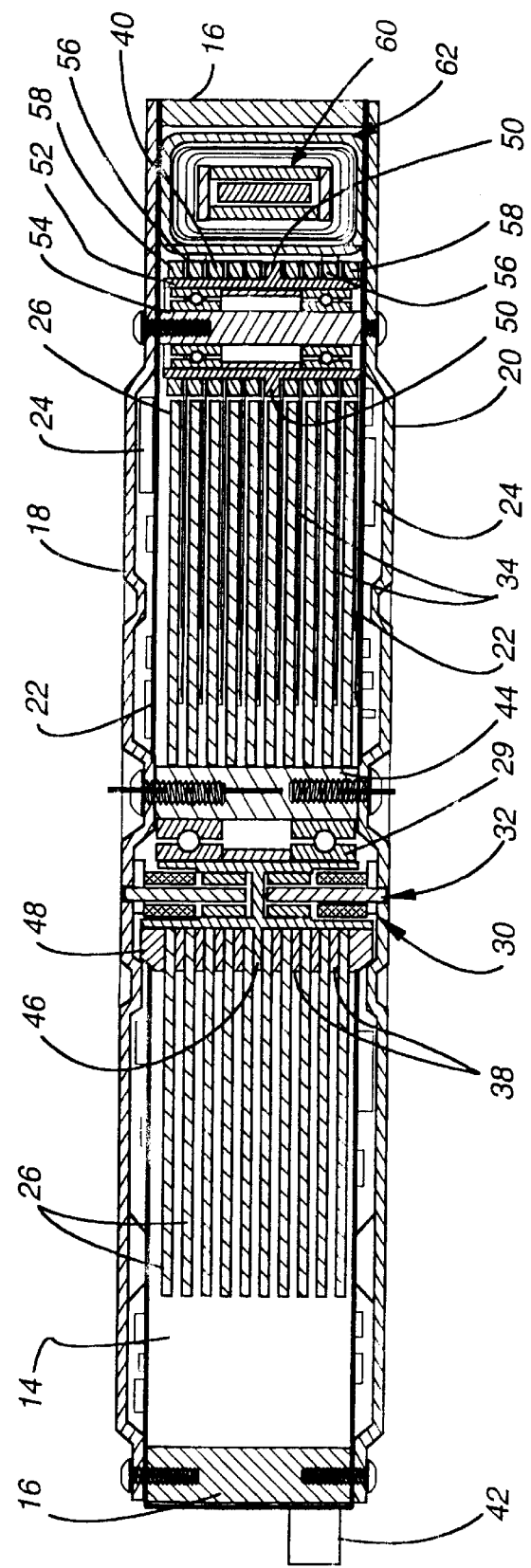
FIG. 26 is a sectional view of the hard disk drive in accordance with the first embodiment of the present invention taken along lines 3—3 in FIG. 24.

As shown in FIG. 26, the HDA 14 is sandwiched between the top cover plate 18 and base plate 20 with a flexible cable printed circuit board 22 (PCB) interposed between the HDA 14 and the top cover plate 18 and between the HDA 14 and the base plate 20. An external power and interface connector 42 is integrated onto the flexible cable PCB 22. This flexible PCB 22 carries all of the electronic components 24 and cabling necessary to provide power and control to the actuator voice coil motors and to the spindle motor 30 for the hard disks 26.

Referring now to FIGS. 2 and 3, the disk drive motor hub 28 has an H-shaped radial cross section spaced from and rotatably mounted via bearings 29 for rotation about a central spindle 44 fixed between the base plate 20 and the top cover 18. This hub 28 has a central radial flange 46 upon which the alternating series of disks 26 and spacer rings 38 is mounted. Thus, as can be seen from FIG. 26, the stack of disks 26 is built from this center flange 46 by placing a disk 26, a spacer ring 38, another disk 26, another spacer ring 38, another disk 26, another spacer ring 38, another disk 26, another spacer ring 38, another disk 26, and finally a threaded top closure ring 48 on top of the hub 28. The hub 28 has its upper and lower ends correspondingly threaded to receive the top closure ring 48. The top closure ring is tightened to press on, hold and clamp the upper half stack of disks 26 and spacer rings 38 together against the central flange 46. The bottom half of the hub 28 is built up in the same way.

The actuator assembly 12 is built up in a similar manner to that of the hub 28 with disks 26, in a sequential order, axially outwardly from a central radial flange 50 on a bearing supported sleeve 52 rotatably mounted to an actuator spindle 54. The actuator spindle 54 is in turn fastened to both the base plate 20 and the top cover plate 18. Thus, as can best be seen in the sectional view of FIG. 26, assembly of the actuator assembly 12 starts at the central flange 50, and is built outward axially, with an actuator arm 34, a spacer 40, another actuator arm 34, a spacer 40, another actuator arm 34, a spacer 40, and so on, and finally a magnet support spacer 56 and a retainer ring 58. The magnet support spacer 56 is designed to receive and fasten to one end of a permanent magnet subassembly 60 which forms part of a voice coil motor subassembly 62 described in more detail below. The other half of the actuator assembly 12 is similarly built from the flange 50 outward on the actuator sleeve 52.

One of the unique features of the present invention is the manner of assembly of the HDA 14. The head disk assembly 14 is assembled in sequential layers of disks and actuator arms. Each layer preferably comprises an actuator arm 34 and then a spacer 40 telescoped onto a first actuator sleeve 52, a hard disk 26 and then a spacer ring 38 placed on the disk motor hub 28, and finally, a spacer 40 and then an actuator arm 34 telescoped onto the second actuator sleeve 52. This process is then repeated until the upper half or the lower half of the head disk assembly 14 is assembled. The partially-assembled HDA 14 is then inverted and assembly of the opposite half of the HDA is then completed in the same way.

During this HDA assembly process, the spindle shafts 54 of the first actuator assembly 12 and the second actuator assembly 12 and the disk drive motor spindle shaft 44 must be supported temporarily on the base plate 18 to properly space and hold these spindle shafts relative to each other.

More particularly, the assembly of the head disk assembly 14 preferably proceeds as follows: first, the bearing supported disk drive spindle motor hub 28 is pressed onto the spindle shaft 44 and one end of the spindle shaft 44 is temporarily mounted to the base plate 20. The first actuator spindle shaft 54 and bearing supported sleeve 52 are assembled together and one end of the actuator spindle shaft 54 is mounted on the base plate 20. The second actuator sleeve 52 and actuator spindle shaft 54 are then assembled together and mounted to the base plate 20 in a similar fashion.

Actual layered construction now begins. A first actuator arm 34 with an upwardly facing head 36 is slipped onto the first actuator sleeve 52 and positioned against the central flange 50. An appropriate spacer 40 is then installed on the sleeve 52 against the actuator arm 34. A hard disk 26 and a spacer ring 38 are then installed on the drive motor hub 28. Finally, an appropriate spacer 40 and then an actuator arm 34 with a downwardly facing head 36 are installed on the second actuator sleeve 52. This process is then repeated until the upper half of the assembly 14 is completed with addition of a magnet support spacer 56 and retaining ring 58.

At this point, the flexible PCBA 22 can be installed on top of the HDA 14 and the top cover plate 18 installed to permanently attach the upper ends of the actuator spindles 50 and the drive motor spindles 44 to the top plate 18. The base plate 20 is then unfastened from the lower ends of the spindle shafts 44 and 54 and the unit inverted. Assembly of the lower half of the head disk assembly 14 is then performed in a similar fashion to that of the upper half.

Following sequential assembly of the upper and lower halves of the head disk assembly 14 as above described, the moving magnet subassembly 60 is slipped onto the outwardly extending arms of the magnet support spacers 58 and the voice coil motor subassembly 62 is fastened to either the base plate 20 or the top plate 18, whichever presently supports the actuator and disk drive spindle shafts. The peripheral housing 16 is then telescoped over the head disk assembly 14. The PCBA 22 is then wrapped over the peripheral housing 16 and over the exposed ends of the spindles 44 and 54. Finally, the base plate 20 is reinstalled and fastened to the spindles 44 and 54 and to the peripheral housing 16 to completely enclose the head disk actuator assembly 14.

Figure 27:
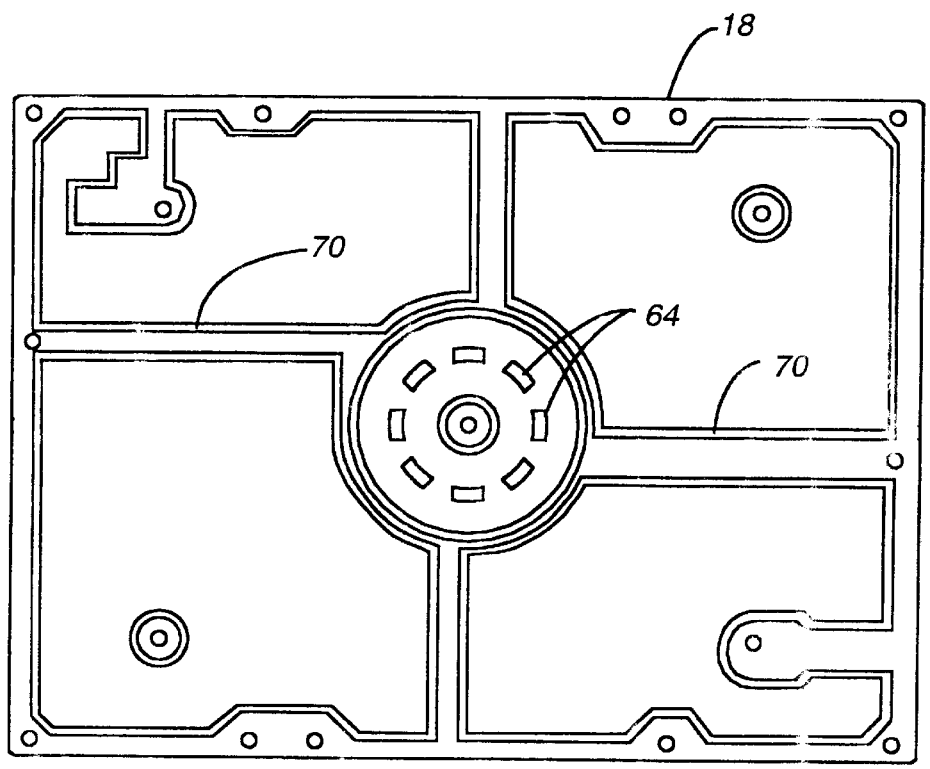
FIG. 27 is a plan view of the underside of the top plate.
Figure 28:
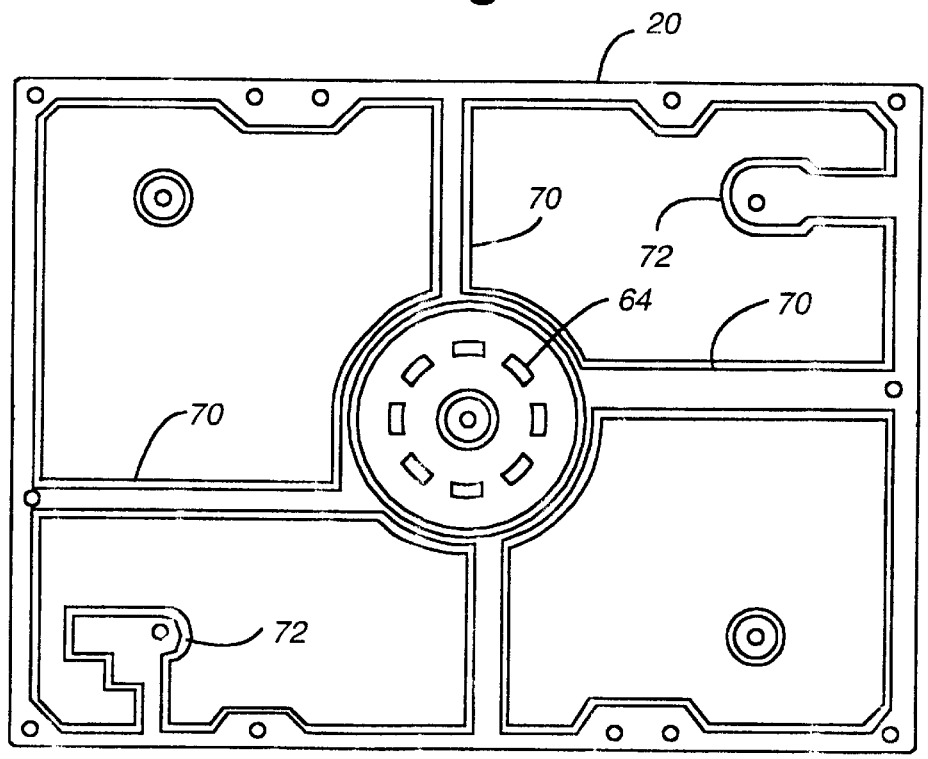
FIG. 28 is a plan view of the upper surface of the base plate.

The base plate 20 and the top plate 18 are separately shown in plan views in FIGS. 27 and 28. The contour of the inner face of each plate is preferably a mirror image of the other. The center portion of the top plate 18 and the base plate 20 each have mounted thereon a stator assembly 32 constituting half of the total stator arrangement for the in-hub disk drive motor 30. The stator assembly consists of eight magnetically permeable core fingers 64 which project at right angles from the surface of the plates 18 or 20. Each one of these fingers 64 supports a stator coil 66 wound thereon electrically connected together in a conventional manner. These stator core fingers, when the plates are installed, each extend into the hub 28 between opposing pairs of permanent magnets 68 bonded to the inner annular surfaces of the hub 28.

Figure 25:
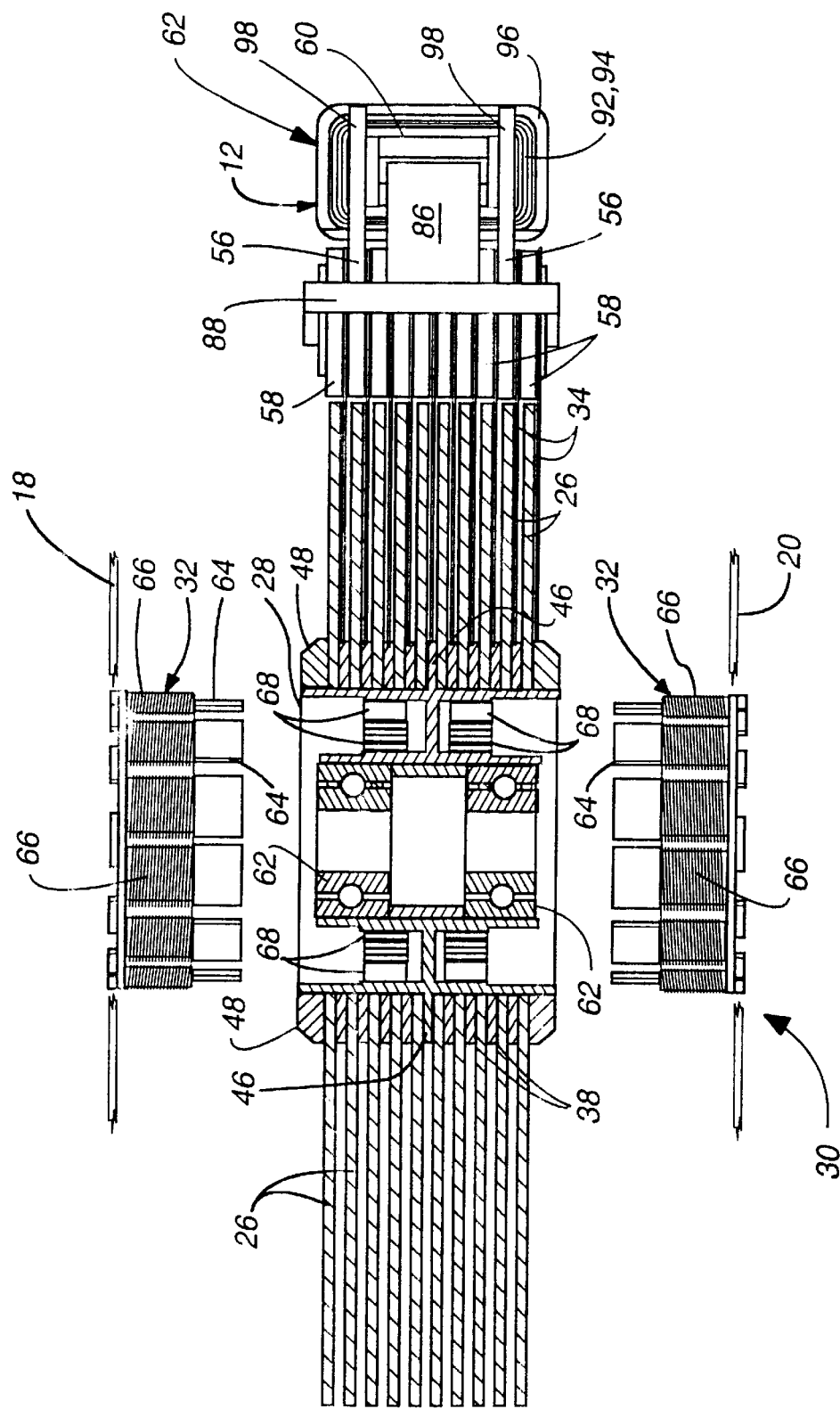
FIG. 25 is an exploded partial sectional view of the first embodiment of the invention taken on the line 2—2 in FIG. 24.

A number of longitudinal and transverse ribs 70 emanating from the central portion of the top plate 18 and the base plate 20 divide the top plate 18 and the base plate 20 into four quadrants. These quadrants each have a unique arrangement of internal raised ribs 72 which increase the rigidity of the top plate 18 and the base plate 20. The rib configuration is also optimized to minimize the mechanical vibration coupling between opposite quadrants during drive operation. The arrangement of the ribs shown in FIGS. 27 and 28 is exemplary only and may be altered in order to ensure optimum damping of mechanical vibrations. The arrangement of corresponding depressions in the base and top plates 20 and 18 also accommodates the components mounted on the flexible printed circuit board assembly 22, as is shown in FIG. 25 and the exploded view of FIG. 36.

FIG. 29 illustrates a plan view of a moving magnet actuator assembly 12 in accordance with the present invention. The actuator 12 includes a stack of actuator arms 34 on a rotatable sleeve 52 and a voice coil motor subassembly 62. In this actuator assembly design, the coil assembly 74 is stationery. The permanent magnet subassembly 60 is fastened to the stack of actuator arms 34 via upper and lower magnet support spacers 56. The magnet subassembly 60 is movable with respect to the stationary coil assembly 74. The moving magnet subassembly 60 moves or rotates back and forth through the coil assembly 74 in response to current fed to the coils to position the heads 36 at the distal ends of the actuator arms 34 at the proper radial location over the hard disk surfaces.

Figure 31:
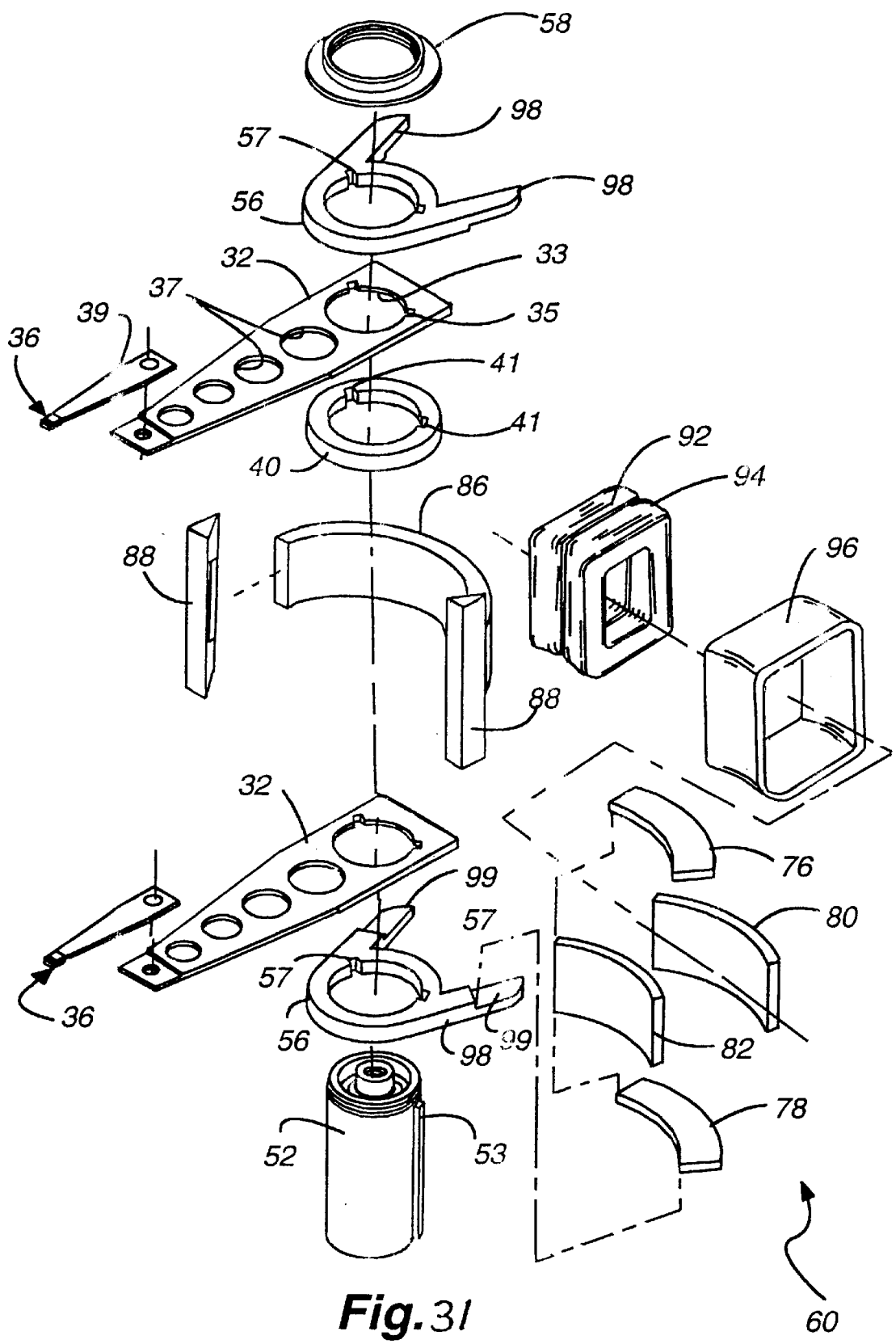
FIG. 31 is an exploded view of the first embodiment of the actuator assembly in accordance with the invention shown in FIG. 29.
Figure 32:
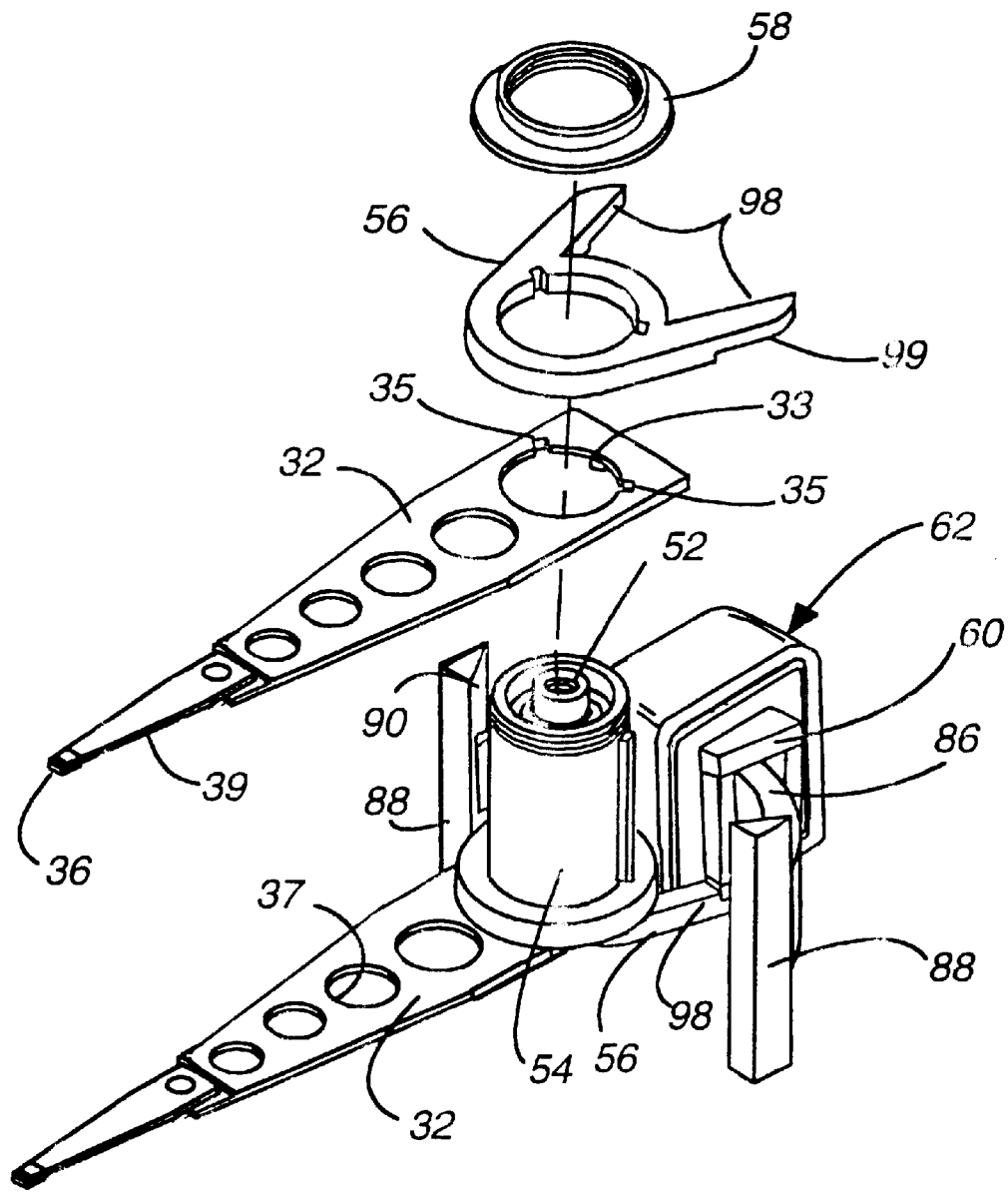
FIG. 32 is a perspective view of the actuator assembly in accordance with the first embodiment of the invention showing the arm components exploded and the moving magnet components assembled on the lower magnet support spacer.
Figure 33:
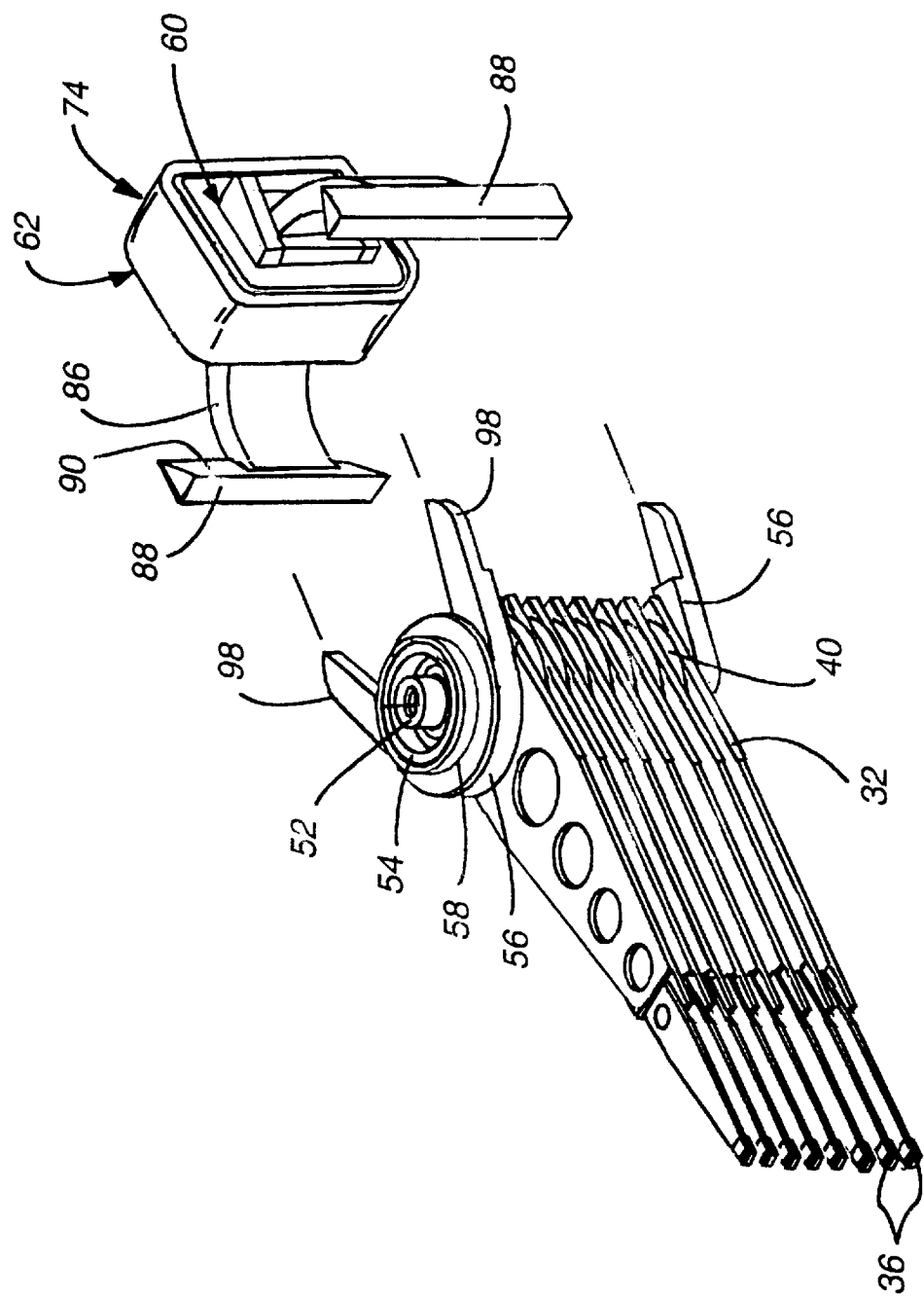
FIG. 33 is a perspective view of the actuator assembly shown in FIG. 32 with the actuator arms assembled and the magnet and coil subassembly ready for installation.

A sectional view through the moving magnet assembly is shown in FIG. 30A. An exploded view of the actuator assembly is shown in FIG. 31. FIGS. 32 and 33 illustrate perspective views of the assembly of the actuator arms and the voice coil motor assembly 62 to the actuator stack, respectively.

The moving magnet assembly 60 comprises four permanent magnets 76, 78, 80, and 82. The magnets each have a generally rectangular cross section and an arcuate length so as to form an arcuate rectangular sleeve with a central arcuate passage 84 therethrough having a generally rectangular cross section. Each of these magnets has a north face and opposite south face. The same faces, for example, south, are all oriented to face towards each other so that the opposite polarity faces, north, are directed outwardly from the central passage 84 through the magnet assembly 60, as is shown in the sectional view of FIG. 30A.

Each of the magnets may alternatively have a trapezoidal, cross-sectional shape. In particular, appropriately beveled mating edges of magnets 76a, 78a, 80a, and 82a as is shown in FIG. 30B form a narrower passage 84a therethrough. The assembly 60 (or 60a) forms a generally rectangular tubular sleeve to receive therethrough a central curved strip 86 (or 86a) of steel or other magnetically permeable material to provide a magnetic return path through the magnet assembly. Alternatively, a thin central return plate of steel may be interposed between the magnets and may have an end folded over to clamp the magnets together in opposition to the magnetic forces exerted by the individual magnets against each other.

Since these four elongated magnets have like faces oriented towards each other, there is a repulsive force exerted between the magnets. Accordingly, they are physically held together and then mechanically fastened or adhesively bonded together to hold them in place.

The return path strip 86 is preferably stationary and is fastened to the base plate 20 or top plate 18 along with the stationary coil assembly 74. This strip 86 is fastened to two end posts 88 which preferably have a beveled side 90 facing the coil assembly 74. These beveled sides act as limit stops for the magnet support spacers 56 in the actuator assembly 12 to limit actuator arm travel to approximately 30° so that the heads 36 stay in the desired range between the desired inner and outer diameters of the disks 26.

The coil assembly 74 comprises a pair of stationery voice coil motor coils 92 and 94, each preferably wound in opposite directions, and a generally rectangular return sleeve 96 made of steel or other magnetically permeable material. The coils 92 and 94 are assembled side by side within the generally rectangular return sleeve 96 which is eventually fastened to either the base plate 20, the top plate 18, or the peripheral housing 16.

The provision of two coils permits the use of dual control currents, preferably flowing in opposite directions, which can be used to provide dynamic braking and improved rotational acceleration of the actuator arm assembly during seek operations. This dual coil feature permits faster response times and shorter seek times as well as finer tracking control than is possible with conventional actuator control systems currently available which utilize a single voice coil.

The voice coil motor subassembly 62 is assembled separately from the actuator arms 34 and sleeve 52 as is shown in FIG. 33. Then the voice coil motor 62 is joined together with the assembled stack of actuator arms 34 and spacers 40 and 56 on the sleeve 52 by slipping the magnet spacer fingers 98 of the magnet support spacers 56 onto and engaging with the corner portions of the magnet assembly 60. The fingers 98 are adhesively bonded to the magnet assembly 60 or mechanically fastened in place so as to make the magnet assembly part of the rotatable stack of actuators. Each of the fingers 98 preferably has a ledge of reduced thickness to mate with the magnet assembly 60. The magnet assembly 60 may have a set of slots at each corner thereof (not shown) for engaging the fingers 98. The fingers 98 are preferably spaced apart at an included angle of approximately 30°. Finally, the end posts 88 and the coil assembly 74 are preferably fastened to the base plate 20 or to the top plate 18 as previously mentioned.

Referring to FIGS. 29 and 31, the actuator sleeve 52 may have one or a pair of aligning key ribs 53 extending axially along the sleeve's outer surface. Each of the actuator arms 34 has a central aperture 33 in its proximal end having a pair of corresponding keyways 35 so that the actuator arm 34, when telescoped onto the sleeve 52, will automatically align radially with the arms 34 above and below. The magnet support spacers 56 have similar keyways 57. Similarly, the spacers 40 must have corresponding keyways 41. This keyed arrangement ensures that the components are properly radially aligned throughout assembly.

The actuator arms 34 with flexures 39 attached carrying heads 36 are all identical and interchangeable between actuator assemblies in opposite quadrants of the head disk assembly 14. They would be completely interchangeable except for the heads 36 being rotated 180° on those flexures mounted on actuator arms which are directed into the direction of disk rotation, as discussed above.

Each of the actuator arms 34 is identical and symmetrical about its longitudinal axis. Each actuator arm 34 also has a plurality of longitudinally spaced apertures in its central portion to reduce the mass of the arm. Preferably the arm is made of silicon carbide. There are lead traces 37 and external lead contact pads 45 printed on either the upper or lower surfaces of the actuator arm 34. He lead traces 37 connect the read/write head 36 to the contact pads 45 for further interconnection to the control electronics and external circuitry. In addition, the arm 34 may carry a preamplifier circuit integrated into the printed circuit on the arm surface. All of the components on the actuator spindle sleeve 52, and the sleeve itself, are preferably made of silicon carbide.

As an alternative to, or in addition to, having a keyed sleeve 52, the upper and lower surfaces of the spacers 40 and 56 as well as the upper and lower surfaces of the actuator arm 34 adjacent the aperture 33 may be textured to provide a frictional grip between the components on the sleeve 52 when the retainer ring 58 is installed. However, without a keyed or other alignment arrangement, this alternative would require a separate aligning tool to be positioned about the assembly before the retaining ring 58 is tightened in place on the sleeve 52. Accordingly, some kind of alignment means on the sleeve is preferred. The alignment means could take various alternative forms than as above described. For example, one alternative is that instead of a key 53, the sleeve 52 could be configured with a single axial groove. The magnet support spacers 56 and the actuator arms 34 would then be the only sleeve mounted components requiring inwardly projecting tabs to engage the aligning groove.

Another of the unique features of the present invention is that the capacity of the drive is directly scalable by changing the dimensions of only a few components. Specifically changed are the length of the peripheral housing, the length of the hub 28, the spindles 44 and 54, and the length of the rotatable actuator sleeves 52, and adding or deleting actuator arms 34 and spacers 40, depending on the capacity of the drive apparatus desired. More or less actuator arms 34, spacers 40, disks 26, and spacer rings 38 would also be required, but their size and shape would not be different.

Figure 34:
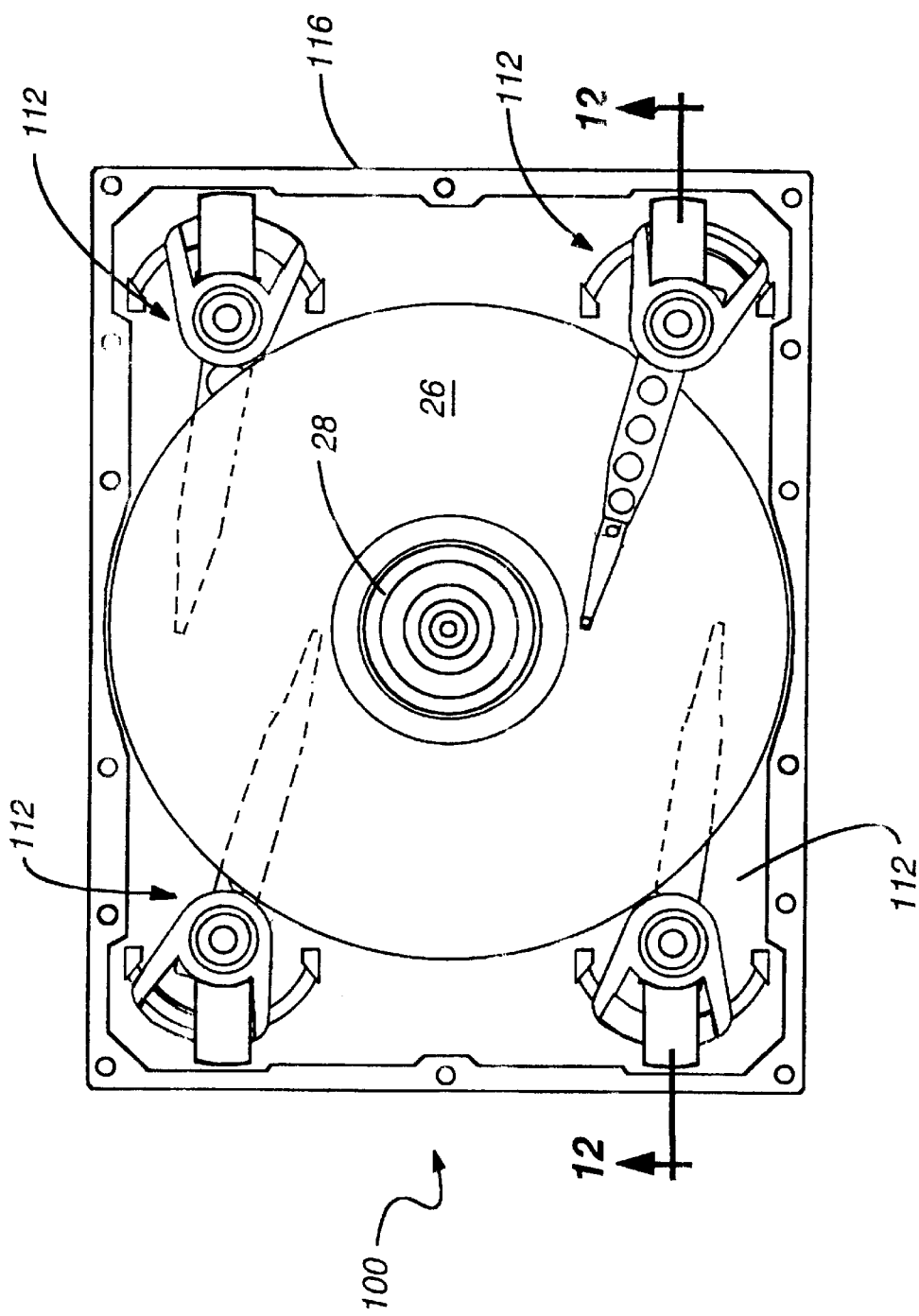
FIG. 34 is a plan view of a second embodiment of the high performance disk drive apparatus in accordance with the present invention incorporating four head positioning actuator assemblies.
Figure 35:
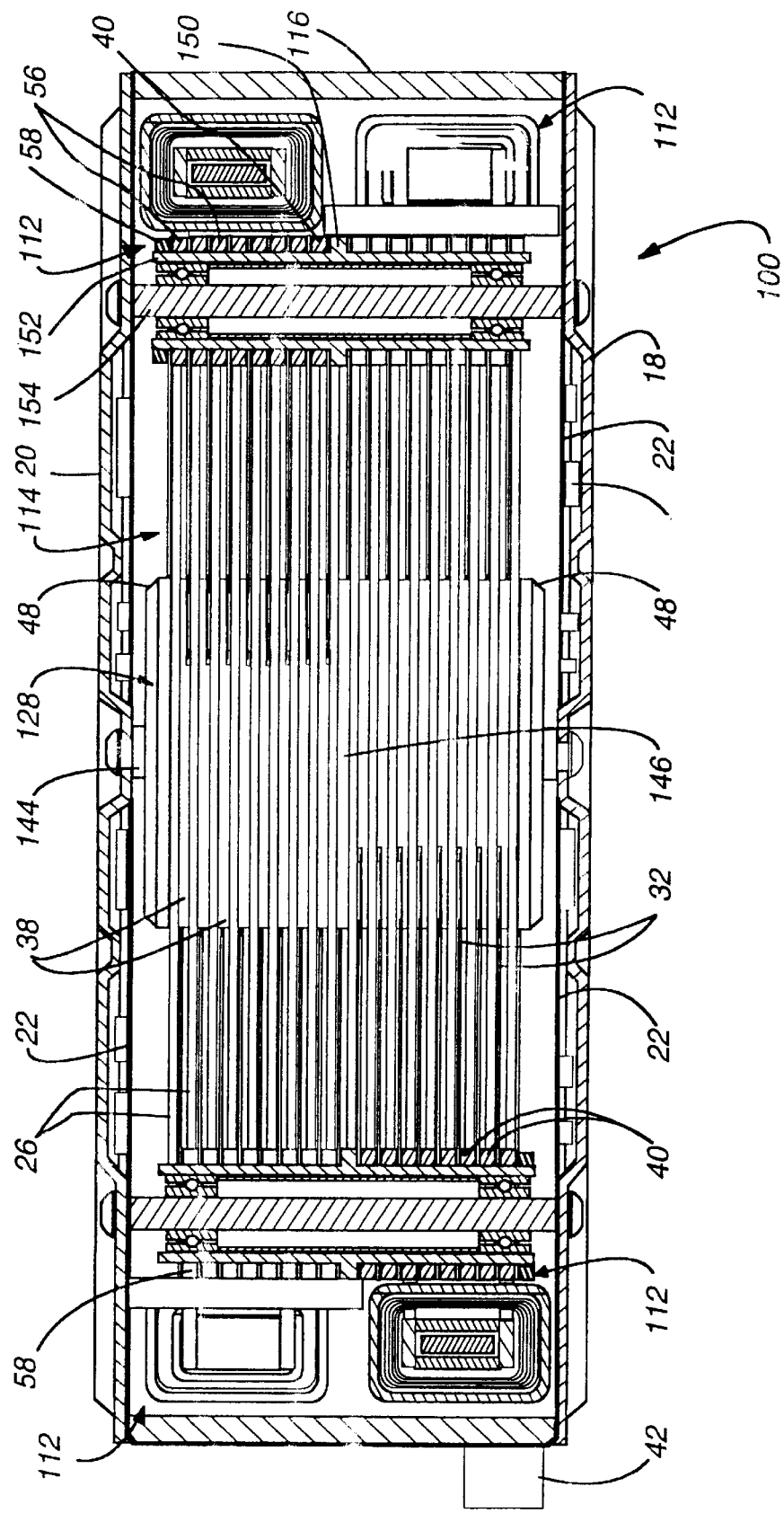
FIG. 35 is a sectional view of the hard disk drive apparatus in accordance with the second embodiment of the invention taken along the line 12—12 in FIG. 34.

FIG. 34 and FIG. 35 illustrate this feature in a second embodiment 100 of the hard disk drive apparatus in accordance with the present invention which utilizes four separate head positioning actuator assemblies 112, one in each corner of the generally rectangular, peripheral housing 116. Each of the assemblies 112 carries actuator arms 34 which, in turn, carry heads 36 in facing orientation to one quarter of the disk surfaces. For example, the upper right and lower right hand actuators as shown in the plan view of FIG. 34 carry downwardly facing heads 36 for the upper sides of the disks 26 as can be seen in the sectional view of FIG. 35. Similarly, the actuator assemblies 112 in the upper left and lower left corners of the plan view of FIG. 35 carry upwardly facing heads for reading and writing data to the lower surfaces of the stack of disks 26.

The peripheral housing 116 in this second embodiment is longer or higher than in the first embodiment shown in FIGS. 24 through 28. Similarly, in the second embodiment 100, the length of the hub 128 is longer to accommodate the eighteen disks 26 shown rather than ten disks as in the first embodiment 10. Correspondingly, each of the actuator assemblies 112 carries more actuator arms 34 than in the first embodiment. Therefore the length of the spindles 144 and 154 and the actuator sleeves 152 are also longer in the second embodiment 100 to accommodate nine actuator arms on one half of each sleeve.

In most other respects the structure of the second embodiment 100 is as above described with reference to the first embodiment 10 in FIGS. 24 through 28.

More particularly, this hard disk drive apparatus 100 includes a head disk assembly 114 enclosed by a peripheral housing 116 sandwiched between a top plate 18 and a bottom plate 20. The apparatus 100 also preferably includes a flexible circuit board 22 between the peripheral housing 116 and the top and bottom plates 18 and 20 which carries the associated electronic control components 24 and provides a seal between the housing 116, and the plates 18 and 20.

The head disk assembly (HDA) 114 includes a plurality of planar magnetic storage disks 26 stacked on the hub 128 of an in-hub spindle motor 30 which has separate sets of stator windings 32. One set of stator windings 32 is fixed to the top plate 18 of the hard disk drive apparatus 10. The other fixed stator winding set 32 is fastened to the base plate 20 of the hard disk drive apparatus 100 in accordance with the present invention. The spindle mounted hub 128 containing the stack of hard disks 26 is sandwiched between these two plates, as is shown in the sectional view of FIG. 35. The motor construction is identical to that shown in the exploded view of FIG. 25 except that the length of the hub 128 is longer than the hub 28.

Each of the head positioning actuator assemblies 112 in the second embodiment 100 in accordance with the present invention includes a stack of actuator arms 34, each carrying a read/write head 36 gimbal mounted to the distal end of the arm and positioned adjacent and facing either an upper or lower surface of one of the hard disks. All of the actuator arms 34 in the upper right assembly 112 and the lower right assembly 112 in FIG. 34 are preferably positioned with their heads 36 adjacent and facing upper surfaces of the hard disks 26. The upper left and lower left actuator assemblies 112 each contains actuator arms 34 carrying heads 36 positioned adjacent the lower surfaces of the hard disks 26. In this way, the space between adjacent hard disks 26 is again minimized.

The stack of hard disks 26 and stacks of actuator arms 34 are each built up with alternating layers of spacer rings 38 and hard disks 26, and actuator arms 34 and spacers 40. Each of the spacers 40 adjacent the actuator arms 34 is sized to ensure clearance between the disks 26. Each of the spacer rings 38 on the hard drive motor hub 128 is sized to ensure clearance between the disks 26 for the actuator arms 34 and heads 36.

As shown in FIG. 35, the HDA 114 is sandwiched between the top cover plate 18 and base plate 20 with a flexible cable printed circuit board 22 (PCB) interposed between the HDA 114 and the top cover plate 18 and between the HDA 114 and the base plate 20. An external power and interface connector 42 is integrated onto the flexible cable PCB 22. This flexible PCB 22 carries all of the electronic components 24 and cabling necessary to provide power and control to the actuator motors and to the spindle motor 30 for the hard disks 26.

Referring now to FIGS. 26 and 35, the disk drive motor hub 128 has an H-shaped radial cross section as in the first embodiment and is rotatably mounted for rotation about a spindle 144 fixed between the base plate 20 and the top cover 18. This hub 128 has a central radial flange 146 upon which the alternating series of disks 26 and spacer rings 38 is mounted. Thus, as can be seen from FIG. 26 and 35, the stack of disks 26 is built from this center flange 146 by placing a disk 26, a spacer ring 38, another disk 26, another spacer ring 38, another disk 26, another spacer ring 38, another disk 26, another spacer ring 38, another disk 26, and finally a threaded top closure ring 48 on top of the hub 28. The hub 128 has its upper and lower ends correspondingly threaded to receive the top closure ring 48. The top closure ring 48 is tightened to press on, hold and clamp the upper half stack of disks 26 and spacer rings 38 together against the central flange 146. The bottom half of the hub 128 is built up in the same way.

Each of the actuator assemblies 112 is built up in a similar manner to that of the hub 128 with disks 26 in a sequential order axially outwardly from a central radial flange 150 on a bearing supported sleeve 152 rotatably mounted to an actuator spindle 154. The actuator spindle 154 is in turn fastened to both the base plate 20 and the top cover plate 18. Thus, as can best be seen in the sectional view of FIG. 35, assembly of the actuator assembly 112 starts at the central flange 150, and is built outward axially, with an actuator arm 34, a magnet support spacer 56, another actuator arm 34, a spacer 40, another actuator arm 34, a spacer 40, and so on, and finally another magnet support spacer 56 and a retainer ring 58. The magnet support spacer 56 is designed to receive and fasten to one end of a permanent magnet subassembly 60 which forms part of a voice coil motor subassembly 62 described in more detail above.

In this second embodiment 100, the other half of each actuator assembly 112 does not carry actuator arms 34, as is shown in FIG. 35. More particularly, the upper right actuator assembly 112 and the lower left assembly 112 as in FIG. 34 carry actuator arms 34 on the lower half of the sleeves 154. The upper left and lower right actuator assemblies 112 as seen in FIG. 34 carry actuator arms 34 only on the upper portions of the sleeves 154. In addition, if the rotational direction of the disks 26 is clockwise as viewed from above in FIG. 34, then the read/write heads 36 on the actuator arms 34 must be mounted in a reversed orientation, i.e., rotated 180°, as the arms 34 in these two assemblies extend into the direction of disk rotation rather than with the direction of rotation. However, each of the actuator assemblies is similarly built from the flange 150 outward on the actuator sleeve 152.

One of the unique features of the present invention is the manner of assembly of the HDA 114. As in the first embodiment, the head disk assembly 114 is assembled in sequential alternating layers of disks and actuator arms. Each layer preferably comprises an actuator arm 34 with an upwardly facing head 36 and then a spacer 40 telescoped onto a first actuator sleeve 152, a hard disk 26 and then a spacer ring 38 placed on the disk motor hub 128, and finally, a spacer 40 and then an actuator arm 34 telescoped onto the second actuator sleeve 152 in the opposite quadrant of the drive. This process is then repeated until the upper half or the lower half of the head disk assembly 114 is assembled. The partially-assembled HDA 114 is then inverted and assembly of the opposite half of the HDA 114 is then completed in the same way.

During this HDA assembly process, the spindle shafts 154 of the four actuator assemblies 112 and the disk drive motor spindle shaft 144 must be supported temporarily on the base plate 20 to properly space and hold these spindle shafts relative to each other.

More particularly, the assembly of the head disk assembly 114 preferably proceeds as follows: first, the bearing supported disk drive spindle motor hub 128 is pressed onto the spindle shaft 144 and one end of the spindle shaft 144 is temporarily mounted to the base plate 20. The first actuator spindle shaft 154 and a bearing supported sleeve 152 are assembled together and one end of the actuator spindle shaft 154 is mounted on the base plate 20 in the upper left quadrant, as seen in FIG. 34. The second, third and fourth actuator sleeves 152 and actuator spindle shafts 154 are then assembled together and mounted to the base plate 20 in a similar fashion in their respective quadrants.

Actual layered construction of the HAD 114 now begins. A first actuator arm 34 with an upwardly facing head 36 is slipped onto the first actuator sleeve 152 and positioned against the central flange 150. An appropriate spacer 40 is then installed on the sleeve 152 against the actuator arm 34. A hard disk 26 and a spacer ring 38 are then installed on the drive motor hub 128. Next, an appropriate spacer 40 and then an actuator arm 34 with a downwardly facing head 36 are installed on the second actuator sleeve 152 in the opposite quadrant on the base plate 20. This process is then repeated until the upper half of the HDA 114 is completed with addition of two magnet support spacers 56 at the appropriate axial positions in place of spacers 40 for supporting the magnet assembly 60 and finally a retaining ring 58 on each sleeve 152.

At this point, the flexible PCBA 22 can be installed on top of the HDA 114 and the top cover plate 18 installed to permanently attach the upper ends of the four actuator spindles 150 and the drive motor spindle 144 to the top plate 18. The base plate 20 is then unfastened from the lower ends of the spindle shafts 144 and 154 and the partially assembled HAD 114 inverted. Assembly of the lower half of the head disk assembly 114 is then performed in a similar fashion to that of the upper half, using actuator arms 34 with reversed read/write heads 36, to the upper right and lower left actuator assembly sleeves 152(as viewed in FIG. 34).

Following sequential assembly of the head disk assembly 114 as above described, the moving magnet subassembly 60 is slipped onto each set of the outwardly extending arms 98 of the magnet support spacers 58 and the voice coil motor subassembly 62 is fastened to either the base plate 20 or the top plate 18, preferably whichever now supports the actuator and disk drive spindle shafts. The peripheral housing 116 is then telescoped over the head disk assembly 114 and fastened to the plate supporting the actuator and drive motor spindle shafts 144 and 154. The PCBA 22 is then wrapped over the peripheral housing 116 and over the exposed free ends of the spindles 144 and 154. Finally, the remaining plate, e.g., the base plate 20, is reinstalled and fastened to the spindles 144 and 154 and to the peripheral housing 16 to completely enclose the head disk assembly 114.

It is to be understood that the hard disk drive in accordance with the present invention may have more than or less than the number of disks and actuator arms as above described. Therefore the above number of disks and actuator assemblies described is intended for descriptive purposes only and should not to be taken to limit the invention in any way.

Figure 36:
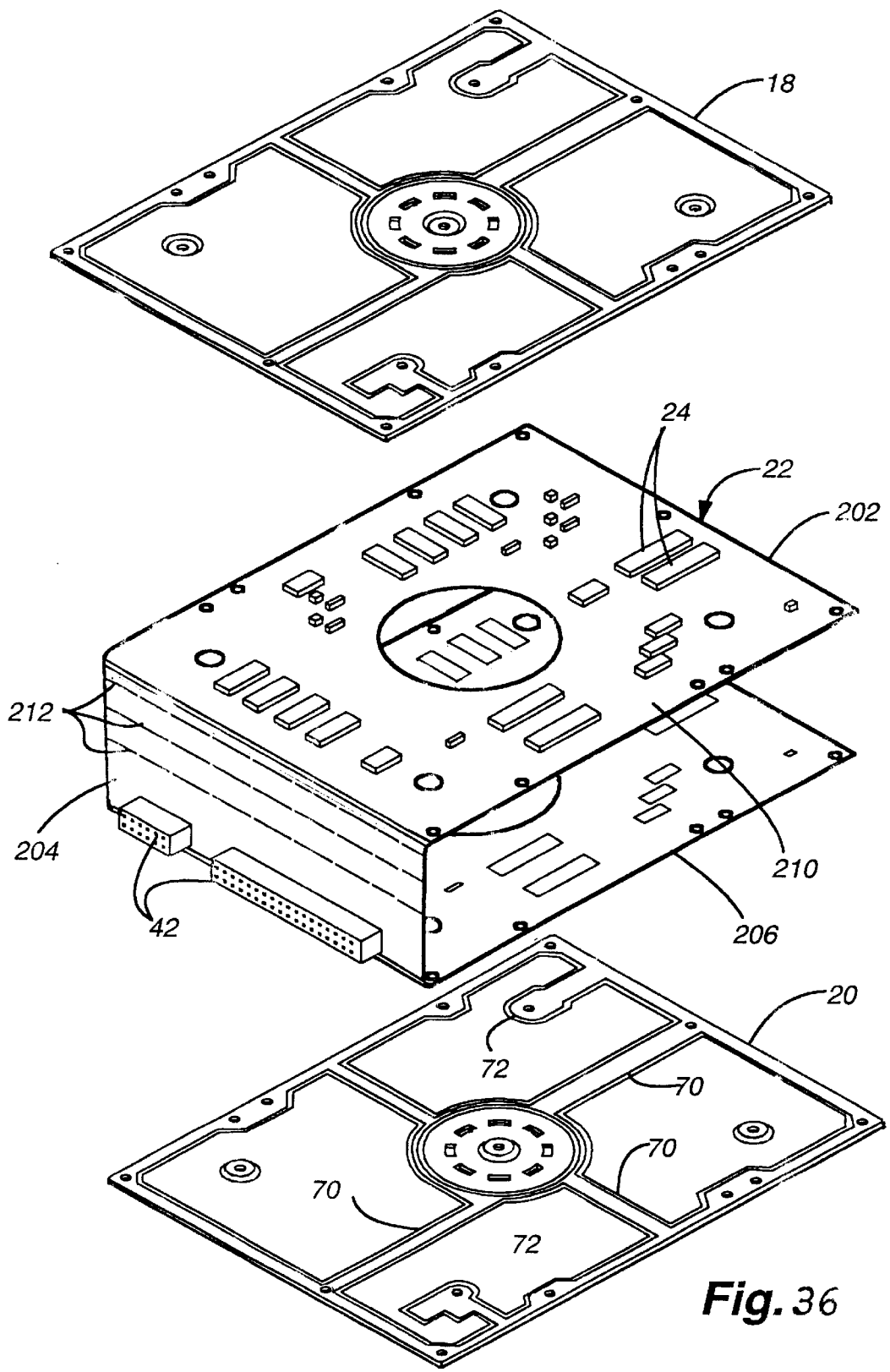
FIG. 36 is a perspective exploded view of a flexible printed circuit board, base plate, and top plate for installation in the hard disk drive apparatus in accordance with the present invention such as the embodiments shown in FIGS. 23 and 34.
Figure 37:
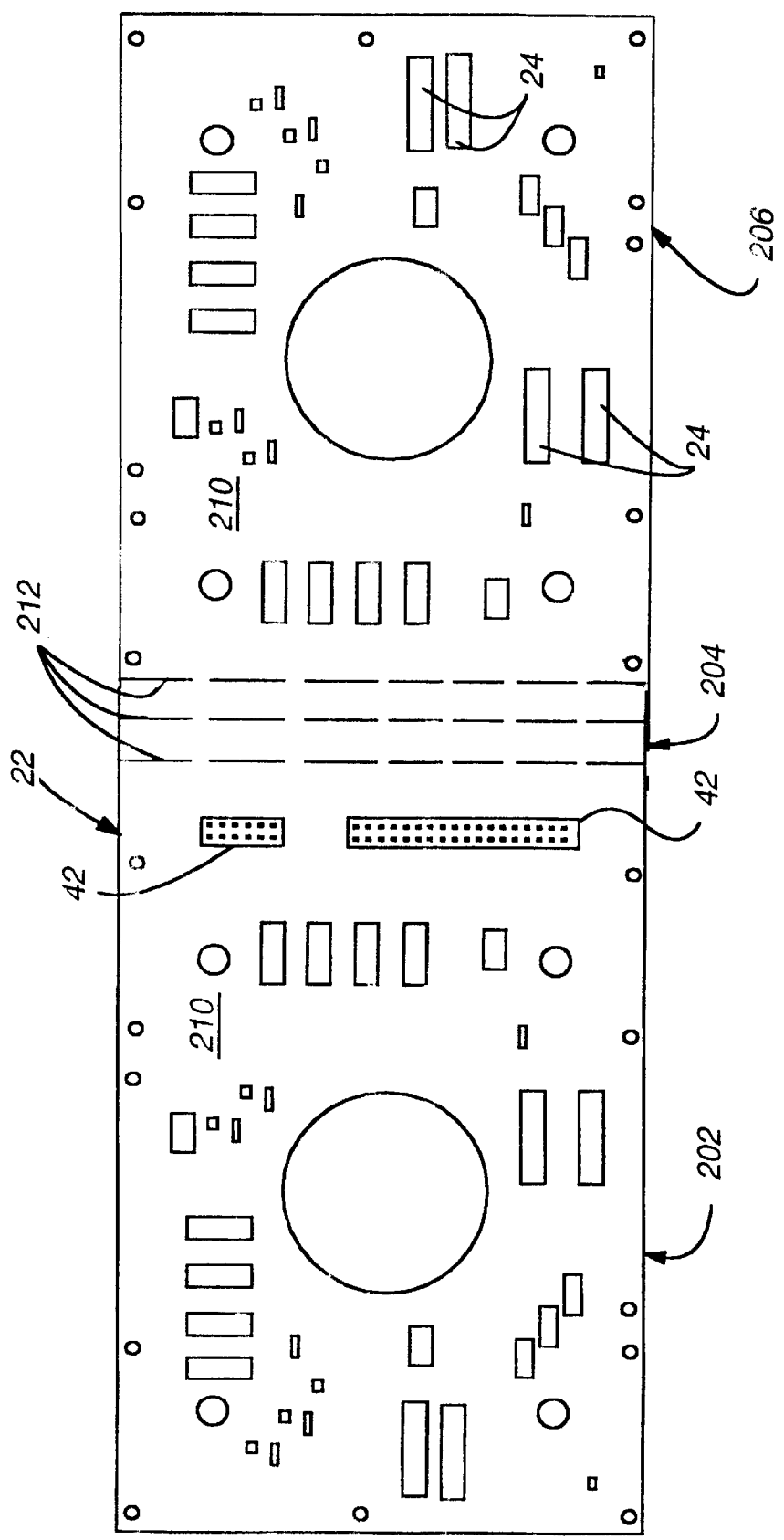
FIG. 37 is a flat plan view of the flexible printed circuit board assembly shown in FIG. 36

The flexible printed circuit board assembly 22 utilized in the embodiments of the hard disk drive apparatus in accordance with the present invention is shown in a perspective view between the top plate and the base plate in FIG. 36. This flexible circuit board assembly 22 is an elongated, flexible, generally rectangular sheet as is shown in the plan view in FIG. 14 and has mounted thereon all of the electrical circuit elements required for power, control and external interface to the computer and control and interface with the actuators voice coil motors and the disk drive motor in the head disk assembly 14 and 114 above described. The PCB 22 may have other than a rectangular shape, depending on the shape of the peripheral housing 16 or 116. In the discloses embodiments, the PCBA is an elongated sheet which has a first generally rectangular end portion 202, a central portion 204, and a second generally rectangular end portion 206. The central portion 204 of the flexible printed circuit board assembly 22 includes power and interface connectors 42 which project laterally from the assembled hard disk drive apparatus 10 and 100 in accordance with the present invention when the PCBA is folded over the head disk assembly 14 or 114 and over the peripheral housing 16 or 116 and fastened to the housing via screws through holes in the top plate and the base plate into the peripheral housing. The connectors 42 may also be mechanically fastened with screws to the side of the peripheral housing 16 or 116.

The PCBA 22 preferably has discrete electrical components 24 mounted on the surface facing away from the HDA 14 so that the flexible sheet substrate 210 presents an impervious membrane toward the HDA 14. Thus the PCBA 22 is a barrier which prevents any particle materials and off-gassing from the discrete components from adversely affecting the head disk assembly 14 or 114. The PCBA may optionally have components 24 facing into the HDA 14. However, the preferred arrangement is as shown in FIGS. 26, 30 and 36, with the components 24 mounted on the outwardly facing surfaces of the PCBA substrate. The substrate of the PCBA 14 and 114 is a conventional flexible circuit board substrate material such as a polyimide or other highly flexible insulative polymeric material.

The printed circuit board assembly 22 contains all the wiring distribution and contact pads for mating with flexible leads from the actuator assemblies 12 and each of the disk drive motor stator assemblies 30. The individual leads from these assemblies are not shown. However, it is to be understood that the lead connections to contact pads on the PCBA 22 will be placed where convenient to the particular components in the head disk assembly 14 and 114 taking into consideration the layout of the discrete electrical components 24.

The printed circuit board assembly 22 in accordance with the invention is designed for use with a variety of drive sizes. As previously mentioned with reference to the differences between the first and second embodiments of the invention 10 and 100, the primary difference between them involves the length of the peripheral housing 16 or 116 and spindle shafts. The base plate 20 and top plate 18 are identical and the spacing between actuators and the disk drive motor is the same. Accordingly, the central portion of the PCB 22 in accordance with the invention includes a series of prefold lines 212 which have lead traces therein from the components 24 to the connector(s) 42 and which allow the central portion to be folded, accordion style, to accommodate a short peripheral housing length and expanded for use with a longer peripheral housing. Optionally, the peripheral housing 16 may have an external channel or slot or recess to receive the folded part of the central portion 204.

This printed circuit board assembly 22 also seals the drive assembly since it is pressed between the plates and the housing and it further dampens any mechanical vibrations that could be transmitted between the actuator assemblies in the housing.

Figure 38:
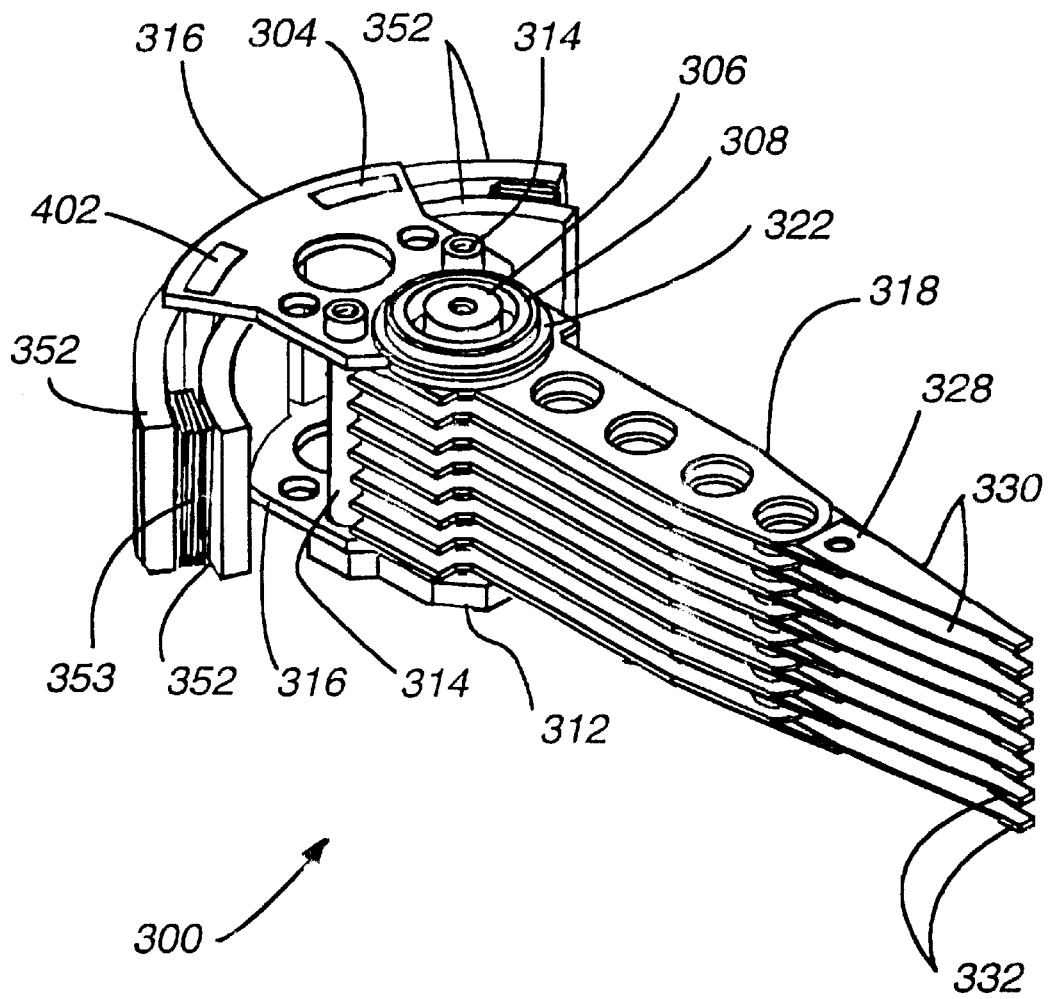
FIG. 38 is a perspective view of a second embodiment of an actuator assembly in accordance with the present invention that can replace the actuator assemblies shown in the hard disk drives in FIGS. 23 and 34.
Figure 39:
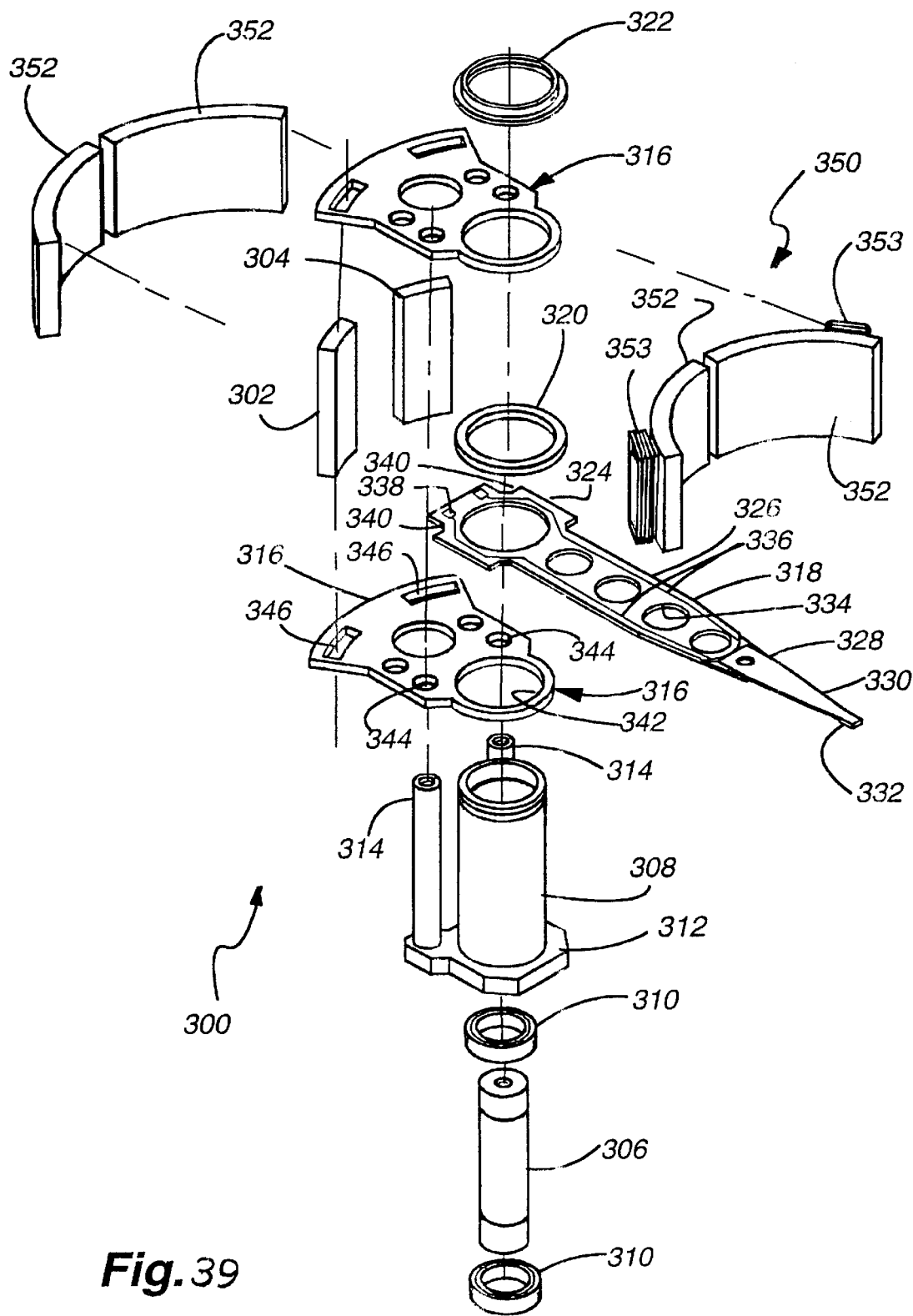
FIG. 39 is an exploded perspective view of the second embodiment of the actuator assembly in accordance with the invention shown in FIG. 38.

An alternative moving magnet actuator assembly 300 in accordance with another aspect of the present invention is shown in FIGS. 38 and 39. This actuator assembly 300 may be used in place of the assemblies 12 and 112 previously discussed. This actuator assembly 300 utilizes a pair of elongated, rectangular permanent magnets 302 and 304 which are spaced apart angularly with respect to the actuator spindle axis 306 and oriented with their longitudinal axes parallel to the axis of the stationary actuator spindle shaft 306. The actuator assembly includes an actuator support sleeve 308 which rotates about the spindle shaft 306 on bearings 310 pressed onto opposite ends of the shaft 306 and pressed into the ends of the sleeve 308.

The sleeve 308 is preferably made of a ceramic material such as silicon carbide and has a flat lower flange 312 transverse to the central axis A through the sleeve 308. This flat flange 312 supports one end each of a pair of alignment rods 314 so that the rods 314 extend parallel to the central axis A and are equally spaced from the sleeve 308.

A magnet support spacer 316 and a plurality of actuator arms 318 and spacers 320 are alternately telescoped onto the sleeve 308. The magnets 302 are then inserted into the magnet support spacer 316 and another magnet support spacer 316 installed on top of the stack of actuator arms 318 and spacers 320. Finally, a retainer ring 322 is threaded onto the top of the sleeve 308 and tightened to clamp all of the actuators 318, the magnets 302 and 304, and the alignment rods 314 in place on the sleeve 308.

Each actuator arm 318 is an elongated body preferably made of a ceramic material such as silicon carbide. The arm 318 has a proximal end portion 324, a mid portion 326, and a distal end portion 328 which supports a flexure 330 which, in turn, supports a gimbal mounted read/write head 332.

The mid portion 326 preferably has a plurality of longitudinally spaced apertures 334 therethrough to minimize the mass of the arm 318. The mid portion also supports a plurality of lead traces 336 printed on one of the upper or lower surfaces of the arm 318. These traces 336 connect the head 332 to a contact pad 338 at the rear end of the proximal end portion 324. The mid portion 326 may also support a preamplifier circuit 337 along with the lead traces 336 for amplifying the read signal from the head 332. The proximal end portion 324 also has a central aperture therein for receiving the support sleeve 308 therethrough. The proximal end portion also has a pair of spaced cutouts 340 to receive the rods 314 and align the proximal end portion 324 therebetween.

The magnet support spacer 316 is an elongated, flat, plate member preferably made of a ceramic material such as silicon carbide. The spacer 316 has a central aperture 342 at its proximal end sized to receive the sleeve 308 therethrough. The spacer 316 also has a pair of spaced apart apertures 344 adjacent the central aperture 342 to received the aligning rods 314 therethrough, and a pair of spaced elongated slots 346 adjacent its distal end for receiving and holding one end of the magnets 302.

The ends of each of the magnets 302 may be keyed or provided with a tenon to fit within one of the slots 346 in order to securely hold one end of each of the magnets 302 during assembly of the actuator arms 318 and the spacers 320. Each of the magnets 302 has a generally rectangular, arcuate wedge segment shape, oriented concentrically with the sleeve 308 by the spacers 316 when the actuator assembly 300 is assembled together.

Each of the spacers 320, the spacers 316, and the actuator arms 318 preferably have texturing on their upper and lower surfaces adjacent the central apertures. The texturing provides a roughened surface so that when these members are stacked on the sleeve 308, they frictionally grip each other to help retain correct radial orientation and alignment together as a unit during actuator seek operation.

The actuator assembly 300 also includes two coil and return plate assemblies 350. Each of the coil and magnet assemblies 350 comprises two pairs of curved, generally rectangular return plate members 352 having generally rectangular cross sections spaced apart and joined together at one end by a coil core 354. This core 354 is a metal post which both spaces the pair of plates 352 apart and serves as a mount for a conductor coil 356. The coil 356 is a wire voice motor coil which, when current flows through it, produces a magnetic field crossing between the opposite free ends of the return plate members 352. The two coil and return plate assemblies 350 are slid into place and fastened to the base plate 18 after assembly of the actuator stack so that one magnet 302 is free to rotate through the gap between the opposite free ends of the plate members 352.

The provision of two magnets 302 and two sets of coil and return plate assemblies 350 permits the use of dual control currents, preferably flowing in opposite directions, which can be used to provide dynamic braking and improved acceleration of the actuator arm assembly during seek operations. This dual coil feature permits faster response times and shorter seek times as well as finer tracking control than is possible with conventional actuator control systems currently available.

The present invention has been described with reference to various embodiments thereof for descriptive purposes and not by way of limitation. Various modifications, changes, and alternatives to the particular embodiments described will be apparent to those skilled in the art to which the invention pertains. All such alternatives and variations are intended to be within the scope of the invention as defined by the following claims. All patents, patent applications, and printed publications referred to herein are hereby incorporated by reference in their entirety.

What is claimed is:

1. A hard disk apparatus comprising in combination:
    a base plate;
    a top plate spaced from and generally parallel to said base plate by a peripheral housing around at least a portion of said base plate;
    at least one planar magnetic recording disks contained with said housing, each said disk having a magnetically recordable material on upper and lower surfaces thereof and rotatably supported from said base plate and said top plate with said housing by a dual stator spindle motor for rotation of said disk about a first axis normal to the plane of said disk; and
    at least one transducer head positioning actuator arm assembly supported with said housing for rotation of at least one elongated actuator arms about a second axis parallel to and spaced from said first axis;
    said motor having a stationary spindle on said first axis fastened to said base plate and to said top plate, a first stator assembly concentric to said spindle fastened to said base plate, a second stator assembly fastened to said top plate, and a motor hub rotatably mounted on said spindle for supporting said disks.

2. The apparatus according to claim 1 wherein said motor hub has a central circumferential flange separating said hub into upper and lower hub portions, said flange separating said at least two disks.

3. The apparatus according to claim 2 wherein said upper and lower hub portions each carry a like number of disks stacked against said flange, each disk separated from an adjacent disk by a spacer ring.

4. The apparatus according to claim 3 wherein said actuator assembly comprises:
    mounting means in said housing for supporting said arms for rotation of said arms about said second axis, said mounting means further supporting an elongated permanent magnet assembly having a central axis concentric to and spaced from said second axis; and
    at least one stationary voice coil in said housing having a central aperture therethrough, said magnet assembly extending through said aperture, whereby said magnet assembly rotates about said second axis through said aperture in response to electrical current passing through said coil to selectively position said actuator arm over a particular radial position on said disk.

5. The apparatus according to claim 4 wherein said magnet assembly has a generally arcuate tubular shape.

6. The apparatus according to claim 5 further comprising a stationary, magnetically permeable bar member mounted in said housing, said bar member having an elongated arcuate shape and a central longitudinal axis coaxial with said central axis of said magnet assembly, said bar member extending through both said coil and said tubular magnet assembly, said magnet assembly being free to move along and over said bar member and through said aperture in response to current through said coil.

7. The apparatus according to claim 5 wherein said magnet assembly has an inner wall, an outer wall, a top wall, and a bottom wall, said inner and outer walls each having generally arcuate rectangular shapes concentric to said second axis.

8. The apparatus according to claim 7 wherein each of said walls has a north face facing toward said longitudinal axis of said magnet assembly and a south face facing away from said longitudinal axis.

9. The apparatus according to claim 8 wherein said top and bottom walls are each curved, arcuate segments concentric about said second axis.

10. The apparatus according to claim 4 further comprising a stationary magnetically permeable member extending through both said magnet assembly and said aperture in said voice coil.

11. The apparatus according to claim 1 and further comprising at least two transducer head positioning actuator arm assemblies.

12. The apparatus according to claim 1 and further comprising four transducer head positioning actuator arm assemblies.

* * * * *